US011859416B2

(12) United States Patent
Johann et al.

(10) Patent No.: US 11,859,416 B2
(45) Date of Patent: Jan. 2, 2024

(54) LATCH ASSEMBLY WITH POWER RELEASE AND DUAL STAGE CINCH FUNCTION

(71) Applicant: Magna BOCO GmbH, Wuppertal (DE)

(72) Inventors: Henrik Johann, Wermelskirchen (DE); Bernardo Erices, Bergish Gladbach (DE); Jan Holbein, Cologne (DE)

(73) Assignee: MAGNA BOCO GMBH, Wuppertal (DE)

( * ) Notice: Subject to any disclaimer, the term of this patent is extended or adjusted under 35 U.S.C. 154(b) by 1314 days.

(21) Appl. No.: 16/369,727

(22) Filed: Mar. 29, 2019

(65) Prior Publication Data

US 2019/0226247 A1 Jul. 25, 2019

Related U.S. Application Data

(63) Continuation-in-part of application No. 16/186,656, filed on Nov. 12, 2018, now Pat. No. 11,512,504.

(60) Provisional application No. 62/586,421, filed on Nov. 15, 2017.

(51) Int. Cl.

| | |
|---|---|
| ***E05B 81/20*** | (2014.01) |
| ***E05B 81/06*** | (2014.01) |
| ***E05B 81/04*** | (2014.01) |
| ***E05B 83/24*** | (2014.01) |
| ***E05B 81/16*** | (2014.01) |
| ***E05B 81/14*** | (2014.01) |

(52) U.S. Cl.

CPC .............. *E05B 81/20* (2013.01); *E05B 81/06* (2013.01); *E05B 81/14* (2013.01); *E05B 81/16* (2013.01); *E05B 83/24* (2013.01)

(58) Field of Classification Search

CPC .......... E05B 81/14; E05B 81/20; E05B 81/06; E05B 81/30; E05B 81/42; E05B 83/16; E05B 83/18; E05B 83/24; Y10T 292/1082; Y10T 292/1047; Y10S 292/23

See application file for complete search history.

(56) References Cited

U.S. PATENT DOCUMENTS 3,998,482 A 12/1976 Nozaki et al.
4,395,064 A * 7/1983 Bellot .................... E05B 81/20 292/201
4,986,579 A 1/1991 Ishikawa
5,466,021 A 11/1995 Ishihara et al.
5,516,164 A 5/1996 Kobayashi
5,944,367 A 8/1999 Imaizumi et al.
7,627,986 B2 12/2009 Hirai et al.
7,731,000 B2 6/2010 Oh et al.
(Continued)

FOREIGN PATENT DOCUMENTS

DE 19533196 A1 3/1997
DE 19535065 A1 3/1997
(Continued)

*Primary Examiner* — Alyson M Merlino
(74) *Attorney, Agent, or Firm* — Dickinson Wright PLLC

(57) ABSTRACT

A closure latch assembly for a decklid configured to provide a power release operation and a power cinch operation. The closure latch assembly includes a latch mechanism, a latch cinch mechanism, a drive mechanism, and a power actuator. The power actuator interacts with the drive mechanism to provide a power release of the latch mechanism and a power cinch of the latch cinch mechanism.

13 Claims, 39 Drawing Sheets

(56) References Cited

U.S. PATENT DOCUMENTS

| | | | | |
|---|---|---|---|---|
| 10,100,559 | B2 * | 10/2018 | Machida | E05B 81/20 |
| 10,415,275 | B2 * | 9/2019 | Byun | E05B 81/20 |
| 10,590,682 | B2 | 3/2020 | Chevalier | |
| 10,619,384 | B2 * | 4/2020 | Im | E05B 81/20 |
| 10,808,433 | B2 * | 10/2020 | Im | E05B 81/20 |
| 10,920,464 | B2 * | 2/2021 | Im | E05B 81/14 |
| 11,136,795 | B2 * | 10/2021 | Im | E05B 81/20 |
| 11,199,031 | B2 | 12/2021 | Wirths | |
| 2017/0298661 | A1 * | 10/2017 | Byun | E05B 81/20 |
| 2018/0171677 | A1 * | 6/2018 | Im | E05B 83/18 |

FOREIGN PATENT DOCUMENTS

| | | | | |
|---|---|---|---|---|
| DE | 19700887 | A1 * | 7/1998 | E05B 81/20 |
| DE | 19804516 | A1 | 8/1999 | |
| DE | 19854790 | A1 | 5/2000 | |
| DE | 10065569 | A1 | 7/2001 | |
| DE | 10114065 | A1 | 11/2002 | |
| DE | 10242830 | A1 | 12/2003 | |
| DE | 102004063239 | A1 | 1/2006 | |
| DE | 202008012706 | U1 | 12/2008 | |
| DE | 202008012707 | U1 | 12/2008 | |
| DE | 202008012086 | U1 | 1/2009 | |
| DE | 102007056653 | A1 | 5/2009 | |
| DE | 102014003737 | A1 | 9/2015 | |
| DE | 10231825 | B4 | 8/2016 | |
| EP | 1790803 | A2 | 5/2007 | |
| EP | 2060711 | A2 | 5/2009 | |
| EP | 2373860 | A1 | 10/2011 | |
| KR | 20180072013 | A * | 6/2018 | |
| WO | 2011015497 | A1 | 2/2011 | |
| WO | WO-2018030556 | A2 * | 2/2018 | E05B 81/06 |

* cited by examiner

LATCH ASSEMBLY WITH POWER RELEASE AND DUAL STAGE CINCH FUNCTION

CROSS-REFERENCE TO RELATED APPLICATIONS

This application is a Continuation-in-Part application of U.S. application Ser. No. 16/186,656 filed Nov. 12, 2018, now U.S. Pat. No. 11,512,504, which claims the benefit of U.S. Provisional Application No. 62/586,421, filed on Nov. 15, 2017. The entire disclosures of each of the above applications is incorporated herein by reference.

FIELD

The present disclosure related generally to a power-operated closure latch assembly for a motor vehicle closure system. More specifically, the present disclosure is directed to a closure latch assembly providing power release and power cinch functionality and which is well-suited for use with a decklid/hood latching system in a motor vehicle.

BACKGROUND

This section provides background information related generally to closure latch assemblies of the type used with closure panels in association with a motor vehicle closure system. This background information is only provided to describe the possible vehicular applications for such latch assemblies and is not intended to limit the scope of the present disclosure nor be interpreted as prior art thereto.

In view of the increased consumer demand for motor vehicles equipped with advanced comfort and convenience features, many modern motor vehicles are now provided with passive entry systems to permit remote locking and release of closure panels (i.e., doors, tailgates, liftgates and decklids) without use of a traditional key-type entry system. In this regard, some of the more popular features now available with vehicle latch systems include power locking/unlocking, power release and power cinch. These "powered" features are provided by a closure latch assembly mounted to one of the closure panel and a structural body portion and which is typically equipped with a ratchet and pawl type of latch mechanism that is controlled via actuation of a latch release mechanism by a power-operated release actuator. In such closure latch assemblies, the closure panel is held in a closed position by virtue of the ratchet being held in a striker capture position so as to releasably retain a striker that is mounted to the other one of the closure panel and the structural body portion of the vehicle. The ratchet is held in its striker capture position by the pawl when the pawl is located in a ratchet holding position. In many ratchet and pawl type of latch mechanisms, the pawl is operable in it ratchet holding position to retain the ratchet in one of two distinct striker capture positions, namely a secondary or "soft close" striker capture position and a primary or "hard close" striker capture position. When the ratchet is held by the pawl in its secondary striker capture position, the latch mechanism functions to latch the closure panel in a partially-closed position relative to the body portion of the vehicle. In contrast, when the ratchet is held by the pawl in its primary striker capture position, the latch mechanism functions to latch the closure panel in a fully-closed position relative to the body portion of the vehicle. To release the closure panel from either of its partially-closed and fully-closed positions, the power-operated release actuator causes the latch release mechanism to move the pawl from its ratchet holding position into a ratchet releasing position, whereby a ratchet biasing mechanism acts to forcibly pivot the ratchet into a striker release position and provide the power release feature.

Closure latch assemblies providing the power cinch feature, also referred to as a "soft close" function, are usually equipped with a latch cinch mechanism operated by a power-operated cinch actuator. Commonly, the latch cinch mechanism is directly connected to the ratchet of the latch mechanism and, when actuated, is operable for causing the ratchet to move from its secondary striker capture position into its primary striker capture position, thereby moving (i.e. cinching) the closure panel from its partially-closed position into its fully-closed position. A single power-operated actuator, or separate power-operated actuators, can be used in association with the power release and power cinch features. However, the power release feature is typically independent from the power cinch feature.

In view of recent development of electric vehicles, such vehicles are configured to include a front cargo compartment where the engine compartment has typically been located in traditional vehicles. The closure panel associated with the front cargo compartment, commonly referred to as a decklid or hood, typically includes a striker that can be releasably latched by a decklid closure latch assembly mounted to a structural portion of the vehicle body near the front of the front cargo compartment. Traditionally, the decklid closure latch assembly can be actuated from within the passenger compartment to unlatch the latch mechanism and release the decklid for movement from its fully-closed position into a partially-open or "pop-up" position. Such actuation can be accomplished manually (via a manually-operable decklid latch release mechanism) or electrically (via a push button actuating the power release actuator). Subsequently, a secondary or "safety" latch mechanism must be actuated to unlatch the decklid for movement from its pop-up position into a fully-open position. This dual-stage latch release can be accomplished via a double-pull arrangement or an independent release of the safety latch mechanism from outside the vehicle.

However, the ability to equip the decklid closure system with a power-operated closure latch assembly capable of providing both power release and power cinch functionality is now desirable. Since decklids are operated differently than conventional trunklids (i.e., the user's fingers can be pinched as they hold the decklid between the vehicle's structural body portion and an underside of the decklid versus trunklids which are closed by pushing down on the top thereof), a traditional power cinch operation via actuation of a power cinch actuator can pose additional hazards when compared to fingers being pinched under the weight of the decklid only. Thus, it is recognized that a unique solution is required to configure a power-operated decklid closure latch assembly capable of providing the power cinch function.

While current power-operated closure latch assemblies are sufficient to meet regulatory requirements and provide enhanced comfort and convenience, a recognized need exists to advance the technology and, more particularly, to provide alternative power-operated decklid closure latch assemblies that address and overcome at least some of the known shortcomings.

SUMMARY

This section provides a general summary of the present disclosure and is not intended to be considered a comprehensive and exhaustive listing of all features, advantages, aspects and objectives associated with the inventive concepts described and illustrated in the detailed disclosure provided herein.

It is an aspect of the present disclosure to provide a power-operated closure latch assembly for a motor vehicle closure system configured to provide power release and power cinch features.

It is a related aspect of the present disclosure to provide such a power-operated closure latch assembly for use with a decklid (i.e. hood) type of closure member associated with the motor vehicle closure system and which is configured to provide the power release feature as part of a decklid opening operation for moving the decklid from a fully-closed position to a partially-open ("pop-up") position and which is further configured to provide the power cinch feature as part of a decklid closing operation for moving the decklid from its partially-open position to its fully-closed position.

As a further aspect of the present disclosure, the power-operated closure latch assembly is configured to provide a safety latching feature normally operable to hold the decklid in its partially-open position and which can be selectively released to permit manual movement of the decklid from its partially-open position to a fully-open position.

According to yet another aspect of the present disclosure, the closure latch assembly is equipped with a power actuator configured to control actuation of a drive mechanism for providing each of the power release feature, the power cinch feature, and release of the safety latching feature.

According to an alternative aspect of the present disclosure, the closure latch assembly is equipped with a power actuator configured to control actuation of a latch release mechanism to provide the power release and safety latch release features, and is further equipped with a latch cinch mechanism controlled via the power actuator to provide the power cinch feature.

In accordance with these and other aspects, the present disclosure is directed to a closure latch assembly for use in a motor vehicle having a closure member that is moveable between a fully-open position and a fully-closed position. The closure latch assembly comprising: a latch mechanism operable in a primary latched state to hold the closure member in its fully-closed position, in a secondary latched state to hold the closure member in a partially-open position, and in an unlatched state to permit movement of the closure member from its partially-open position to its fully-open position; a lift mechanism operable in a spring-loaded state when the latch mechanism is in its primary latched state and operable in a spring-released state when the latch mechanism is shifted from its primary latched state into its secondary latched state, the lift mechanism causing the closure member to move from its fully-closed position to its partially-open position when shifted into its spring-released state; a latch cinch mechanism operable in an uncoupled state with respect to the latch mechanism to permit the closure member to move from its partially-open position into a cinched position during a first cinching stage of a dual-stage cinch operation, and the latch cinch mechanism operable in a coupled state with respect to the latch mechanism to drive the latch mechanism into its primary latched state for moving the closure member from its cinched position to its fully-closed position during a second cinching stage of the dual-stage cinching operation; and a power actuator operable to shift the lift mechanism from its spring-released state into its spring-loaded state to provide the first cinching stage and to shift the cinch mechanism from its uncoupled state into its coupled state to provide the second cinching stage.

In the above-noted closure latch of the present disclosure, the first cinching stage is a non-driven stage with the closure member moving to its cinched position due to its own weight. The second cinching stage is a driven stage with the cinch mechanism driving the latch mechanism from its secondary latched state into its primary latched state so as to cause corresponding movement of the closure member from its cinched position to its fully-closed position.

In the above-noted closure latch assembly of the present disclosure, the lift mechanism includes a lift lever configured for movement between a non-deployed position when the latch mechanism is in its primary latched state and a deployed position when the latch mechanism is in its secondary latched state. The cinch mechanism includes a cinch pawl moveable between an uncoupled position disengaged from a ratchet associated with the latch mechanism and a coupled position engaged with the ratchet. The power actuator is operable to move the lift lever from its deployed position to its non-deployed position while the cinch pawl is maintained in its uncoupled position to provide the first cinching stage. The power actuator is also operable to move the cinch pawl from its uncoupled position to its coupled position while the lift lever is maintained in its non-deployed position to provide the second cinching stage.

In accordance with these and other aspects, the closure latch assembly of the present disclosure is configured to be mounted to a structural body portion of the motor vehicle and operate to selectively engage a striker mounted to the decklid for latching the decklid in its fully-closed position relative to the vehicle body portion. The closure latch assembly includes a latch mechanism operable in a latched state to hold the decklid in its fully-closed position and in an unlatched state to permit movement of the decklid from its fully-closed position toward its fully-open position. The closure latch assembly also includes a latch release mechanism operable to shift the latch mechanism from its latched state into its unlatched state, a spring-loaded lift mechanism operable to move the decklid from its fully-closed position into its partially-open position in response to shifting of the latch mechanism from its latched state into its unlatched state, and a safety latch mechanism operable in a safety latched state to engage the latch mechanism for holding the decklid in its partially-open position and in a safety unlatched state to release the latch mechanism and permit movement of the decklid from its partially-open position to its fully-open position. In addition, the closure latch assembly further includes a power actuator for controlling coordinated actuation of the latch release mechanism and the safety latch mechanism to provide the power release function. The power actuator is operable to rotate a drive member in an actuation direction, the drive member having a first feature controlling actuation of the latch release mechanism and a second feature controlling actuation of the safety latch mechanism.

In the above-noted closure latch assembly of the present disclosure, the drive cam further includes a lift lever release feature and a lift lever reset feature. The lift lever release feature is configured to shift the lift mechanism from a spring-loaded state into a spring-released state for moving the decklid from its fully-closed position to its partially-open position in response to the first release trigger feature actuating the latch release mechanism. Continued driven rotation of the drive cam in the actuation direction causes the lift lever reset feature to reset the spring-loaded lift mechanism into its spring-loaded state such that the weight of the decklid acts to drive the latch mechanism from its unlatched state toward its latched state for providing the first, non-driven cinching stage during which the decklid moves from its partially-open position into its cinched position.

In the closure latch assembly of the present disclosure, the drive member further includes a third feature configured to shift a latch cinch mechanism from an uncoupled state into a coupled state in response to continued rotation of the drive cam in the actuation direction. This continued driven rotation of the drive cam causes the latch cinch mechanism, in its coupled state, to mechanically drive the latch mechanism into its latched state for establishing the second, driven cinching stage immediately after completion of the first, non-driven cinching stage for moving the decklid from its cinched position to its fully-closed position.

In accordance with these features and aspects, the present disclosure is directed to a closure latch assembly comprising: a latch mechanism having a ratchet moveable between a primary striker capture position, a cinched striker capture position, a secondary striker capture position, and a striker release position, a ratchet biasing member for biasing the ratchet toward its striker release position, a pawl moveable between a ratchet holding position and a ratchet releasing position, and a pawl biasing member for biasing the pawl toward its ratchet holding position, the latch mechanism being operable in a primary latched state when the ratchet is held in its primary striker capture position by the pawl located in its ratchet holding position, the latch mechanism being operable in a secondary latched state when the ratchet is located in its secondary striker capture position and the pawl is located it its ratchet releasing position, and the latch mechanism being operable in an unlatched state when the ratchet is located it its striker release position and the pawl is located it its ratchet releasing position; a lift mechanism having a lift lever moveable between a spring-loaded position and a spring-released position, and a lift lever spring for biasing the lift lever toward its spring-released position, wherein the lift lever is located in its spring-loaded position when the latch mechanism is operating in its primary latched state and is operable to drive the ratchet from its primary striker capture position to its secondary striker capture position in response to the latch mechanism being shifted into its secondary latched state; a safety latch mechanism having a safety pawl moveable between a ratchet blocked position whereat the safety pawl holds the ratchet in its secondary striker capture position and a ratchet unblocked position whereat the safety pawl permits the ratchet to move to its striker release position; a latch cinch mechanism having a cinch pawl moveable between a home position and a cinched position, and a cinch pawl biasing member for biasing the cinch pawl toward its home position; and a power actuator including a drive cam rotatable by an electric motor in an actuation direction, wherein the drive cam includes a first trigger cam feature operable to move the pawl from its ratchet holding position to its ratchet releasing position for shifting the latch mechanism from its primary latched state into its secondary latched state, a second trigger cam feature operable to move the safety pawl from its ratchet blocked position into its ratchet unblocked position for shifting the latch mechanism from its secondary latched state into its unlatched state, a lift lever cam feature for driving the lift lever from its spring-released position toward its spring-loaded position to facilitate a first stage cinching operation during which the ratchet moves from its secondary striker capture position to its cinched striker capture position, and a cinch cam feature for driving the cinch pawl from its home position into its cinched position for causing the cinch pawl to move the ratchet from its cinched striker capture position into its primary striker capture position to facilitate a second stage cinching operation.

In accordance with other features and aspects, the present disclosure is directed to a closure latch assembly for use in a motor vehicle having a closure member that is moveable between a fully-open position and a fully-closed position. The closure latch assembly comprising: a latch mechanism operable in a primary latched state to hold the closure member in its fully-closed position, in a secondary latched state to hold the closure member in a partially-open position, and in an unlatched state to permit movement of the closure latch member from its partially-open position to its fully-open position; a latch cinch mechanism operable in an uncoupled state with respect to the latch mechanism to permit movement of the closure member from its fully-open position into its partially-open position and operable in a coupled state relative to the latch mechanism to drive the latch mechanism from its secondary latched state into its primary latched state during a power cinch operation; a drive mechanism operable in a home state to be disengaged from the latch mechanism and the latch cinch mechanism, in a primary latch released state to shift the latch mechanism from its primary latched state into its secondary latched state to provide a first stage of the power release operation, in a secondary latch released state to shift the latch mechanism from its secondary latched state into its unlatched state to provide a second stage of the power release operation, and in a cinched state to shift the latch cinch mechanism into its coupled state to provide the power cinch operation; and a power actuator operable to shift the drive mechanism between its distinct states.

Further areas of applicability will become apparent from the detailed description provided herein. The specific aspects and example embodiments listed in this summary are intended for illustrative purposes only and are not intended to limit the fair and reasonable scope of the present disclosure.

DRAWINGS

The drawings described herein are only intended to illustrate non-limiting embodiments of a power-operated closure latch assembly and its related structural configuration and functional operation in association with the teachings of the present disclosure. In the drawings.

Figure 6B:
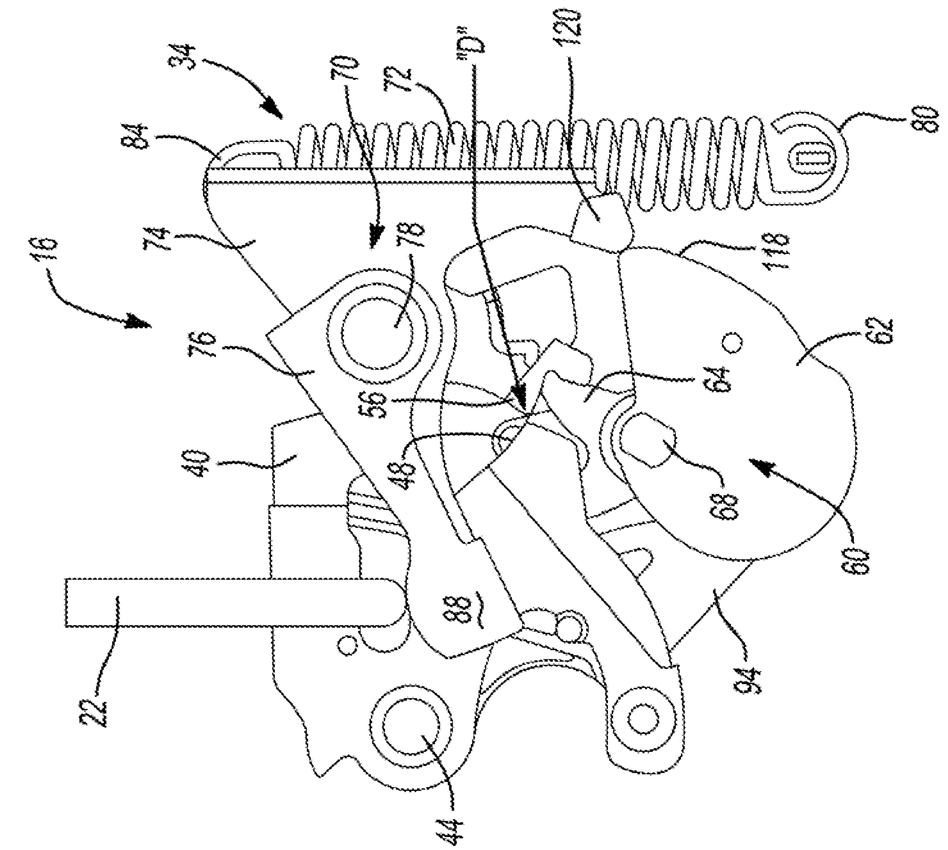
FIGS. 6A and 6B are generally similar to FIGS. 5A and 5B, respectively, but illustrate the latch mechanism being shifted from its latched state into an unlatched state in response to continued actuation of the latch release mechanism.
Figure 6A:
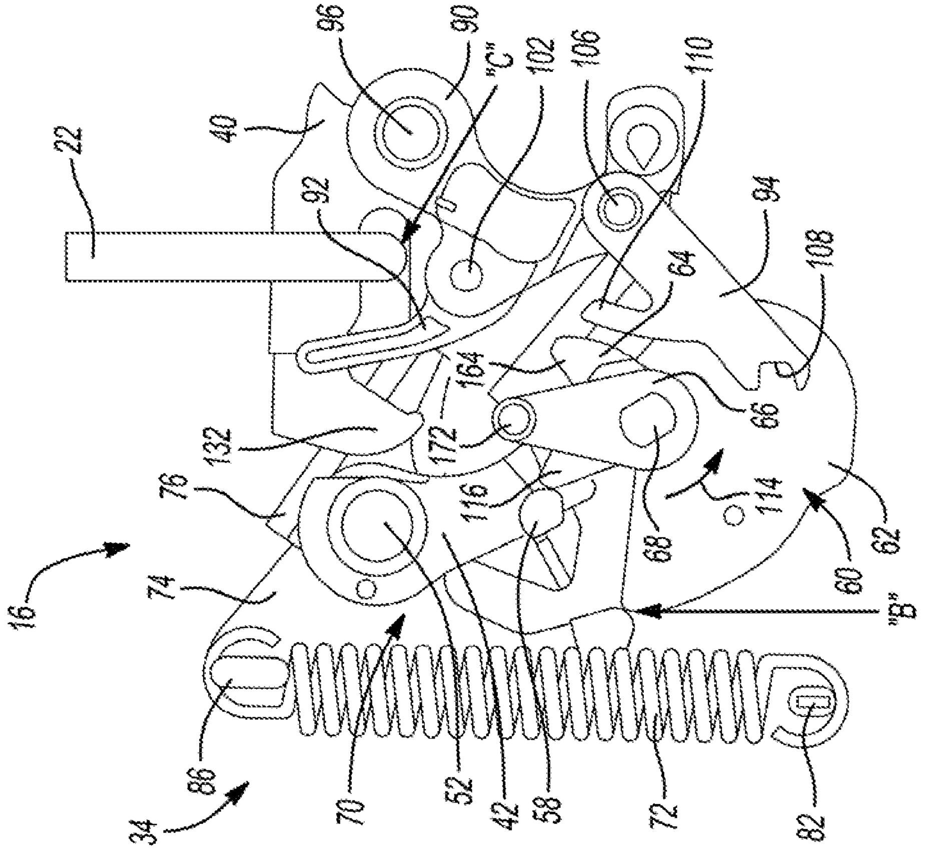
Figure 7B:
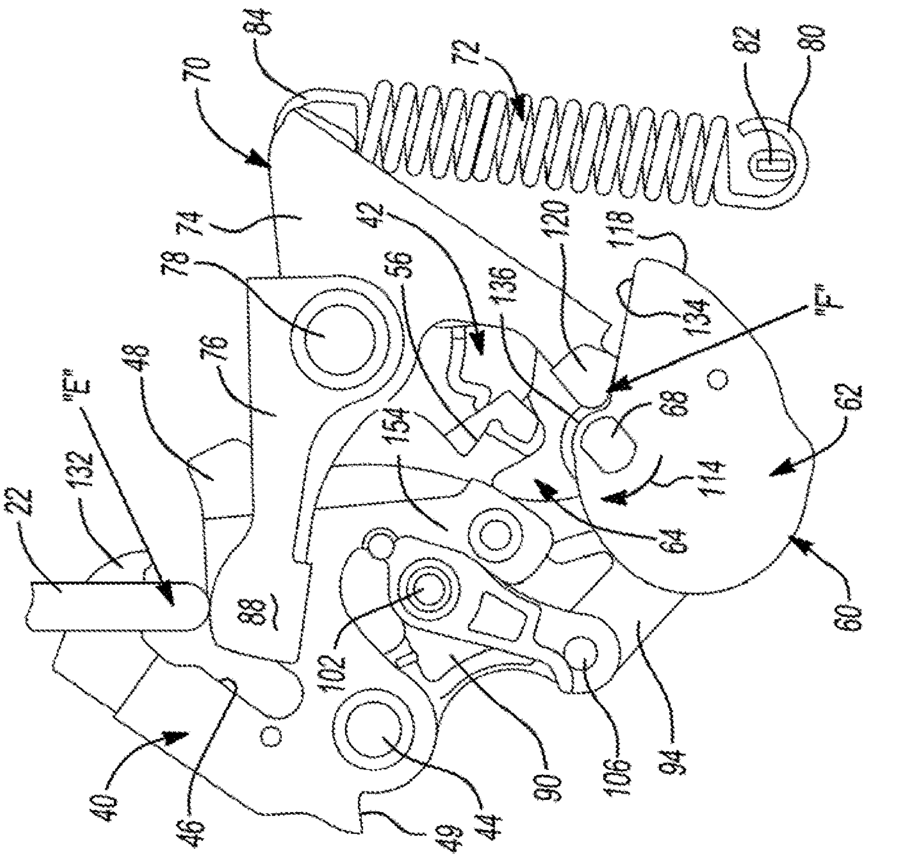
Figure 7A:
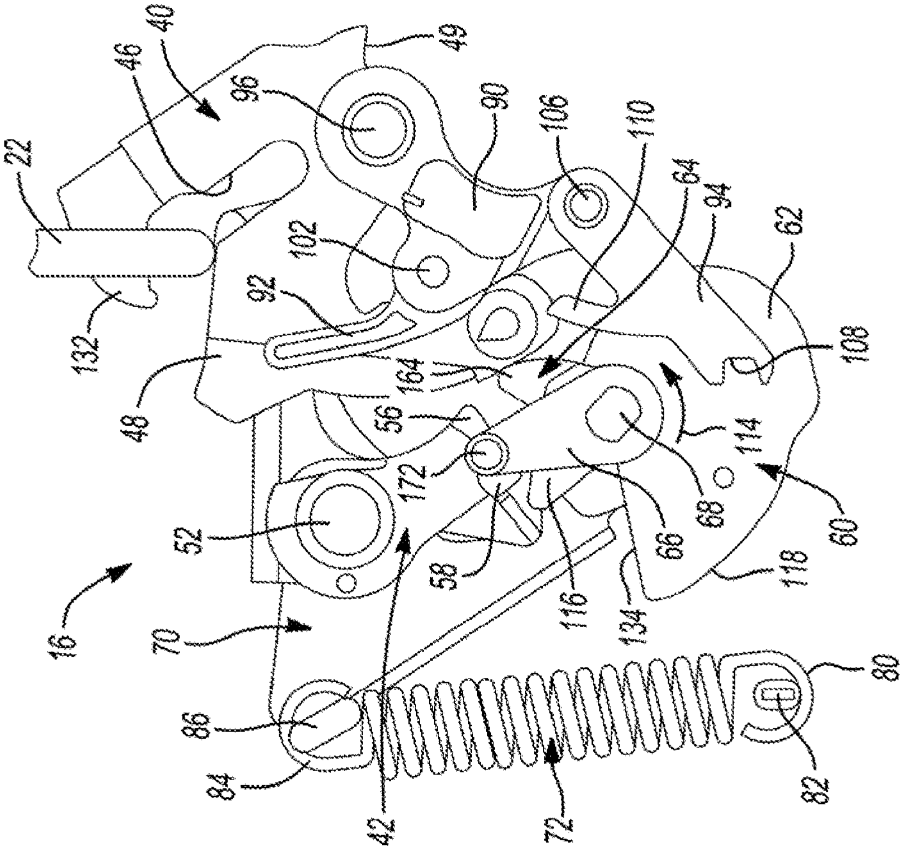
Figure 8B:
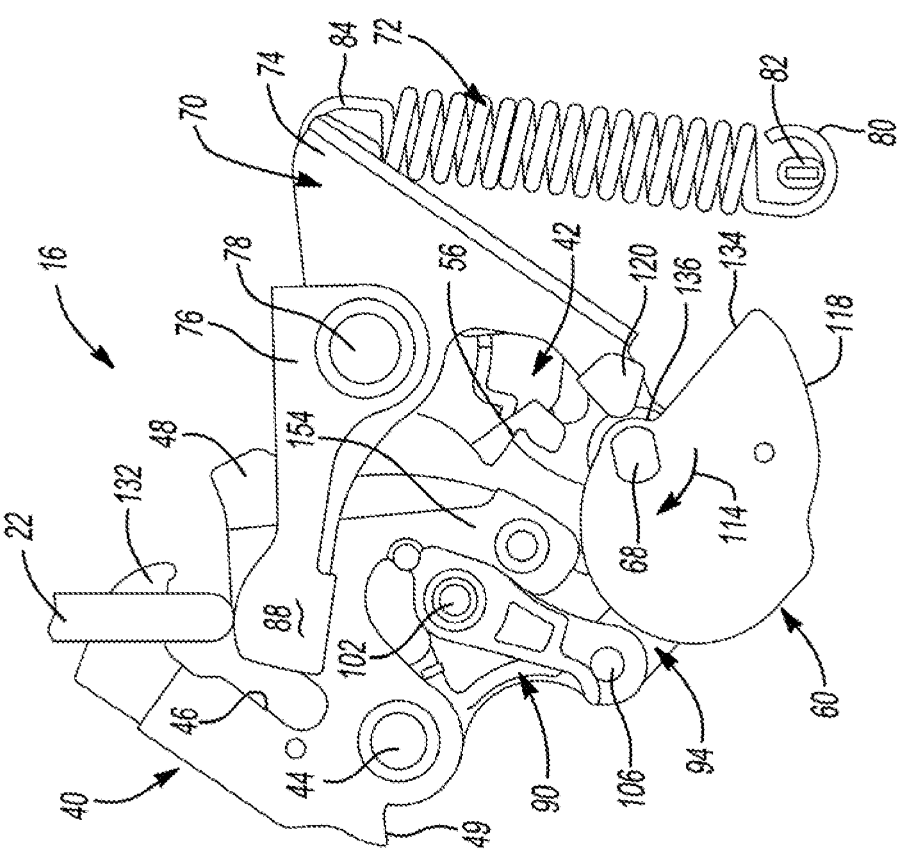
Figure 8A:
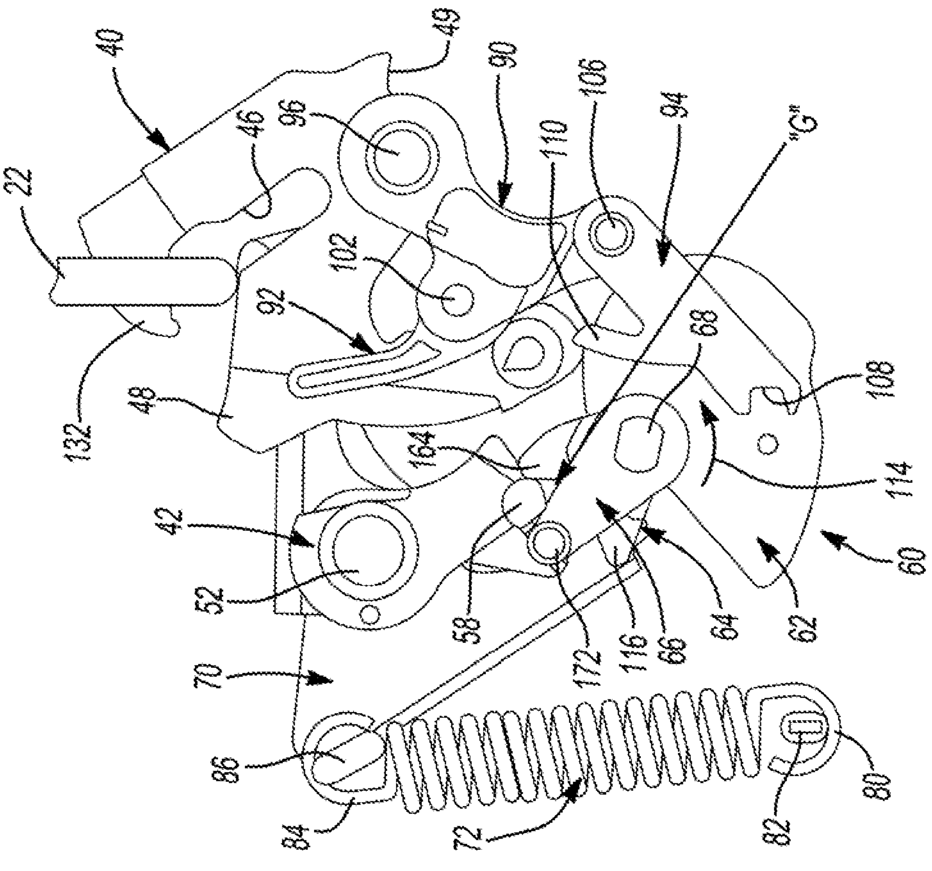
Figure 8C:
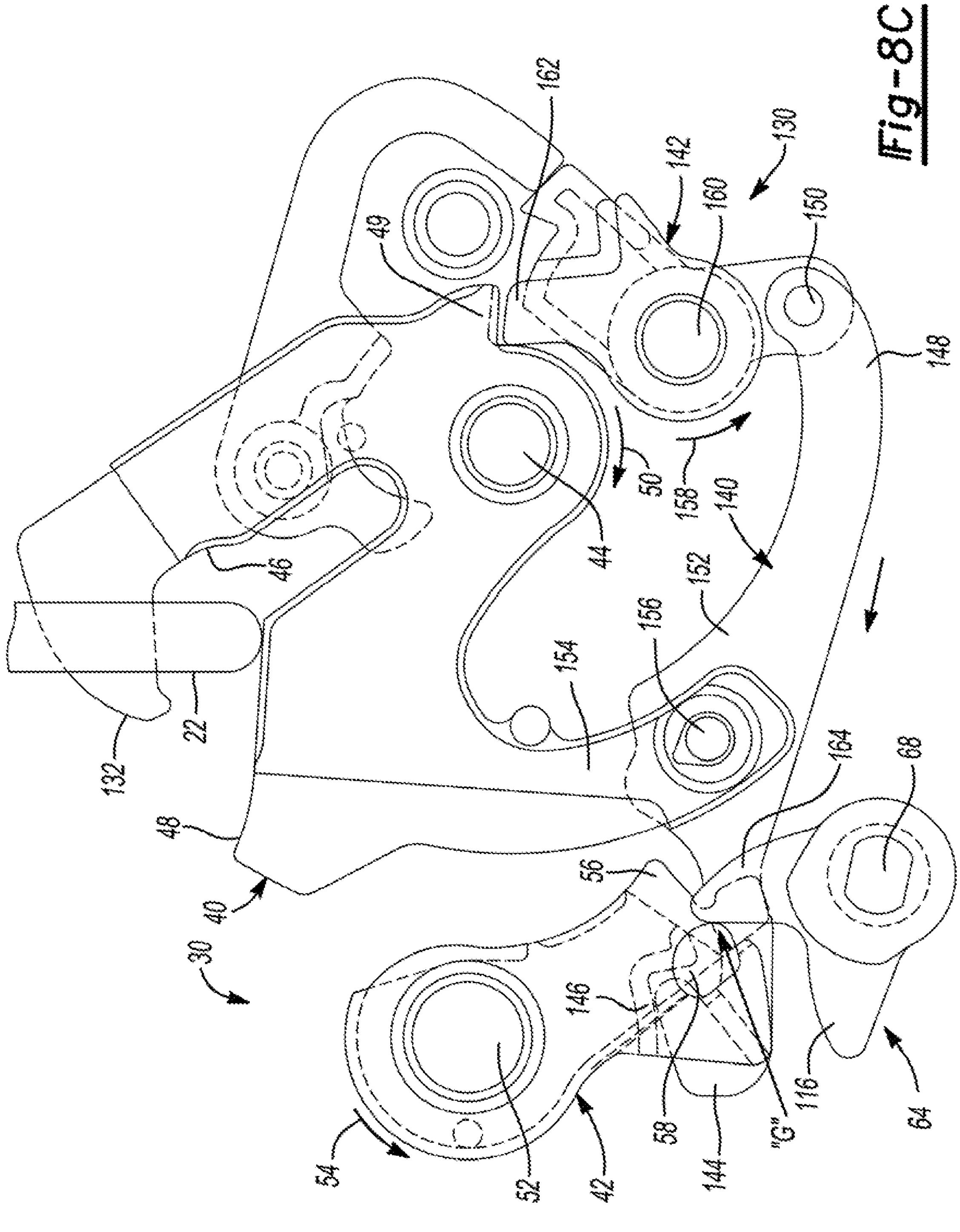
Figure 9B:
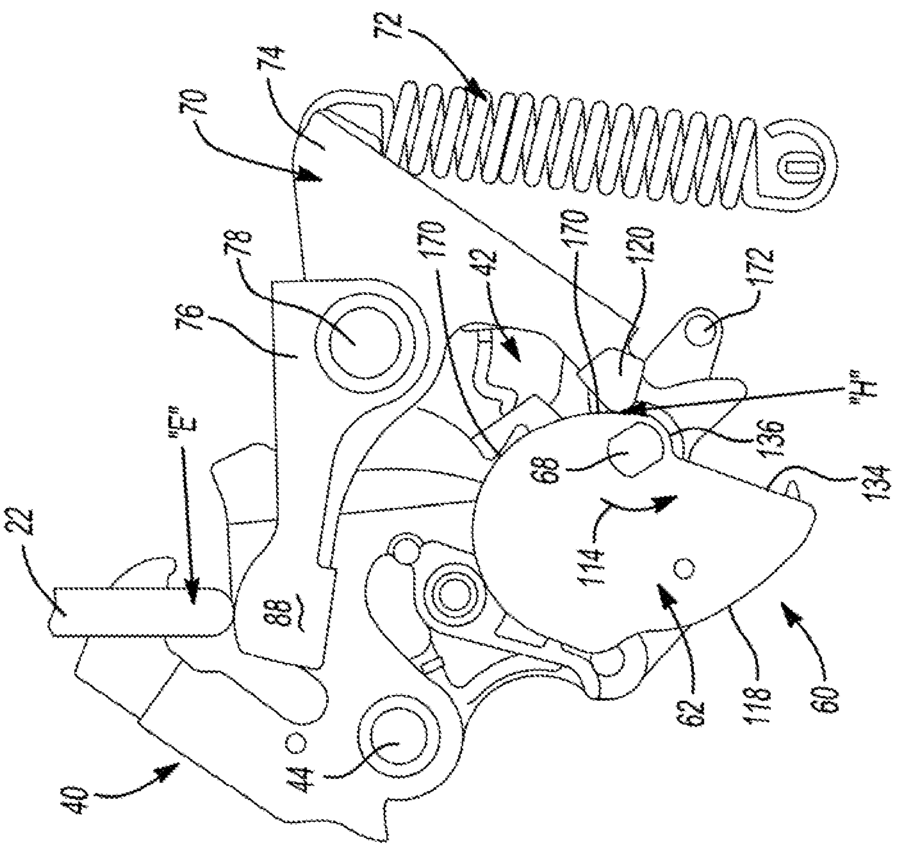
Figure 9A:
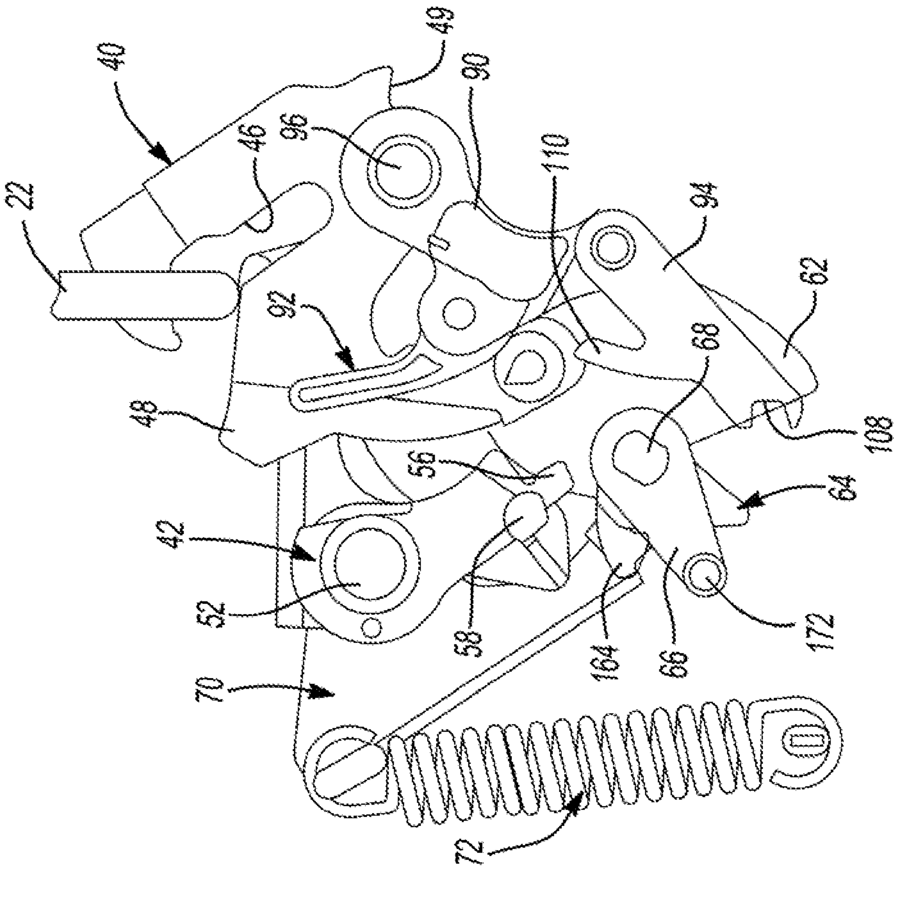
Figure 10B:
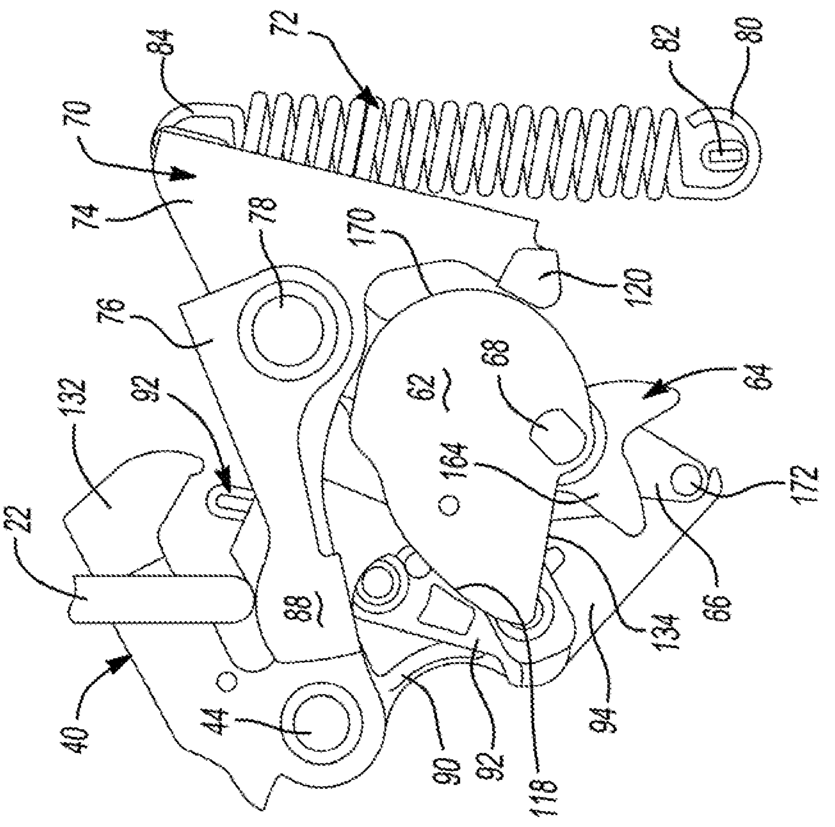
Figure 10A:
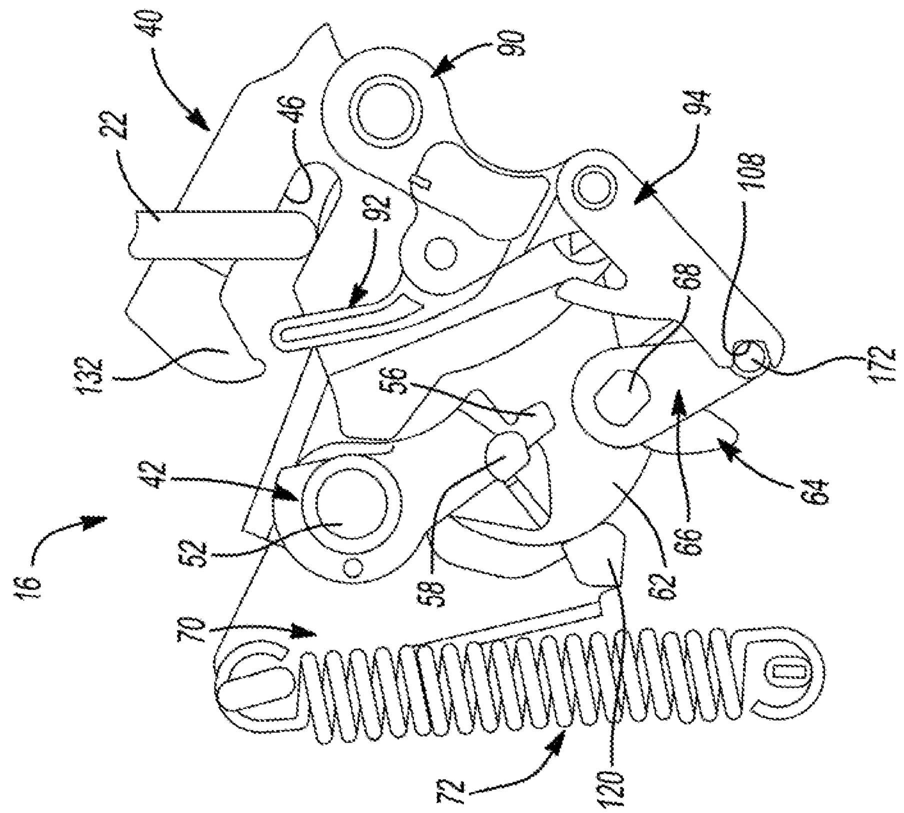
Figure 11B:
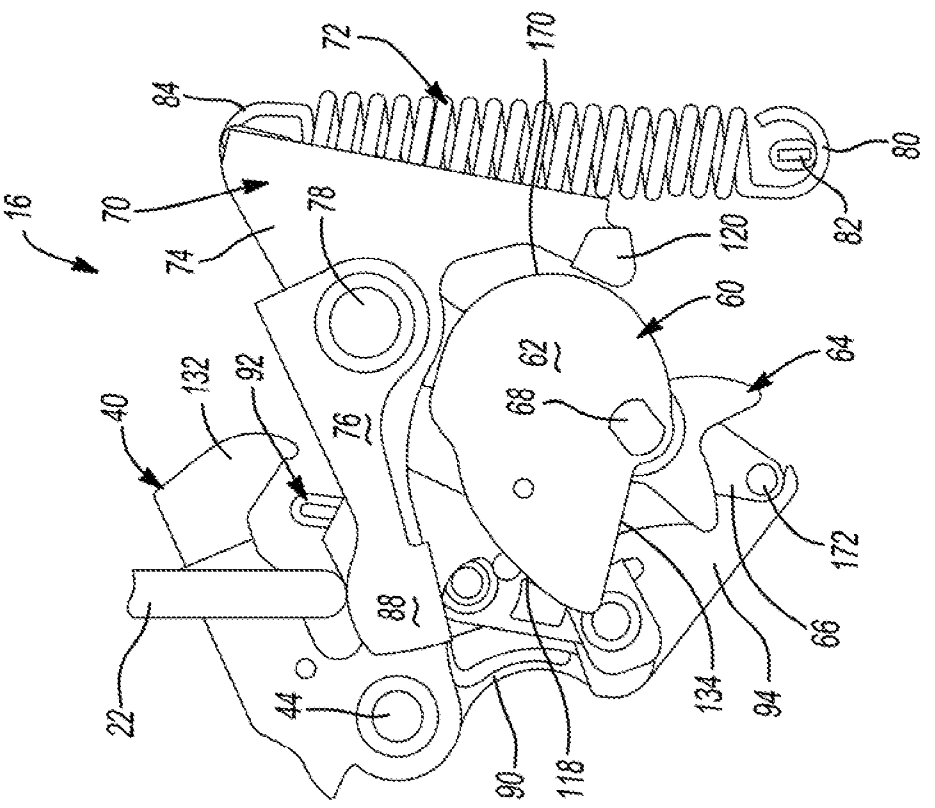
Figure 11A:
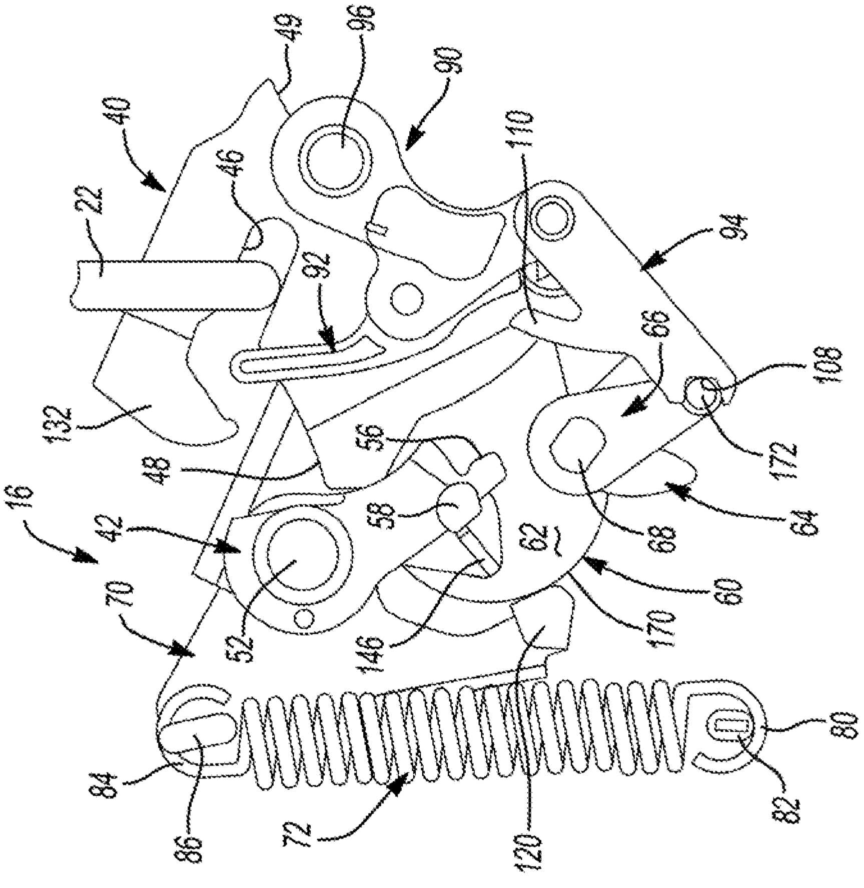
Figure 12B:
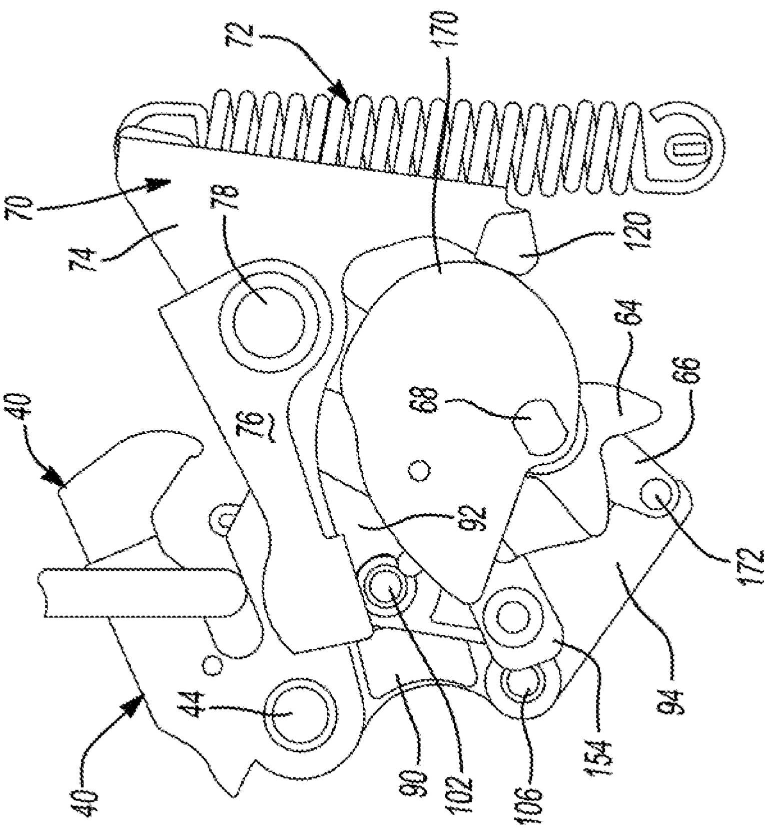
Figure 12A:
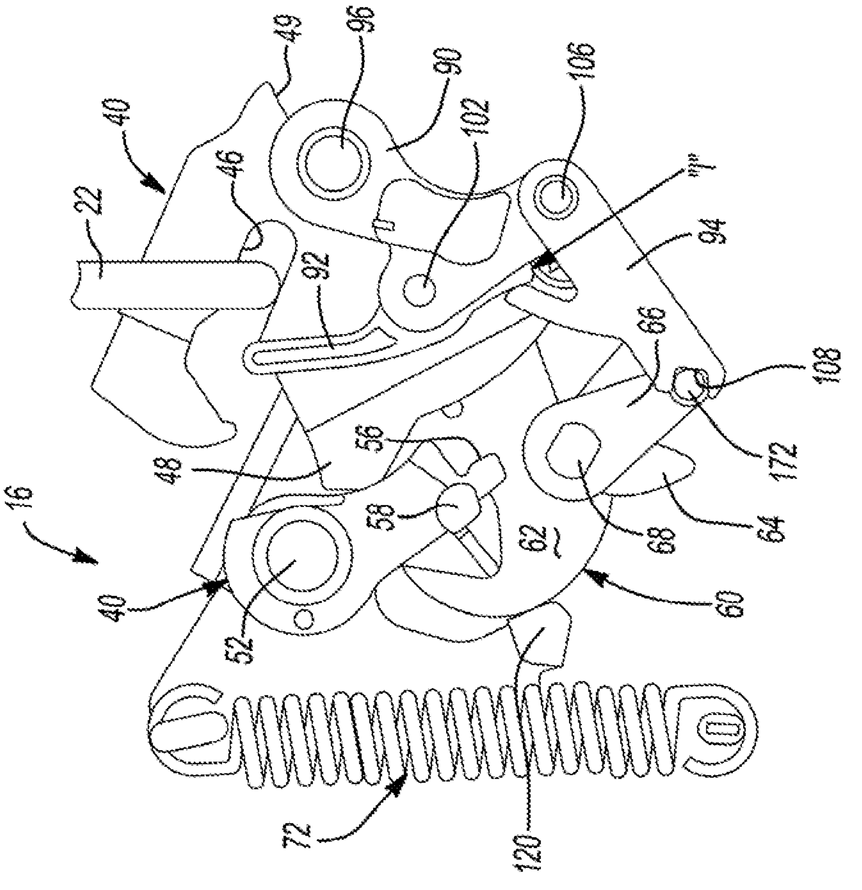
Figure 13B:
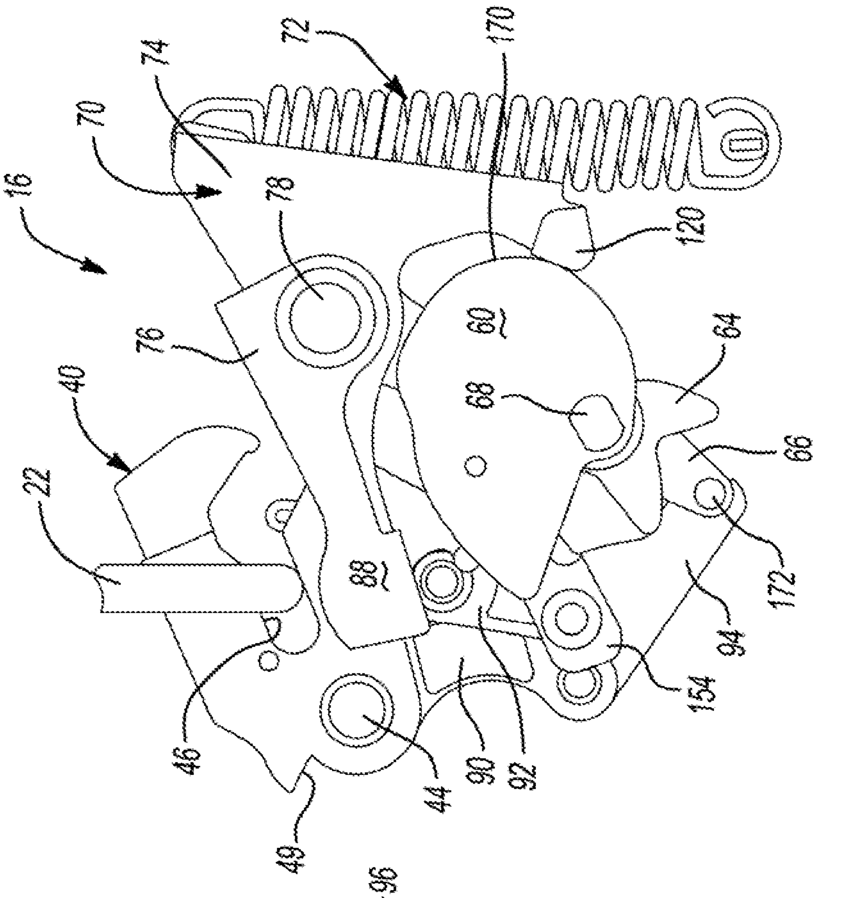
Figure 13A:
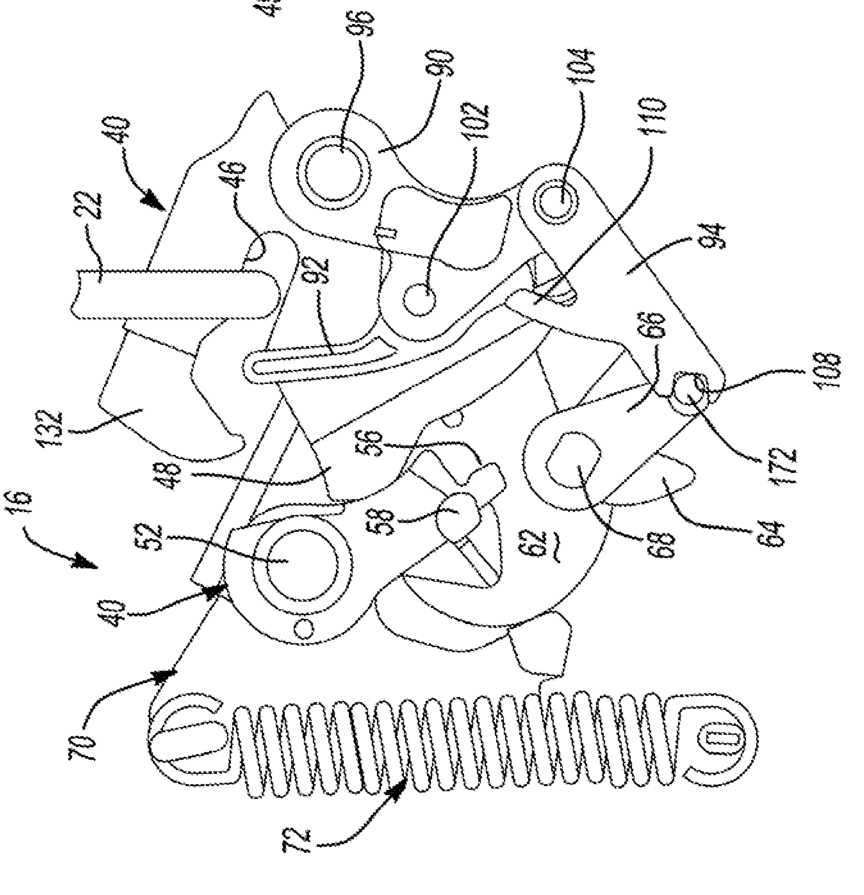
Figure 14B:
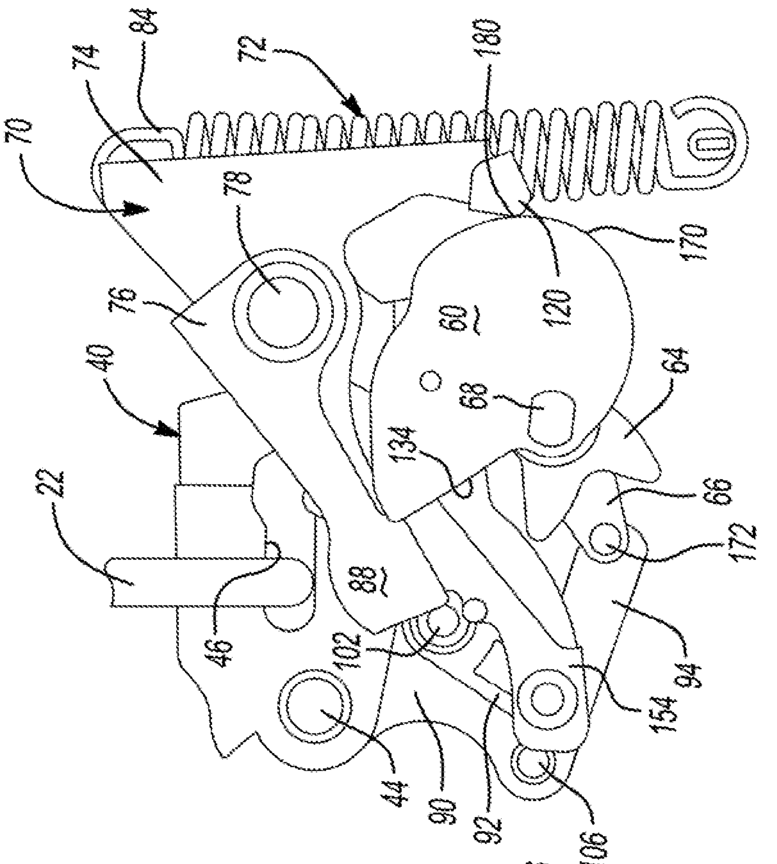
Figure 14A:
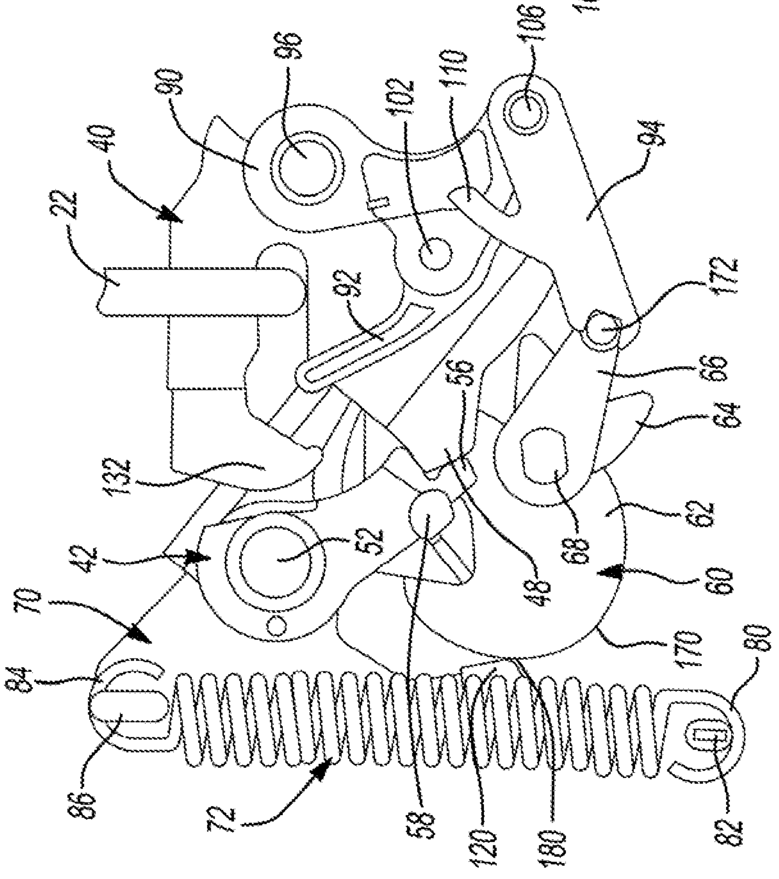
Figure 15B:
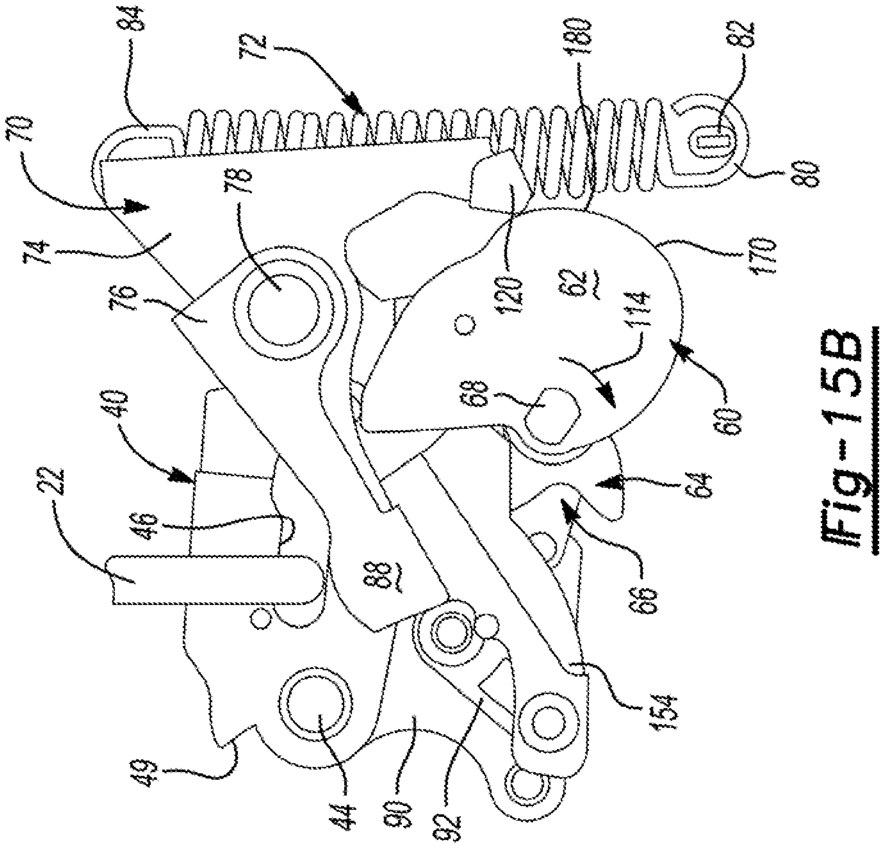
Figure 15A:
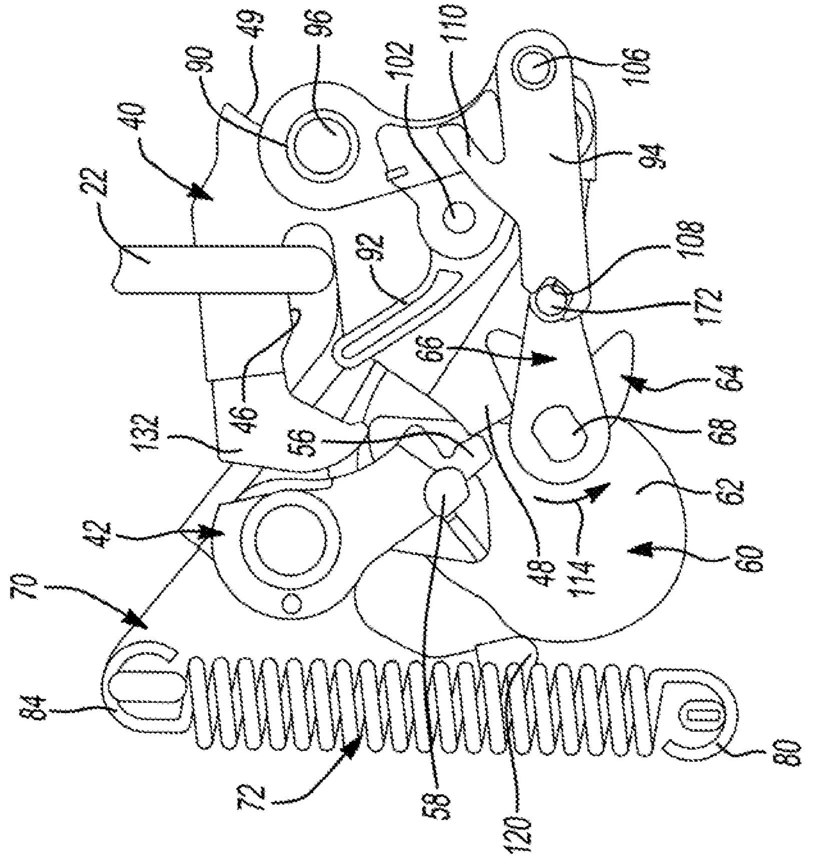
Figure 16A:
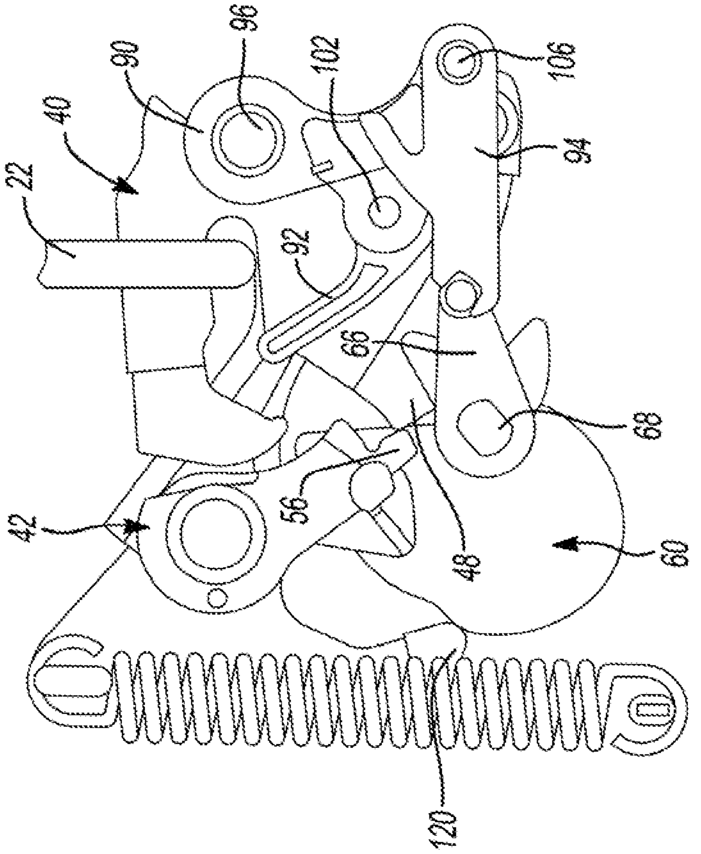
Figure 16B:
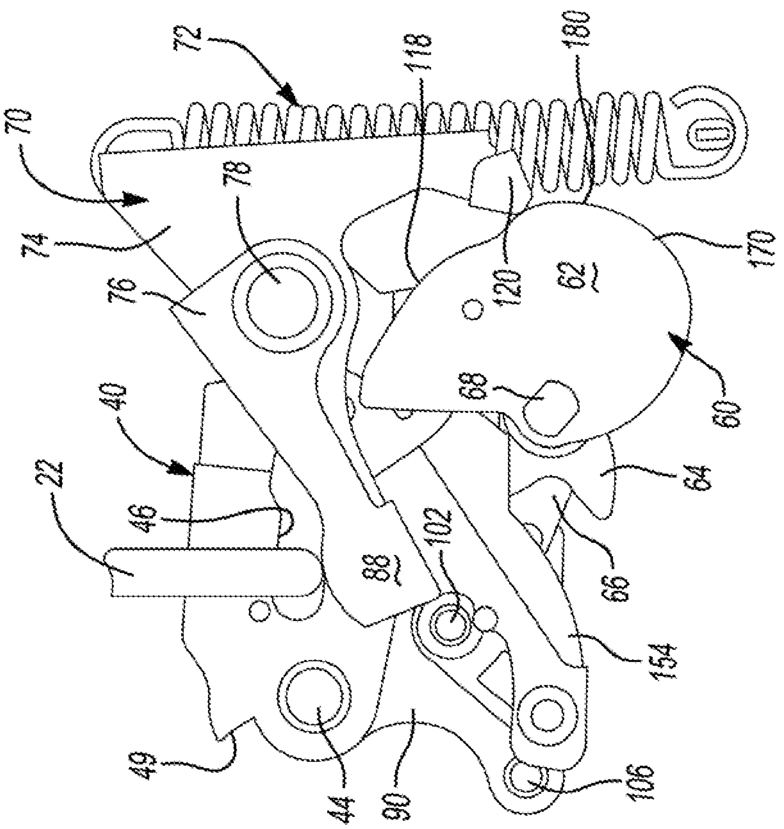
Figure 17B:
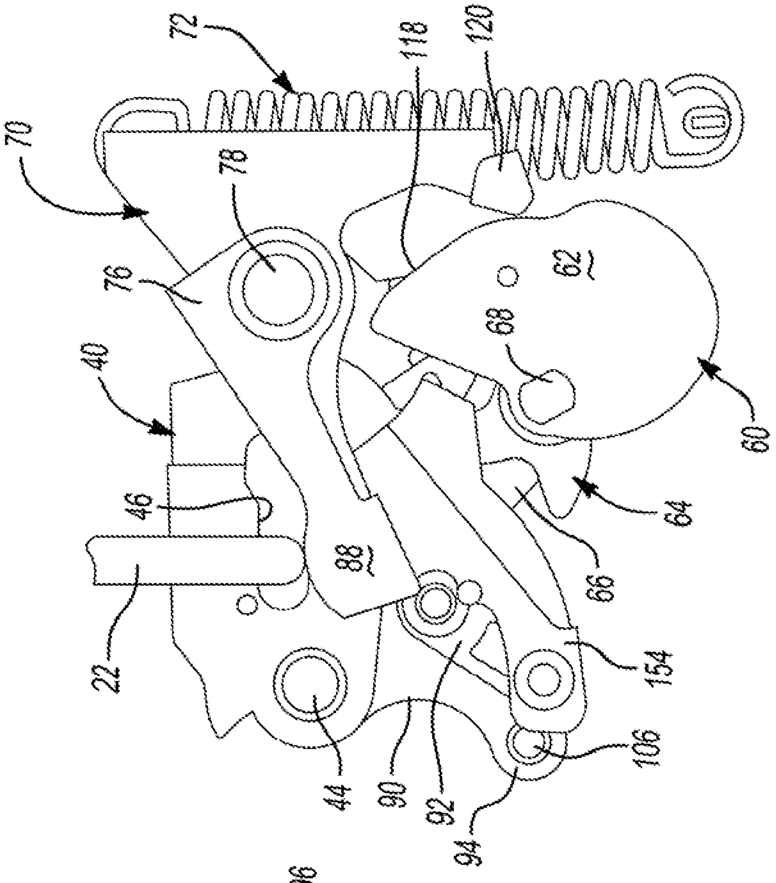
Figure 17A:
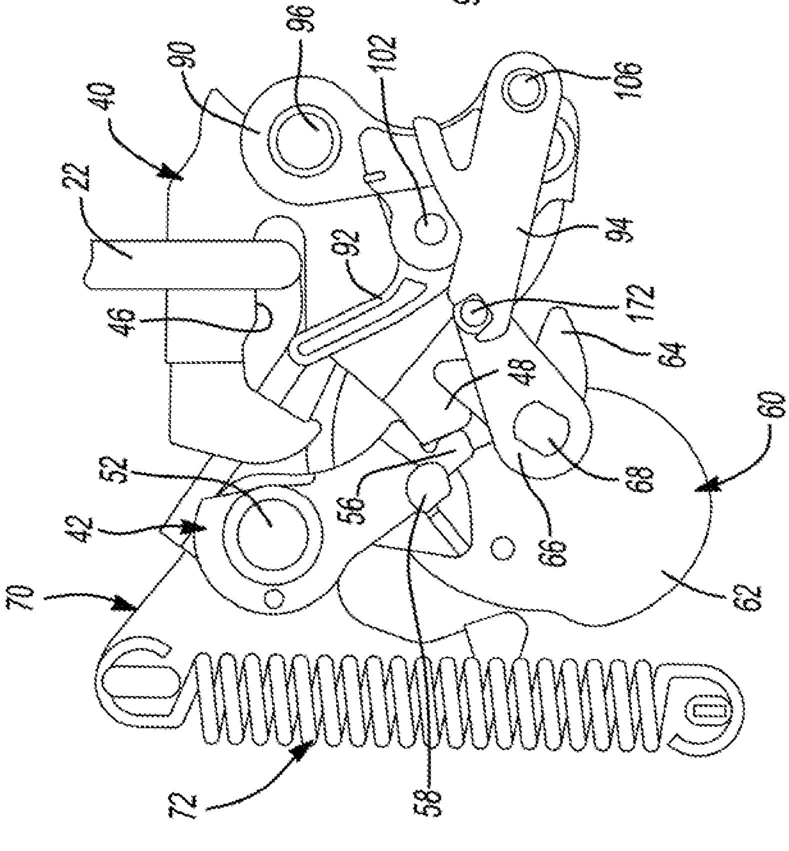
Figure 18B:
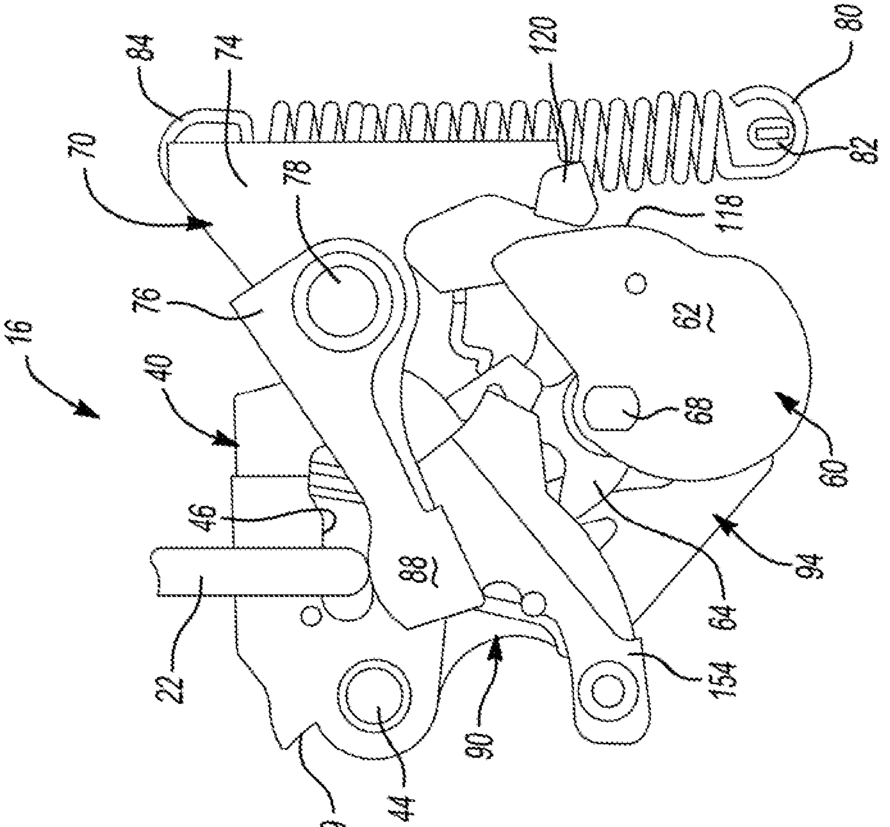
Figure 18A:
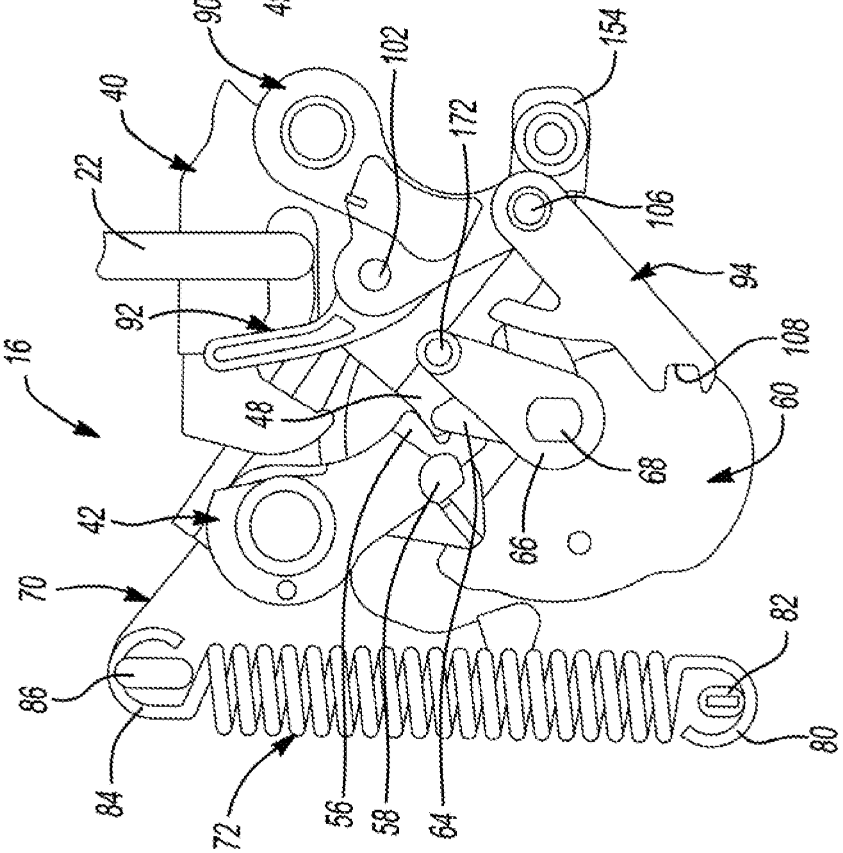
Figures 19A, 19B:
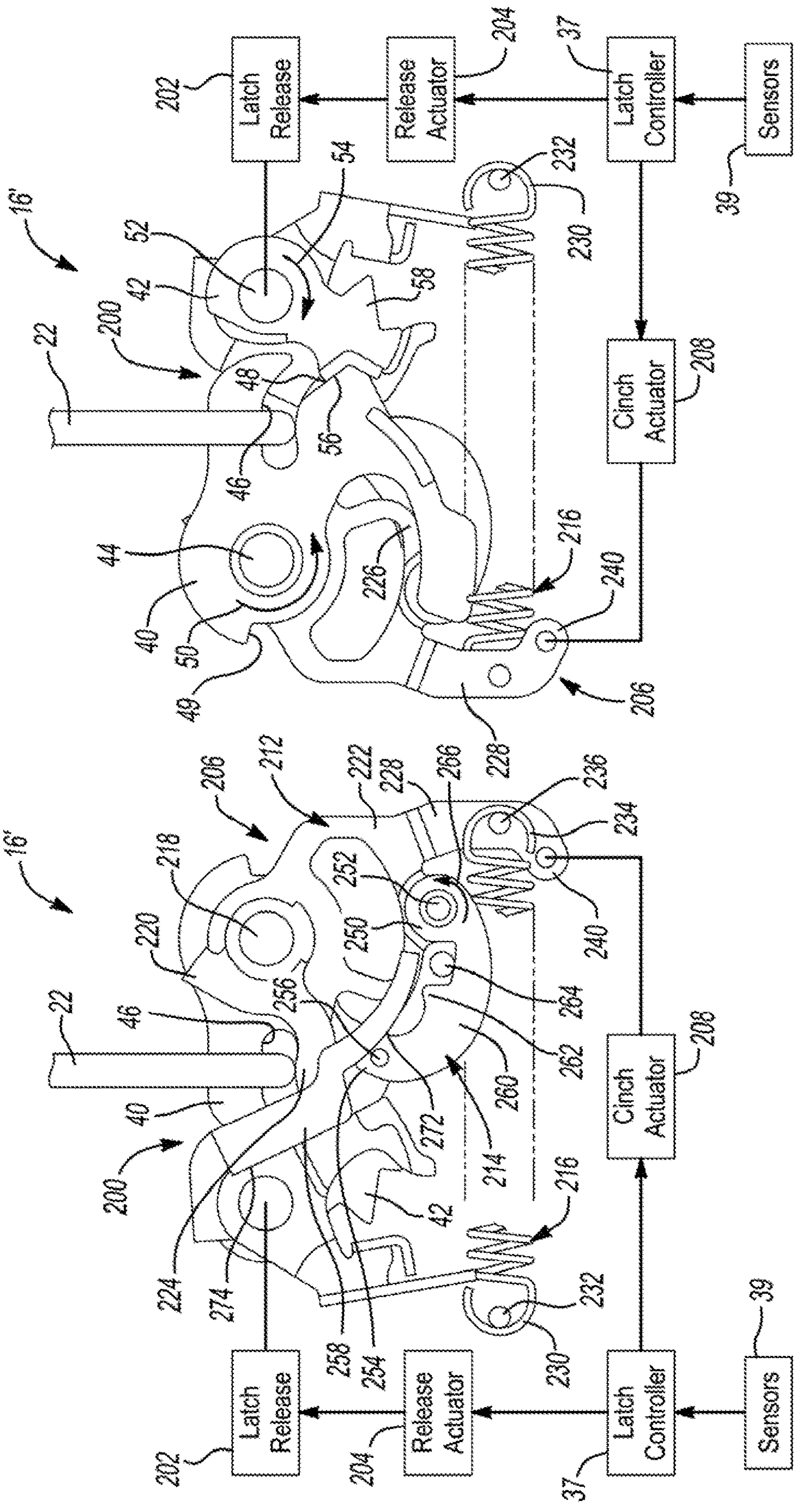
Figure 20B:
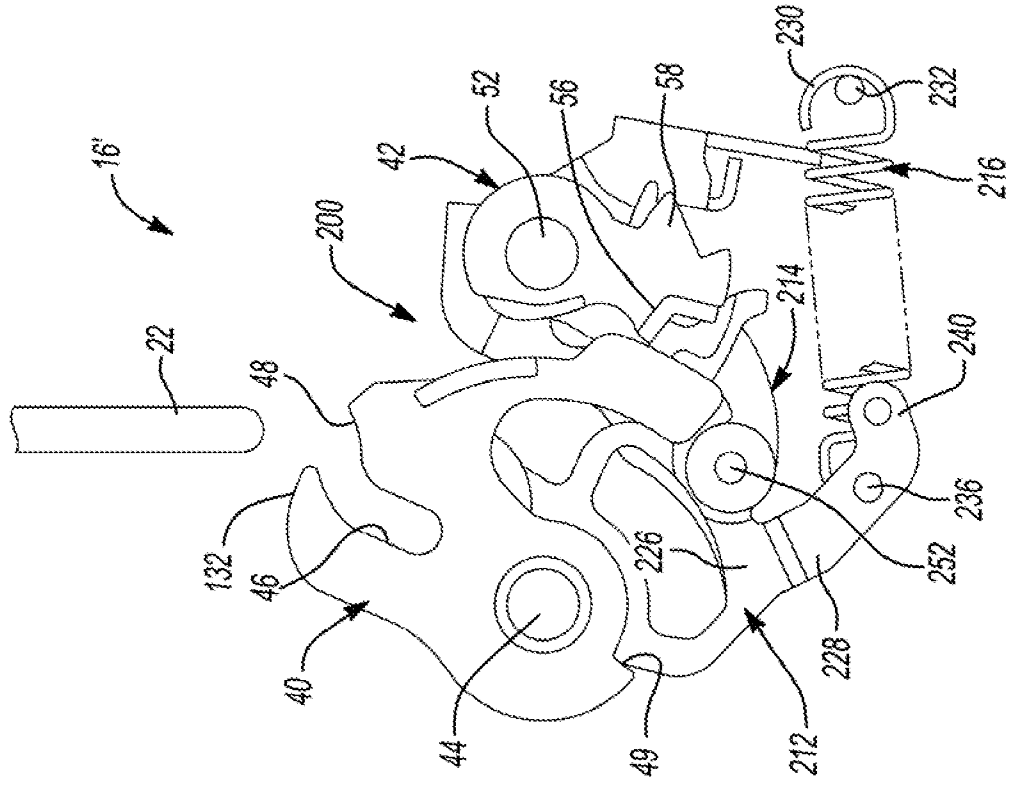
Figure 20A:
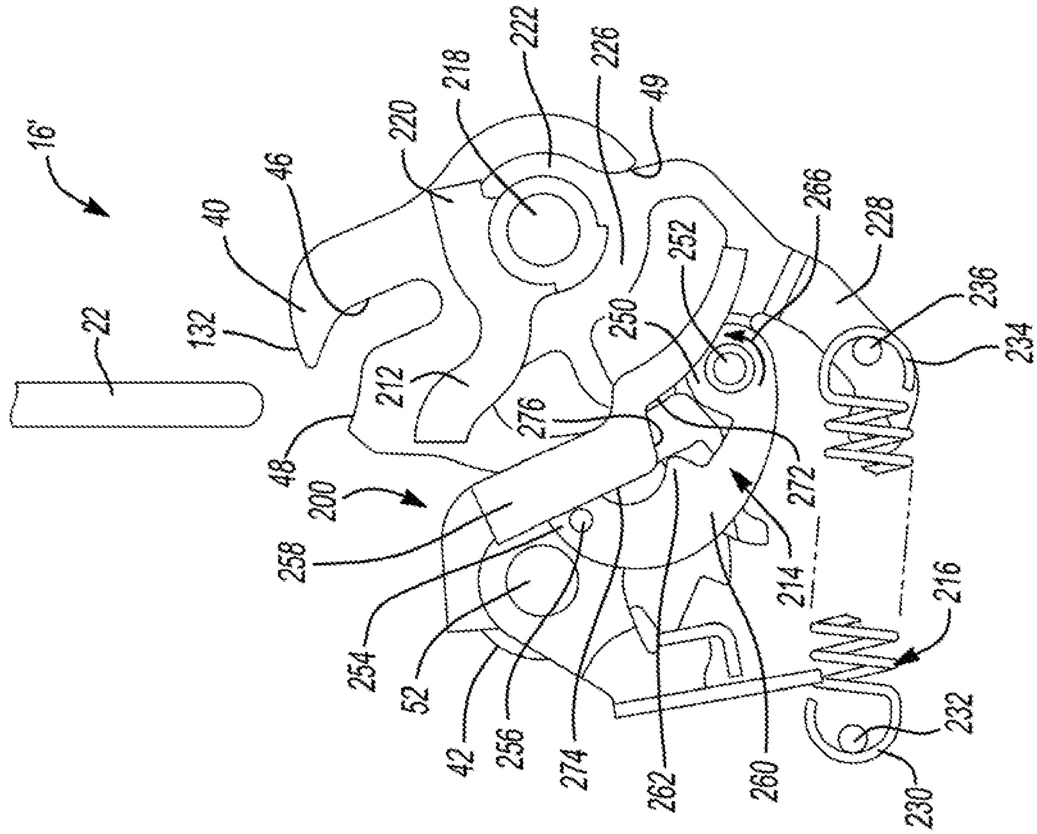
Figure 21B:
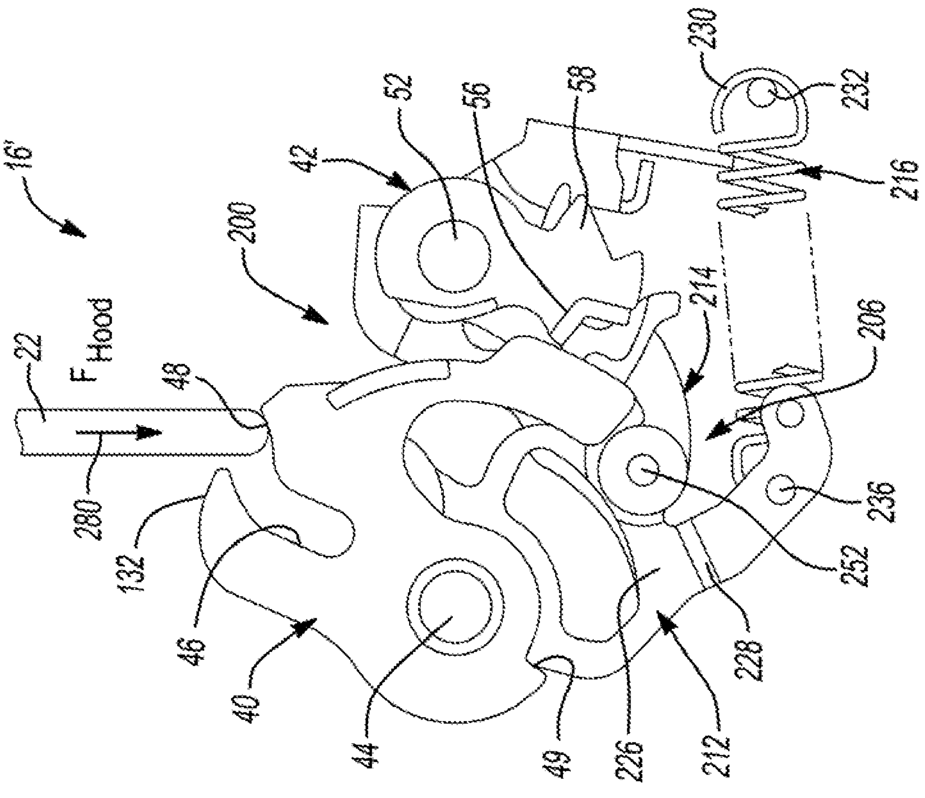
Figure 21A:
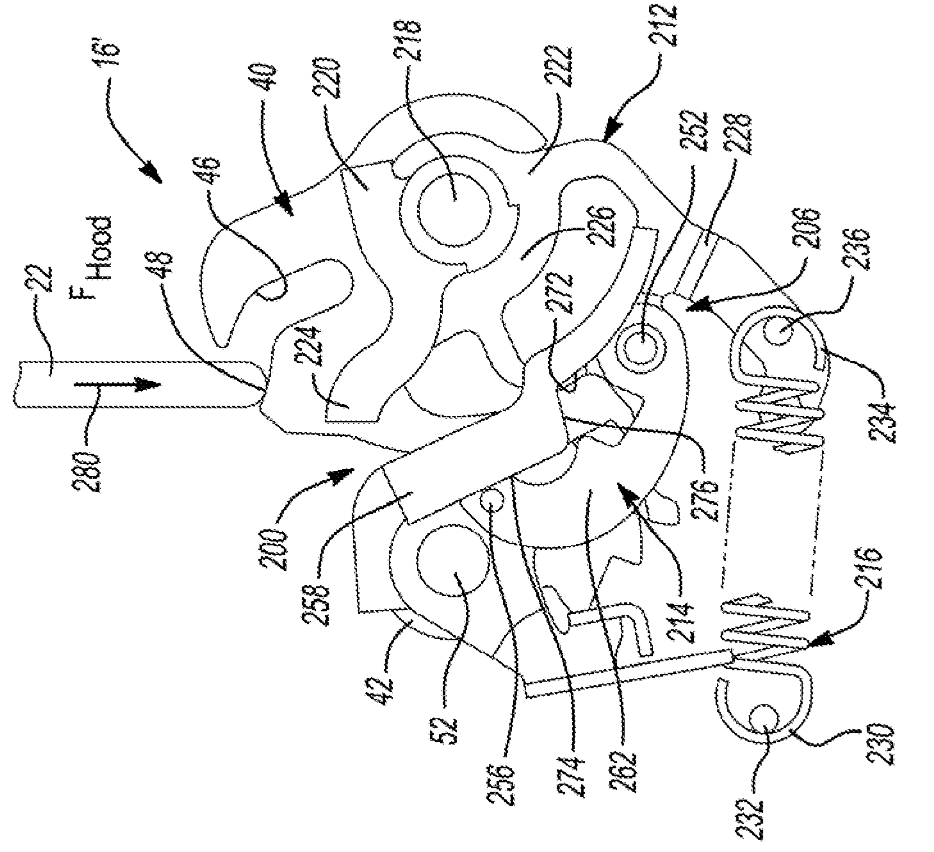
Figure 22B:
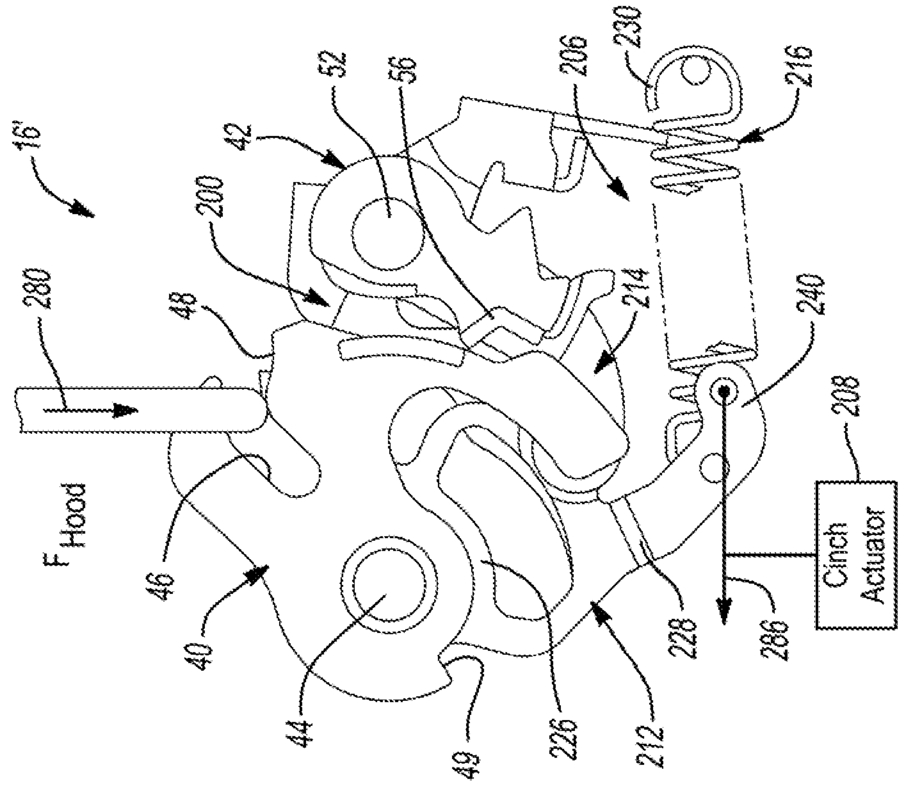
Figure 22A:
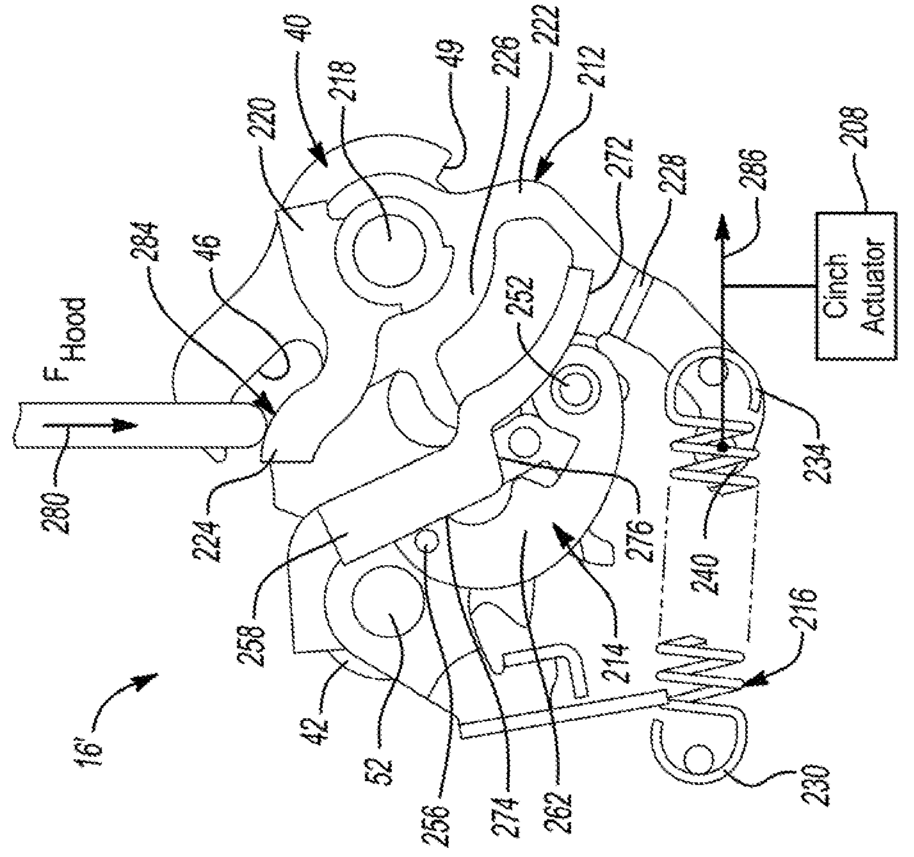
Figure 23B:
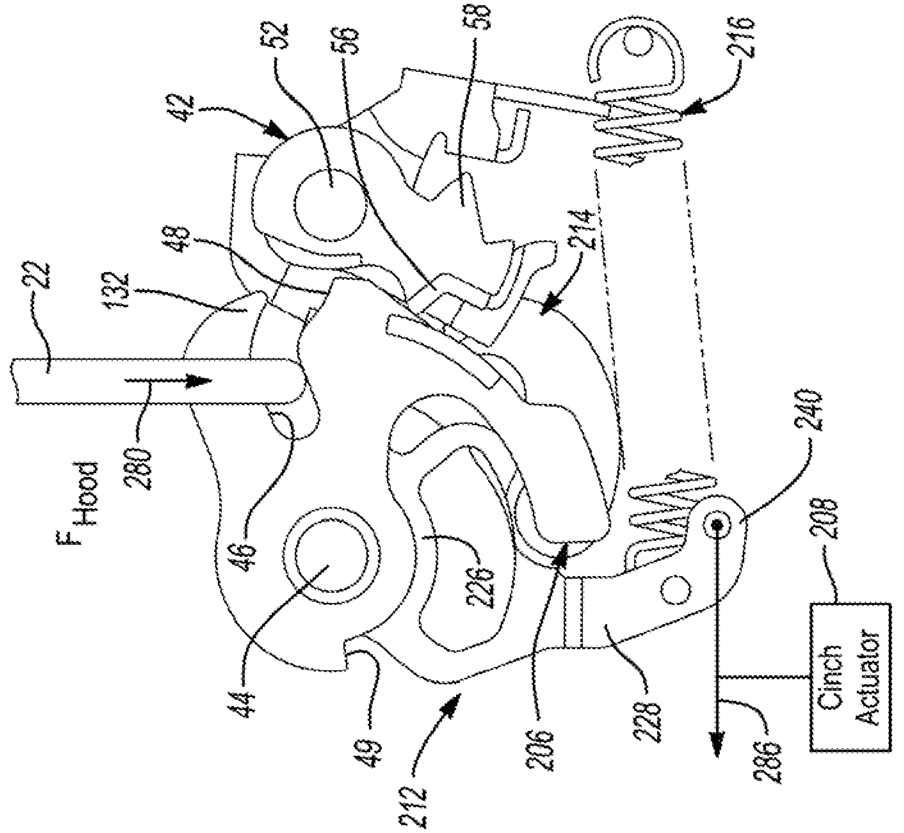
Figure 23A:
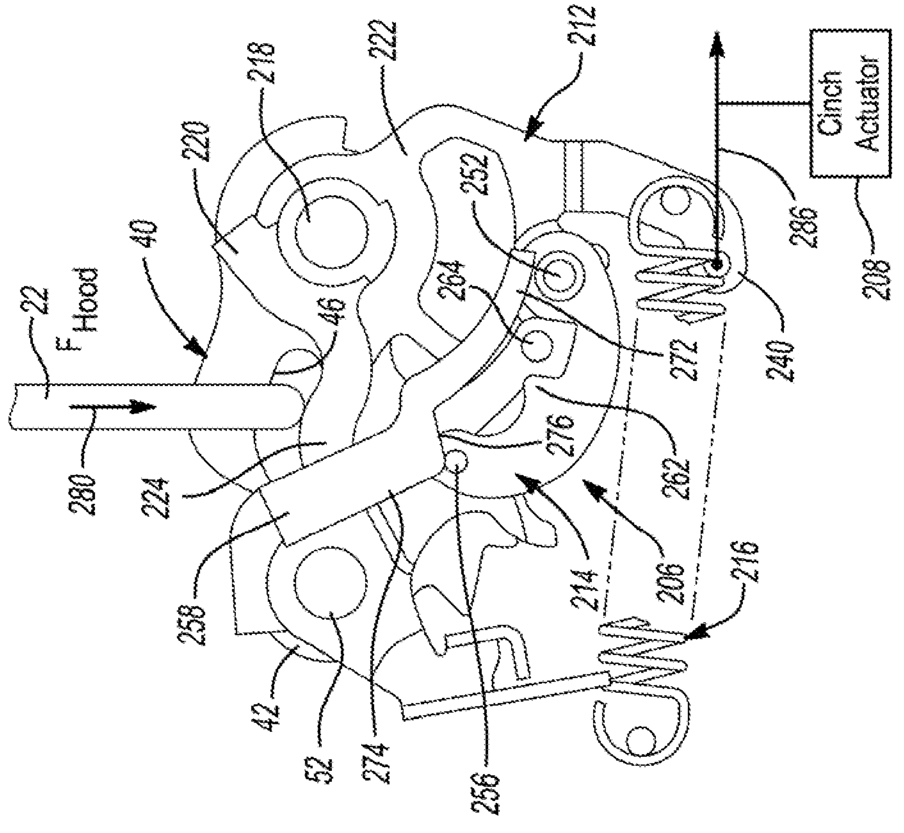
Figure 24A:
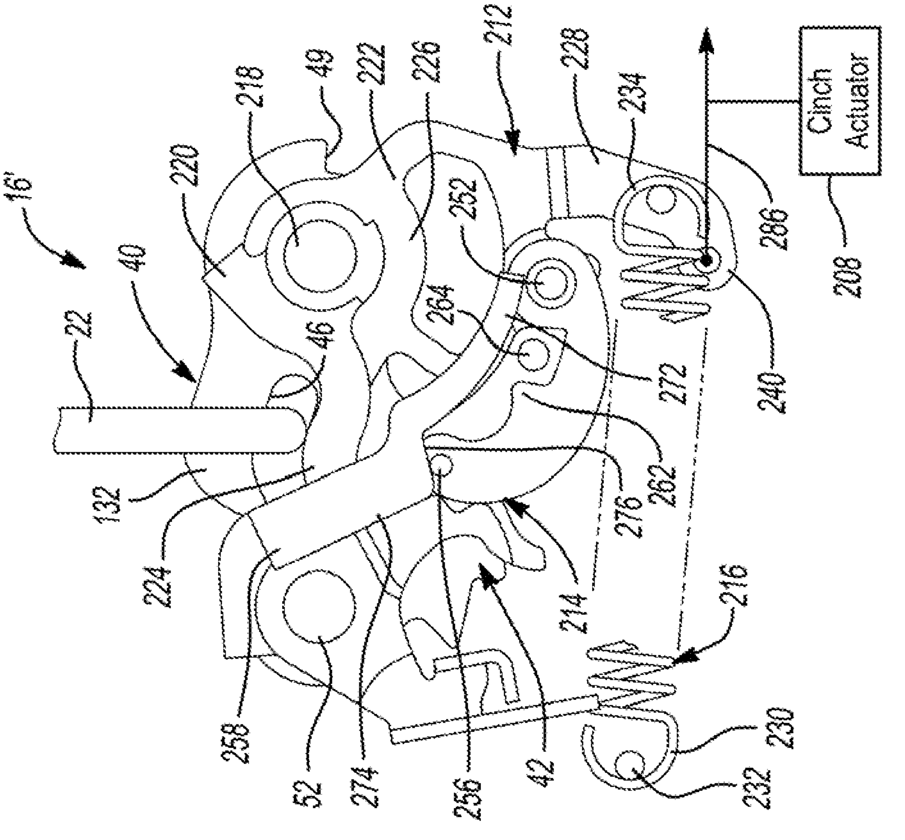
Figure 24B:
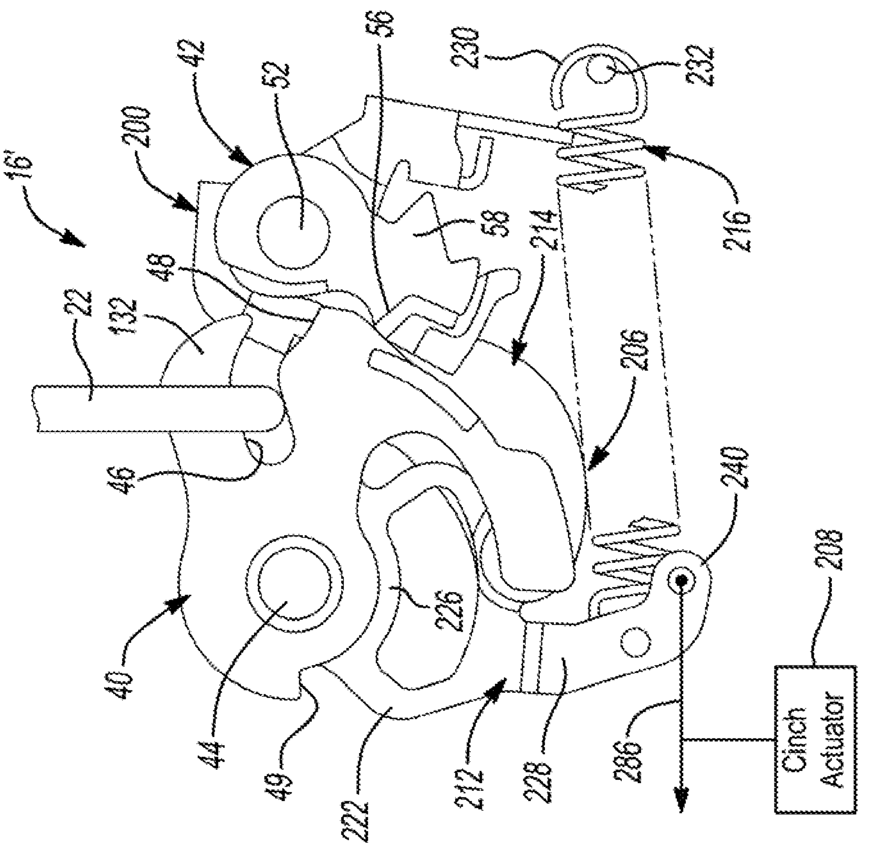
Figure 25A:
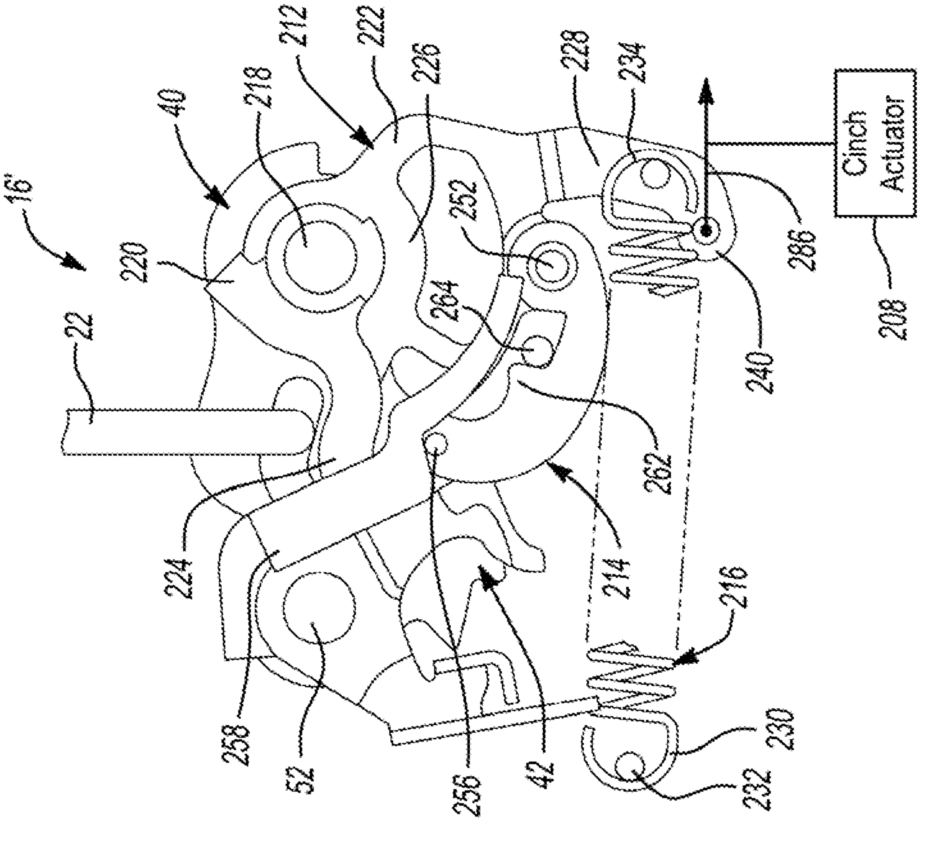
Figure 25B:
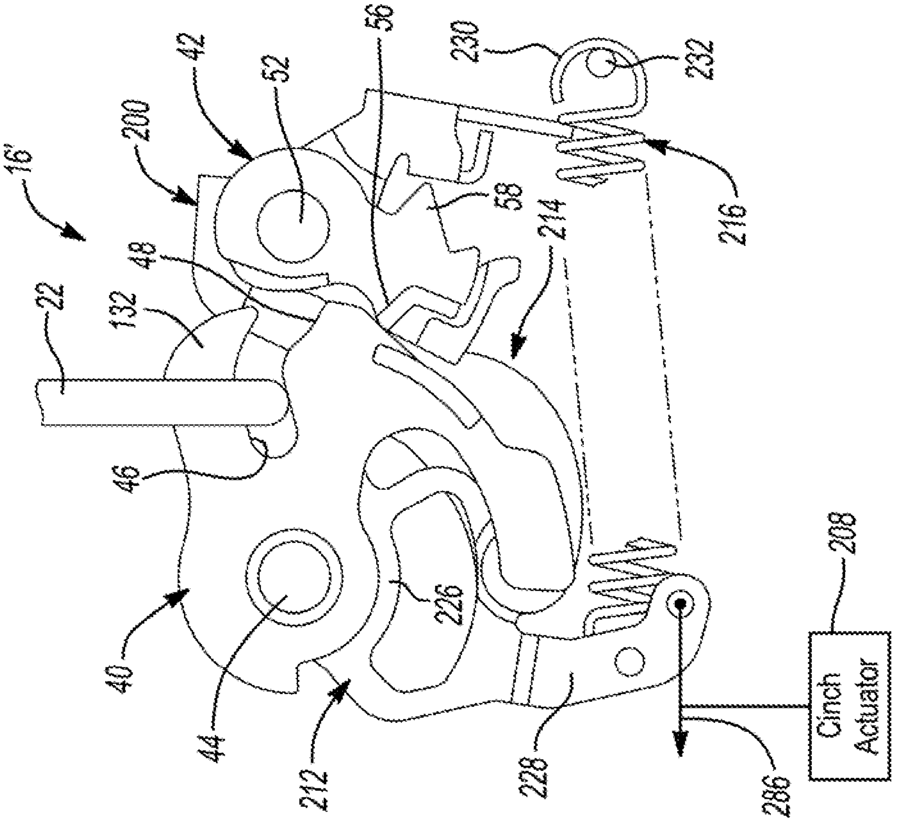
Figures 26A, 26B:
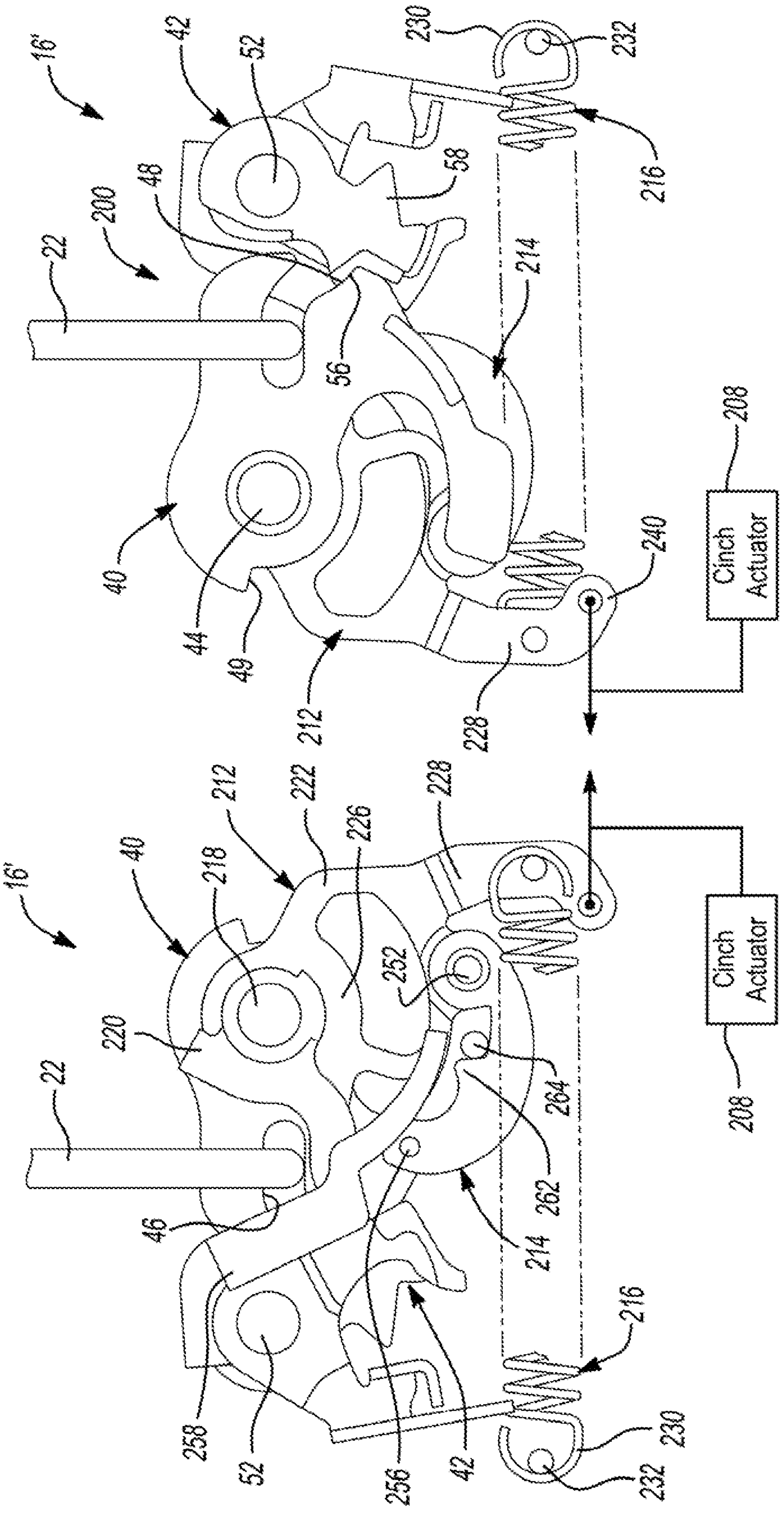
Figure 27B:
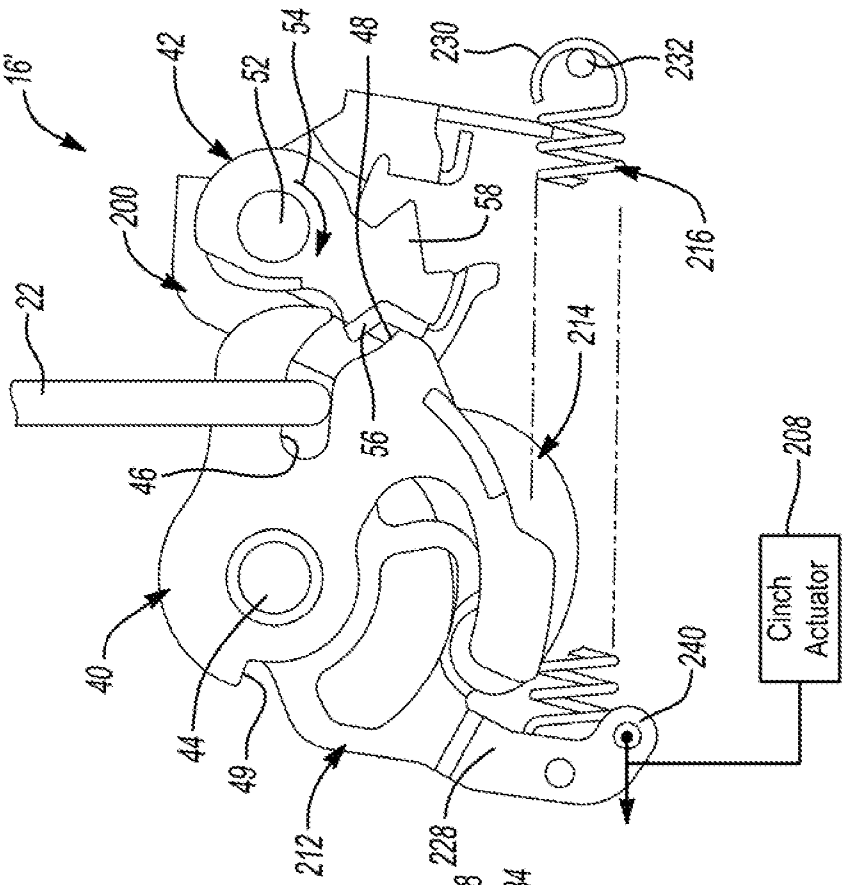
Figure 27A:
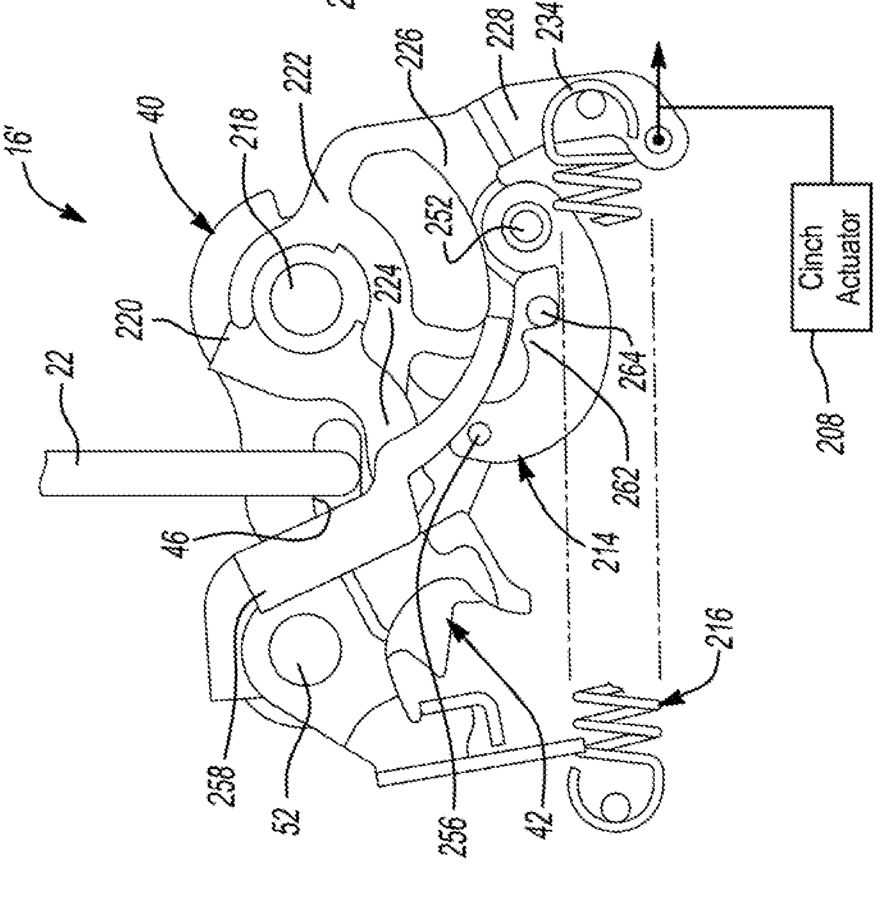
Figure 28B:
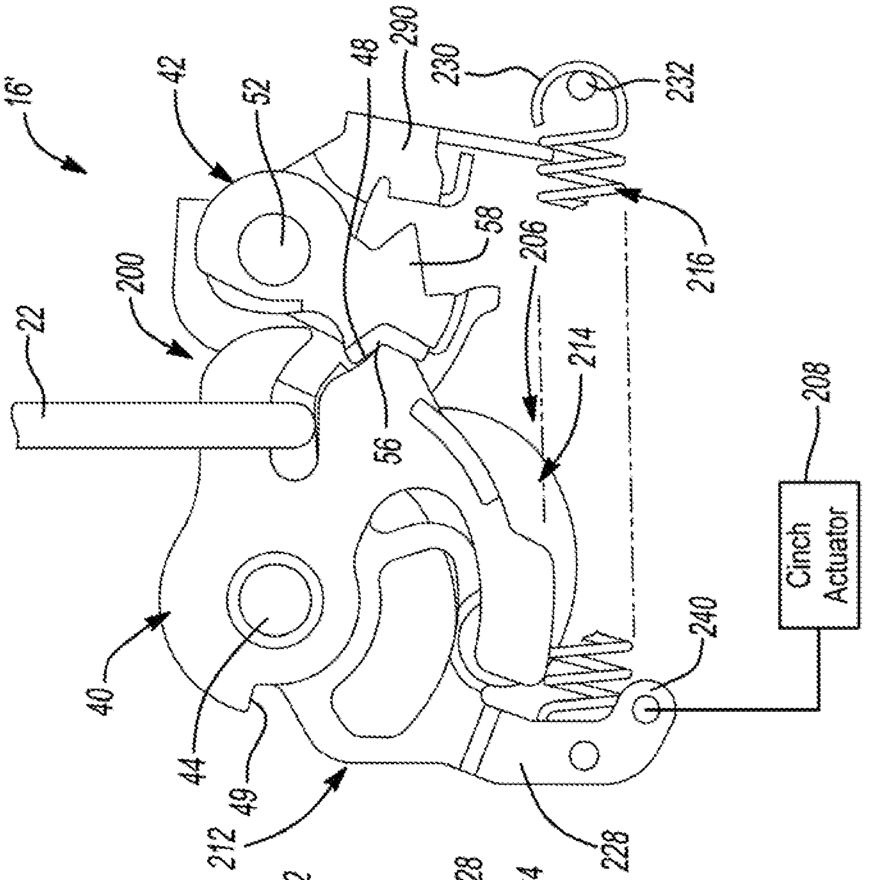
Figure 28A:
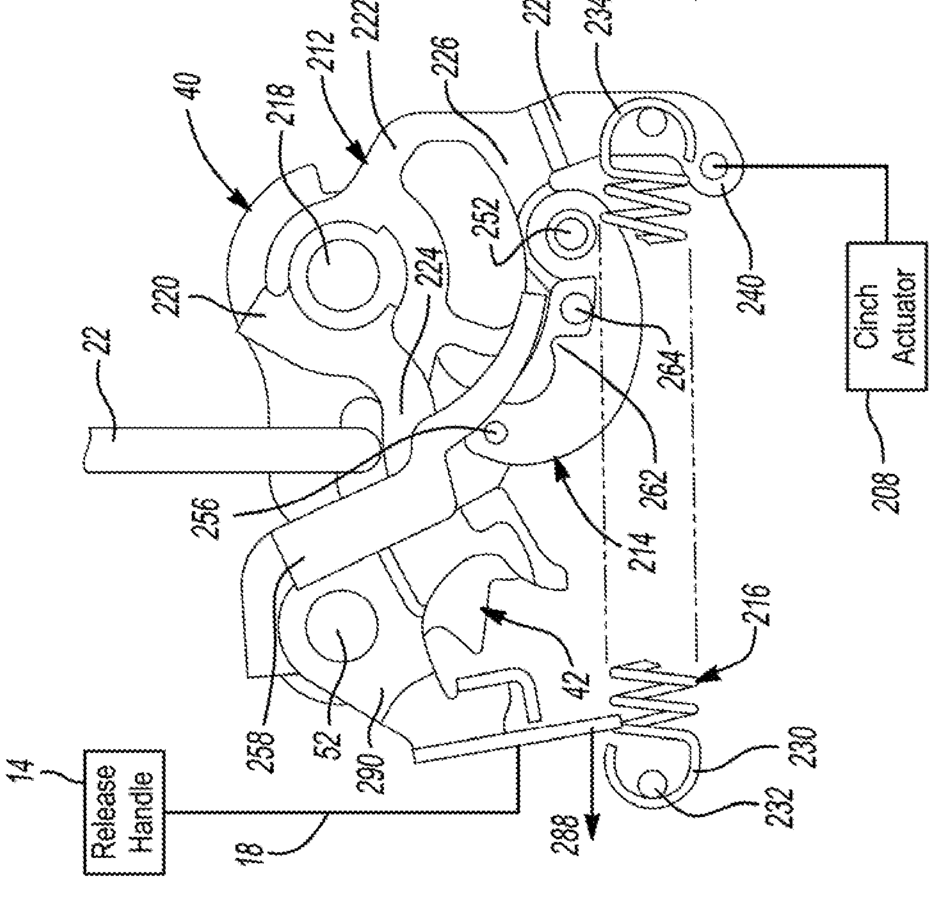
Figure 29:
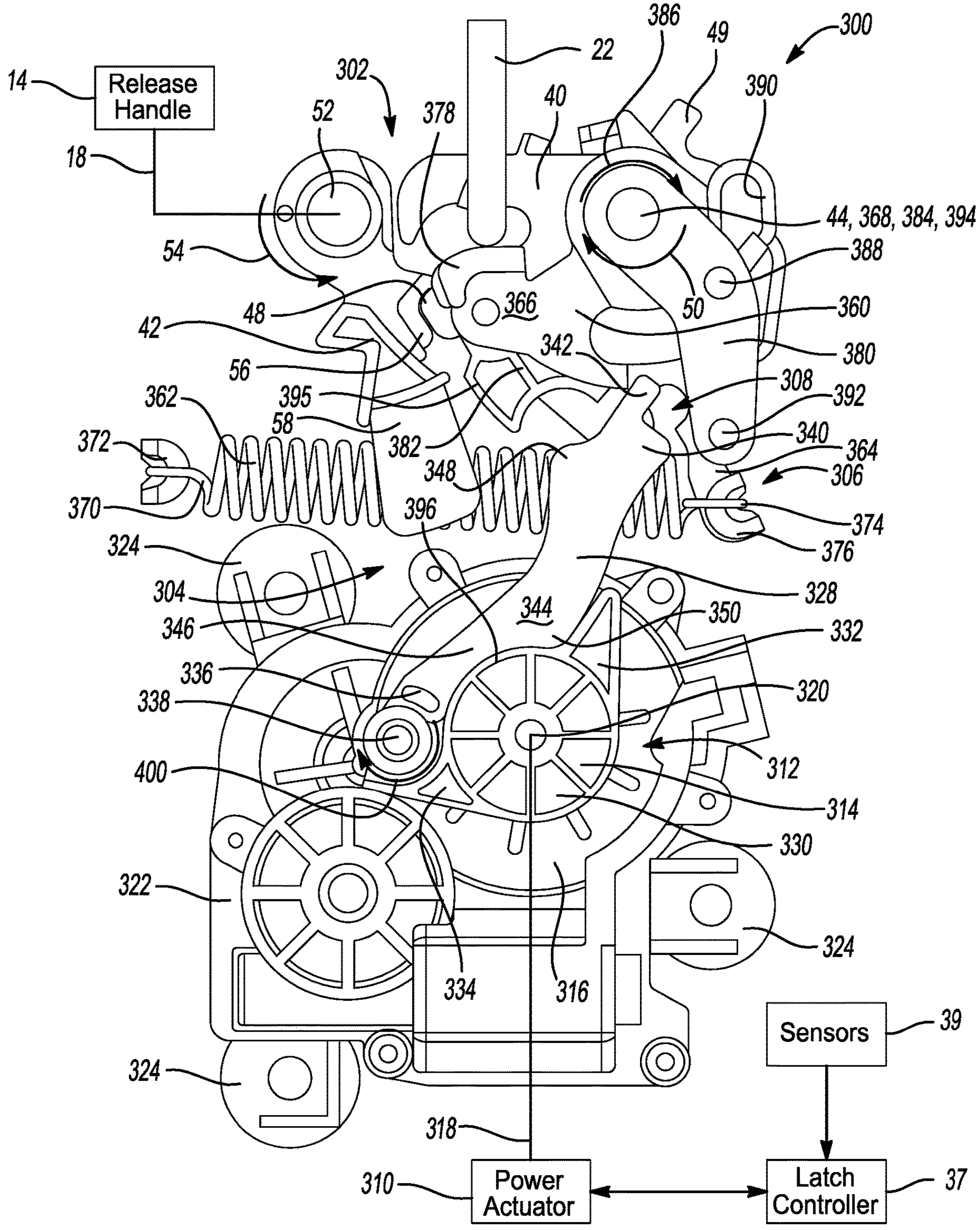
Figure 30A:
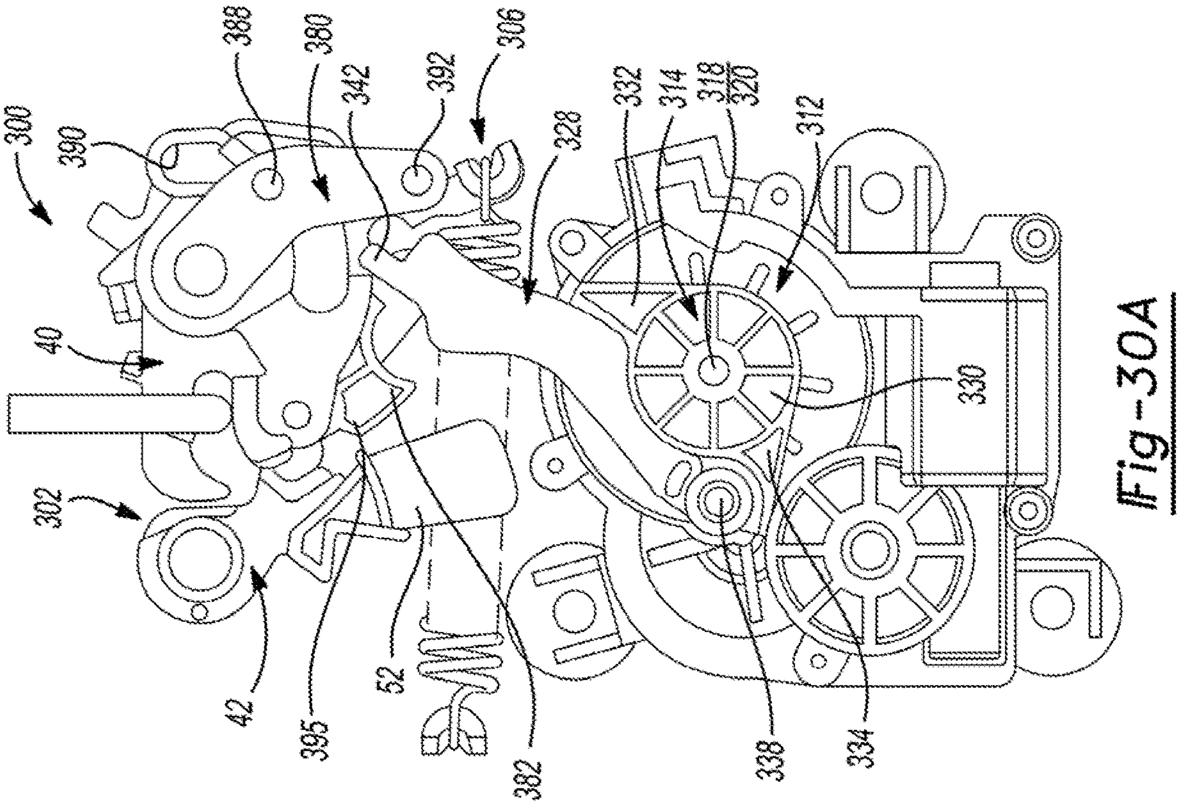
Figure 30B:
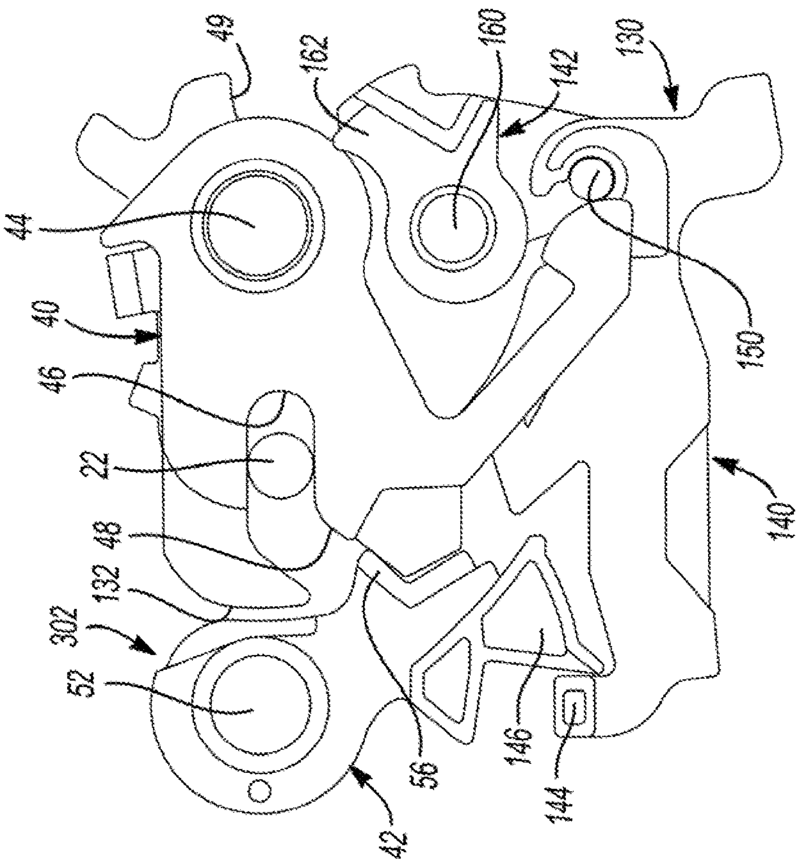
Figure 31B:
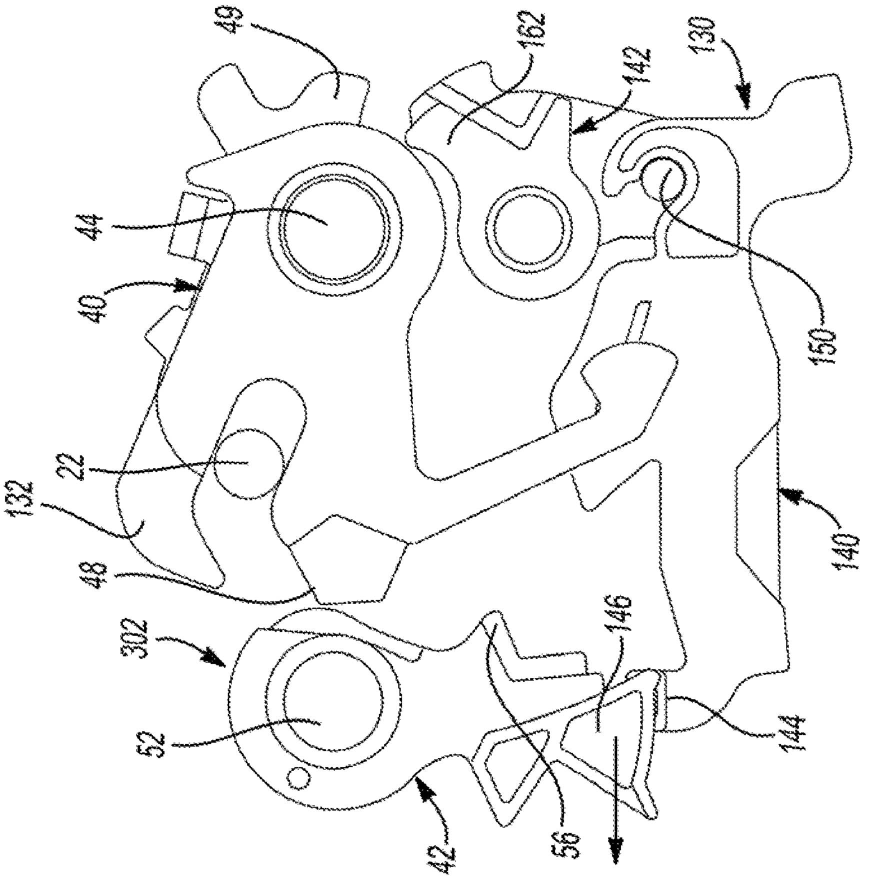
Figure 31A:
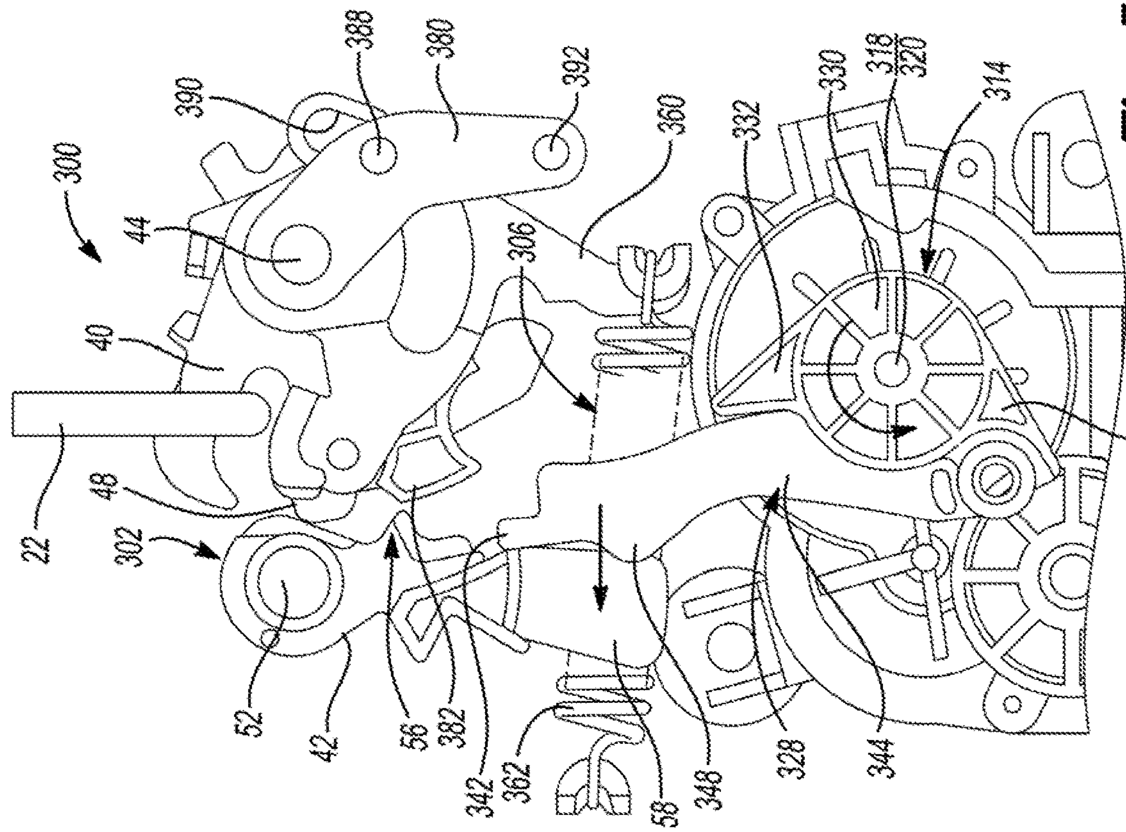
Figure 32B:
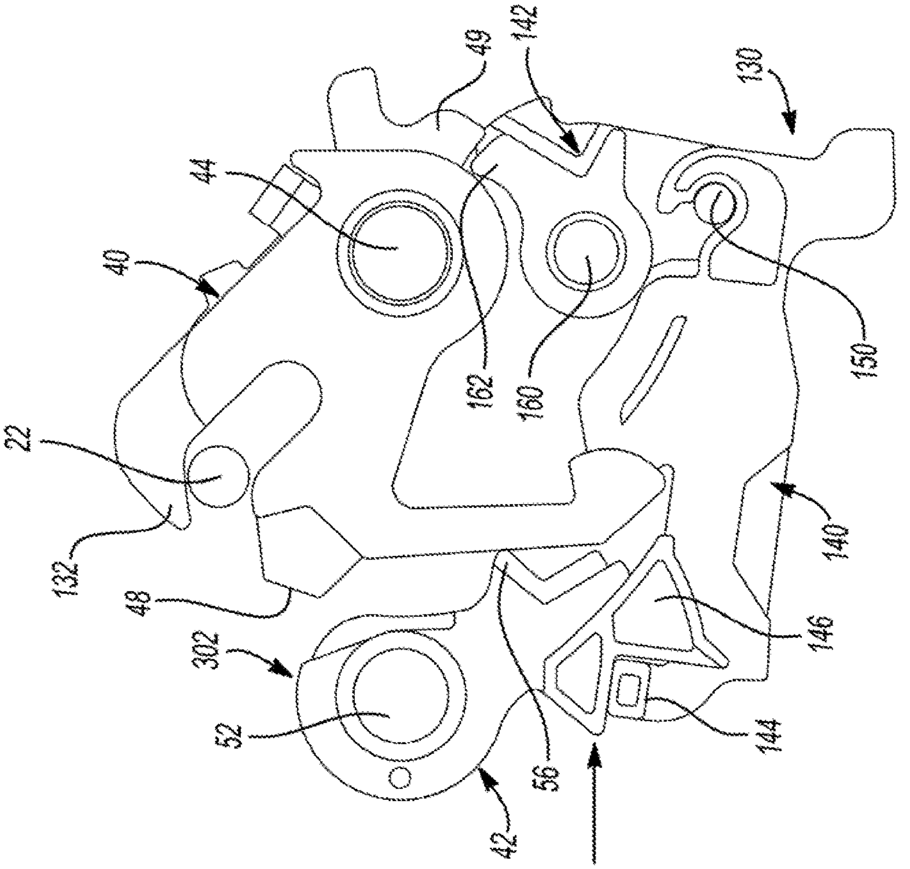
Figure 32A:
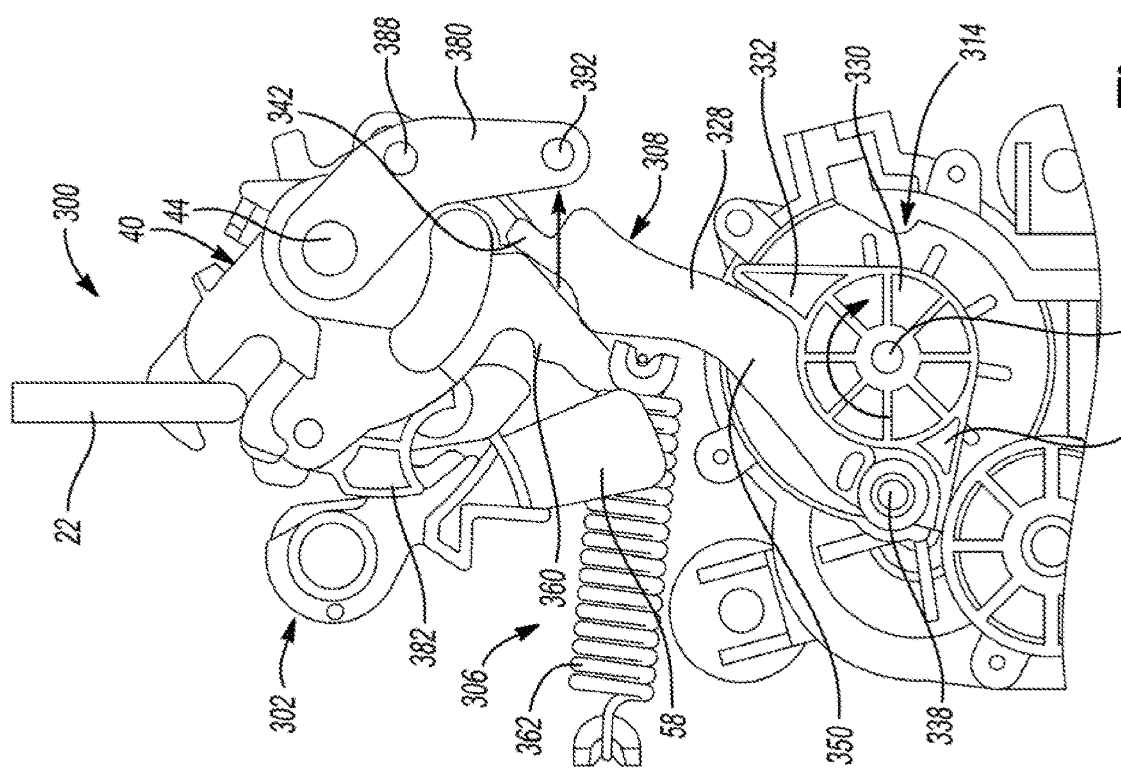
Figure 33B:
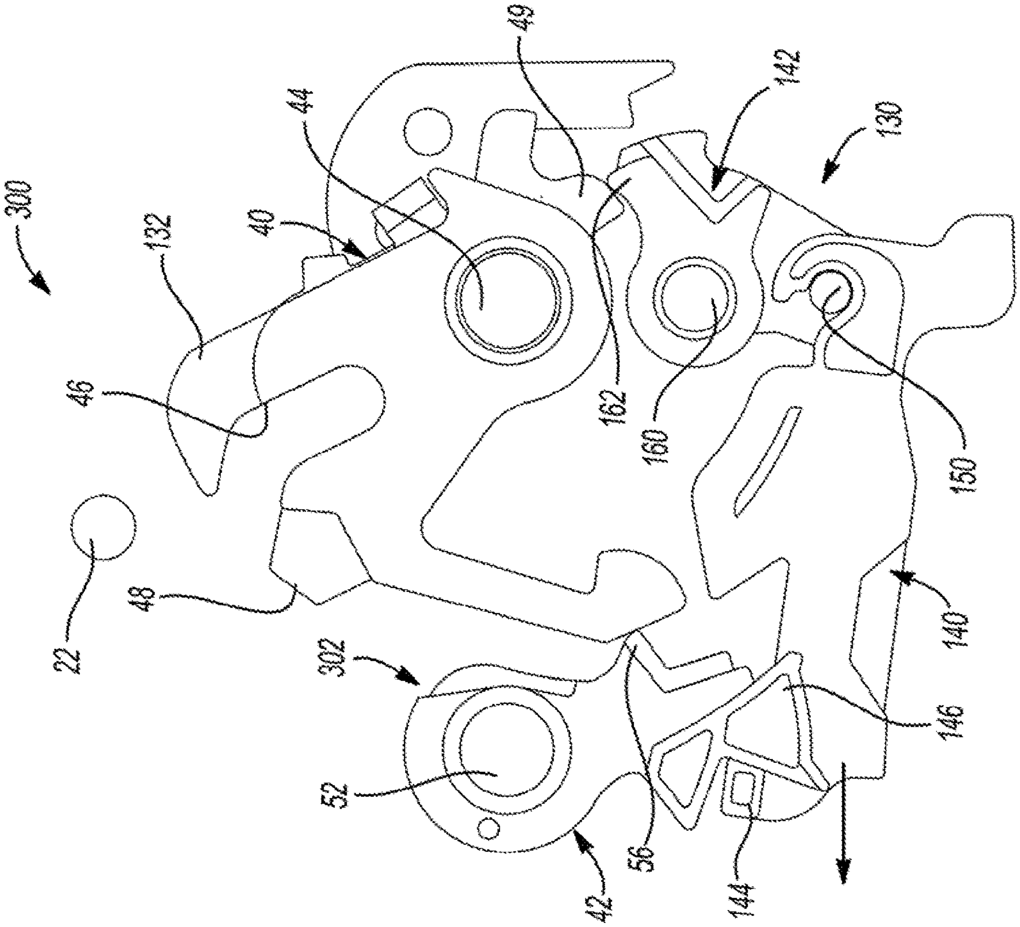
Figure 33A:
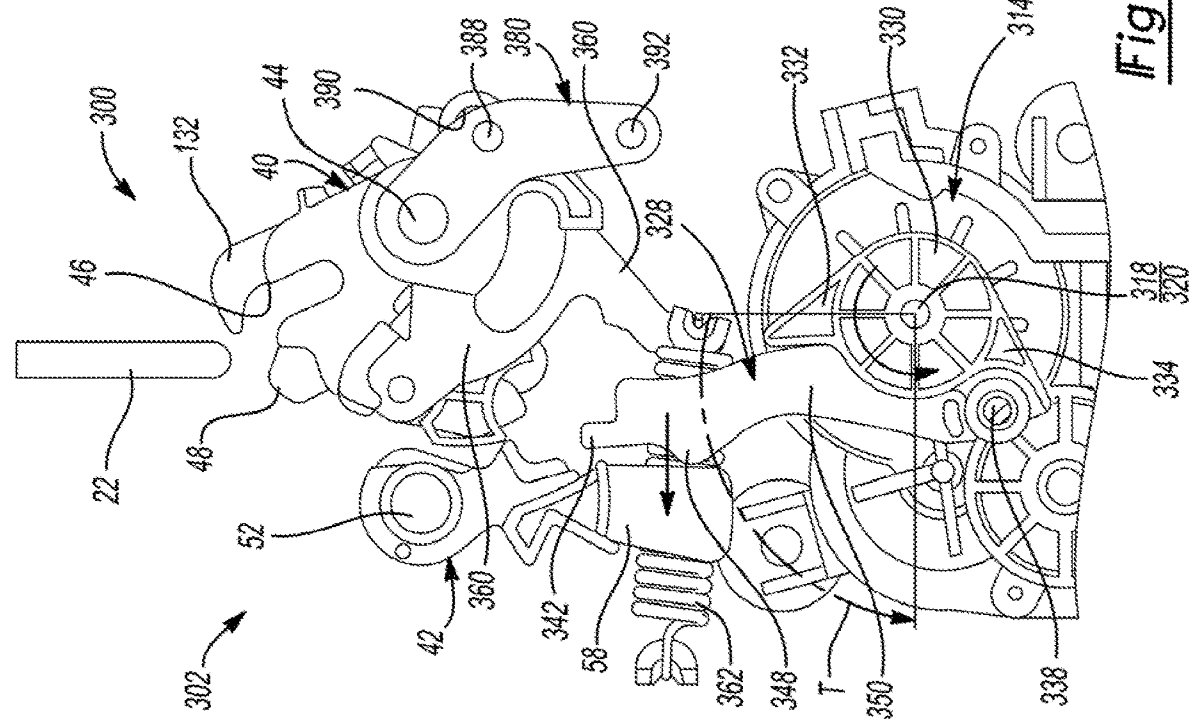
Figure 34B:
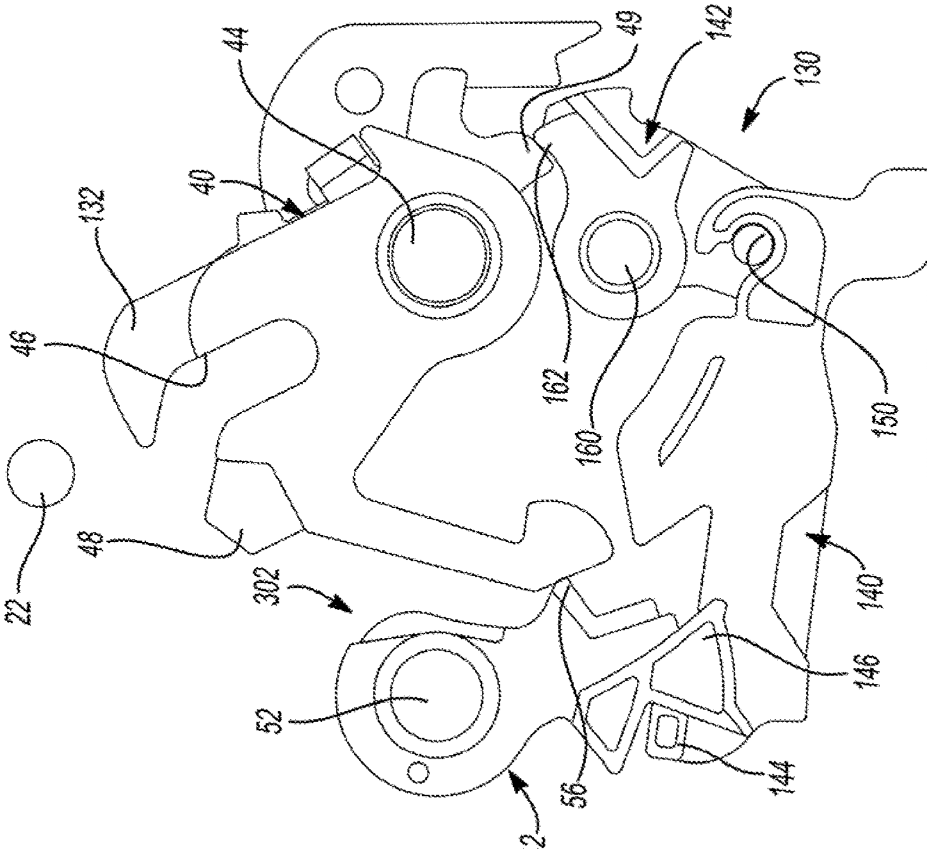
Figure 34A:
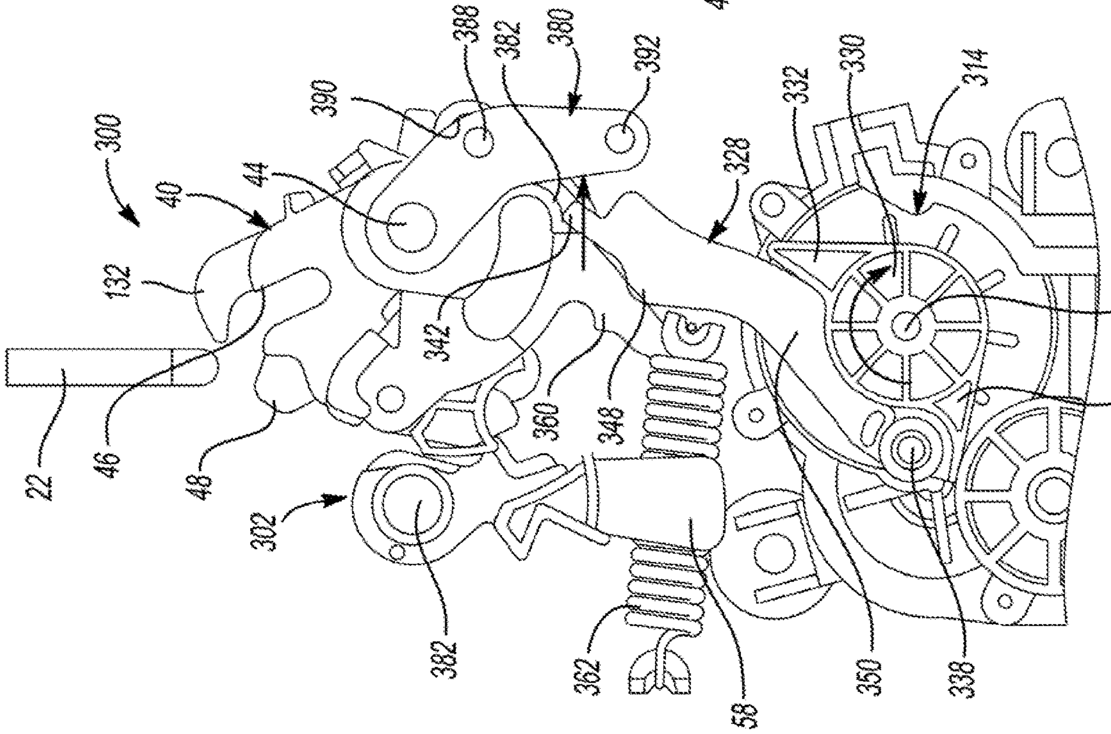
Figure 35B:
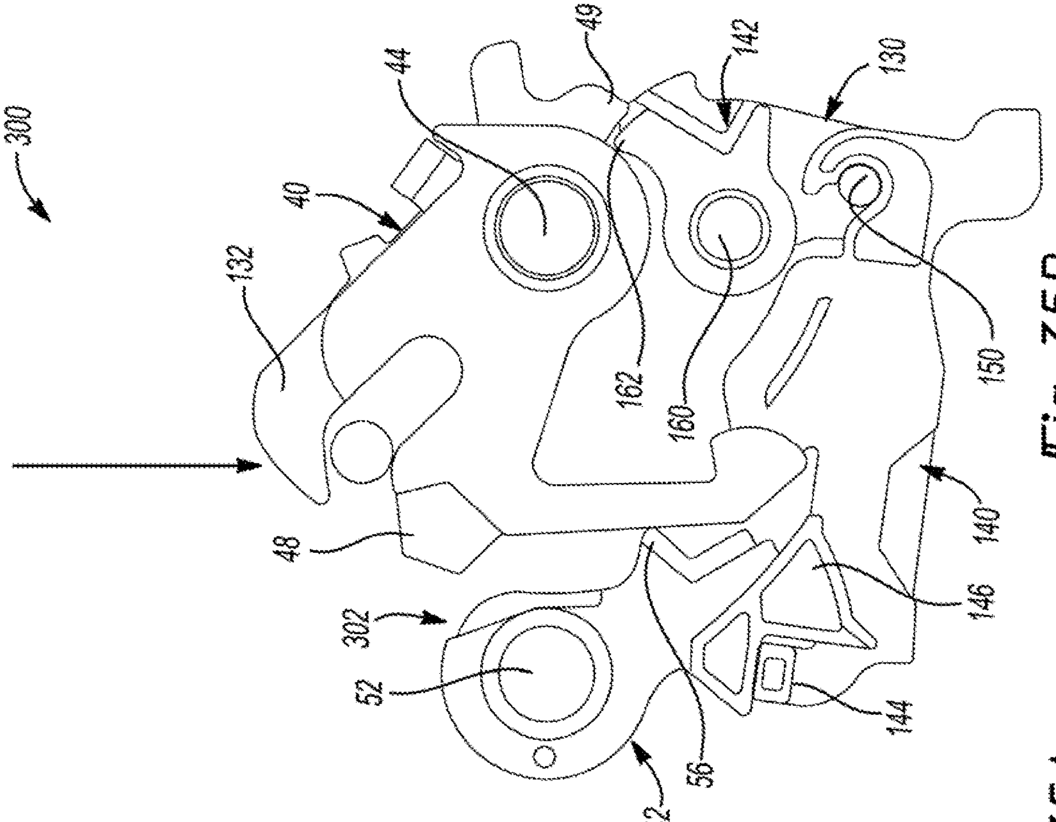
Figure 35A:
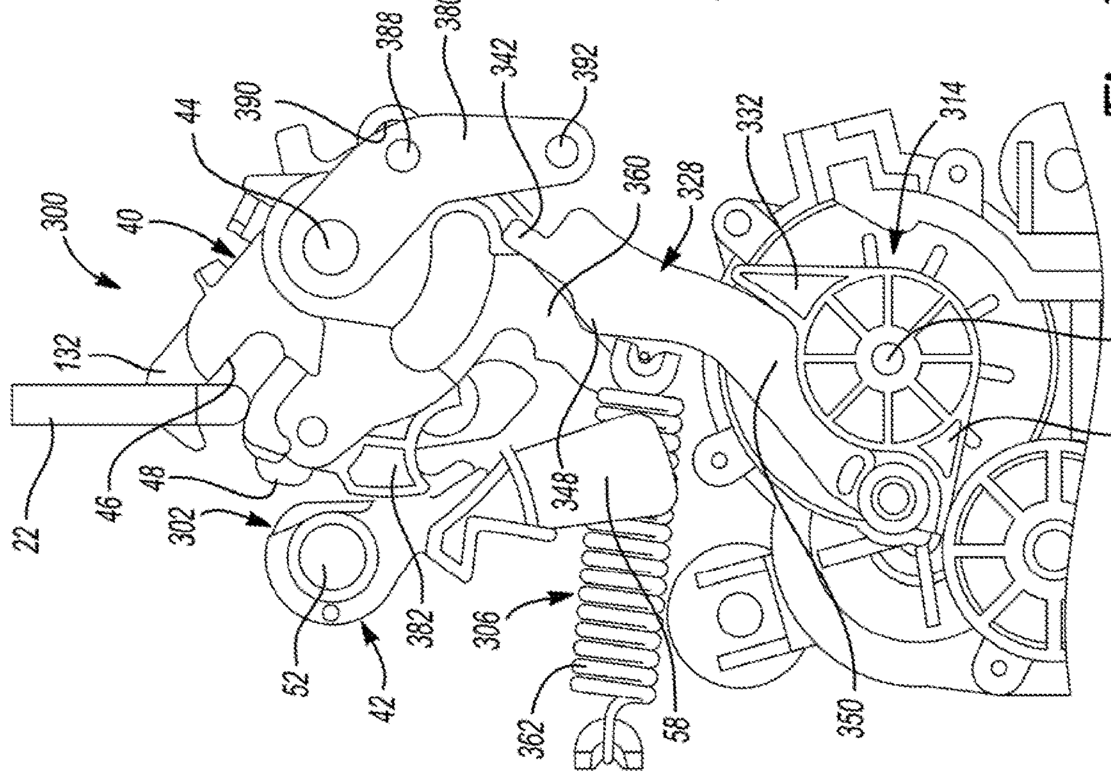
Figure 36:
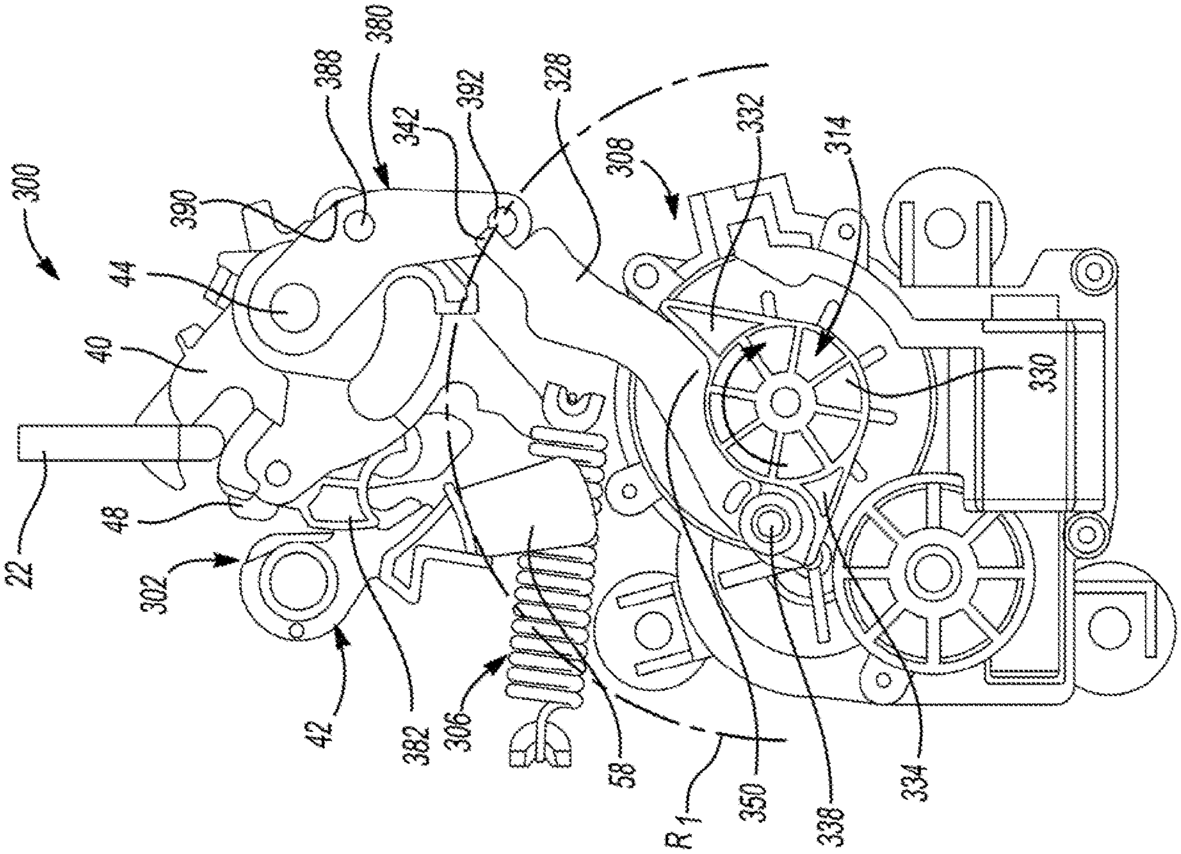
Figure 37:
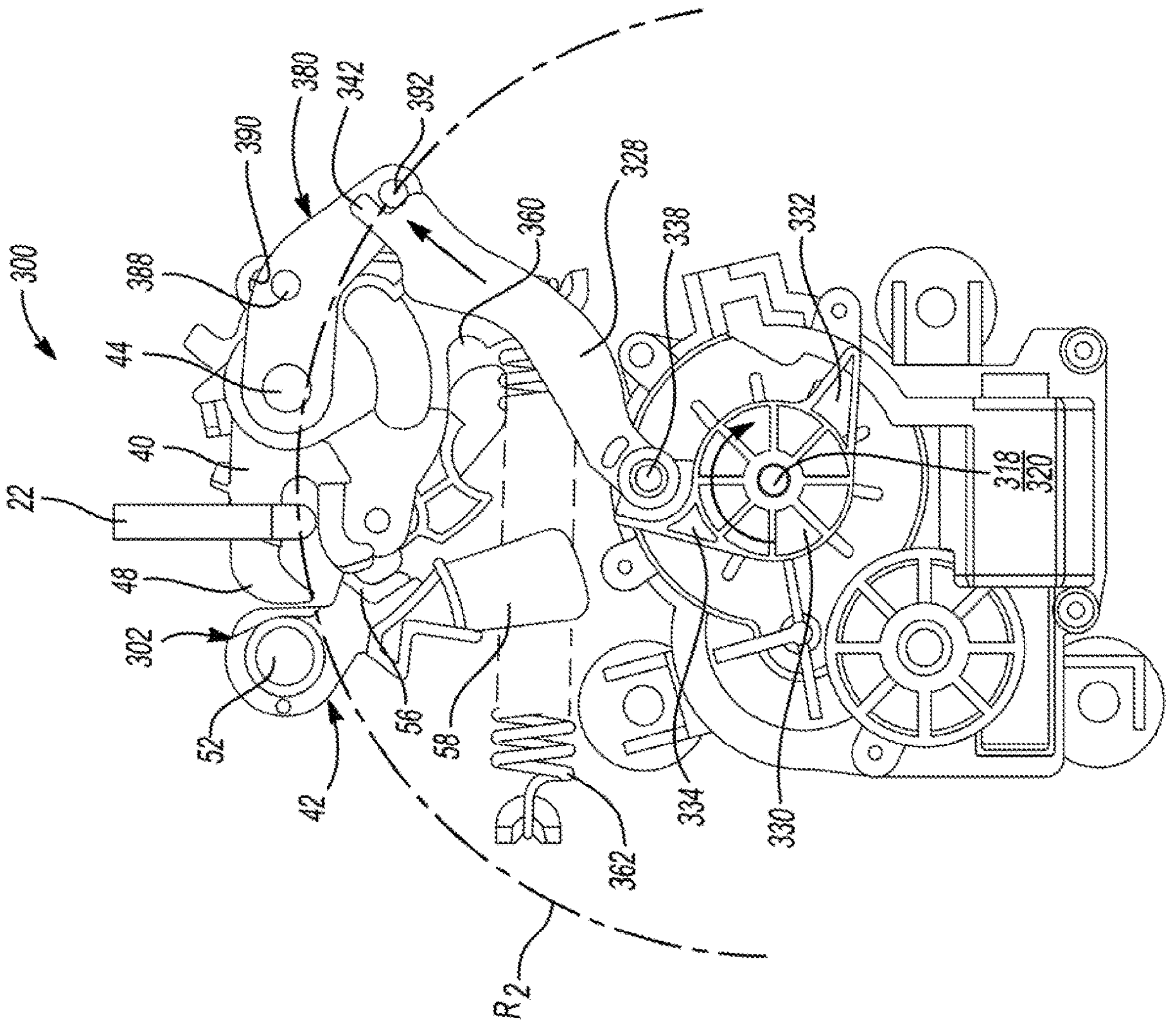
Figure 39:
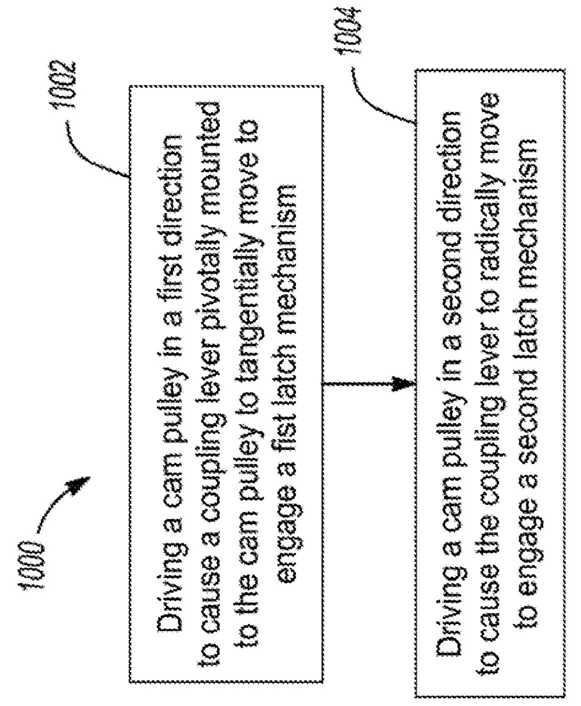
Figure 38:
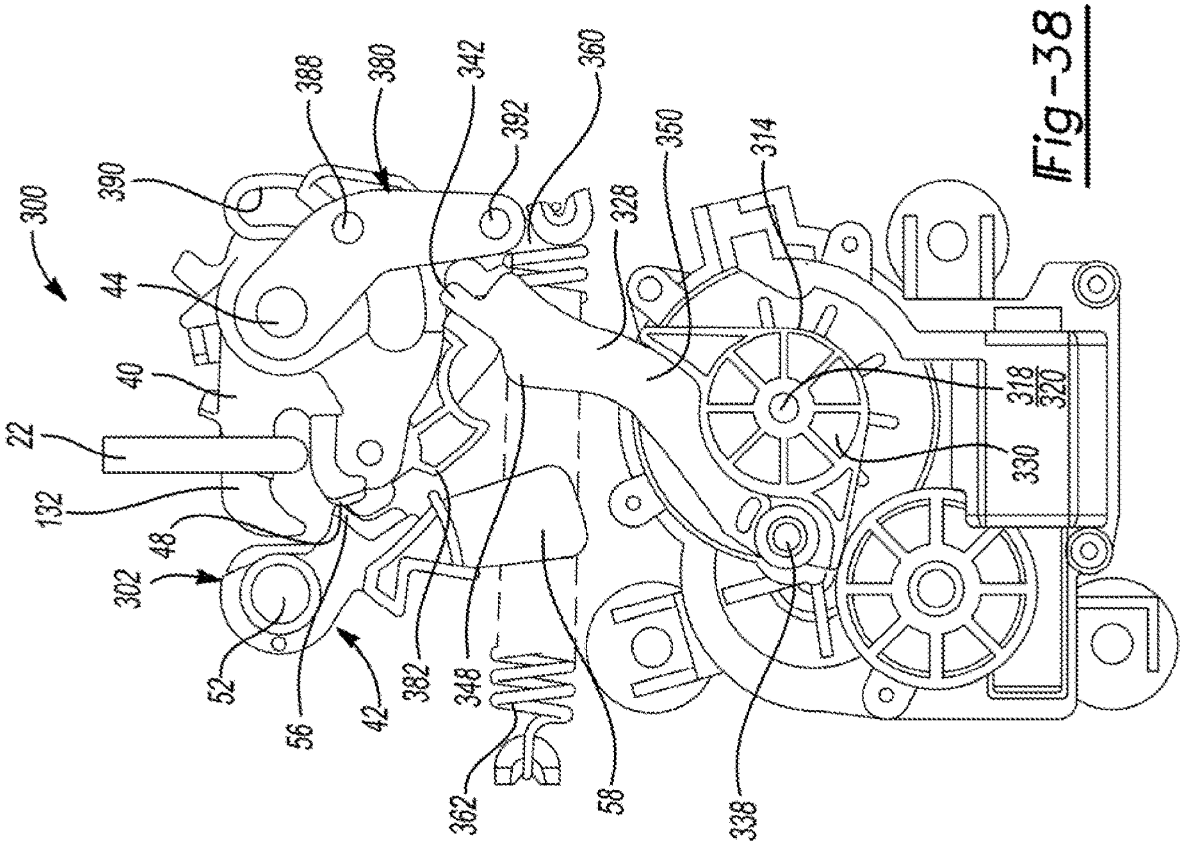

FIGS. 7A and 7B are generally similar to FIGS. 6A and 6B, respectively, but illustrate continued actuation of the latch release mechanism results in the spring-loaded lift mechanism being shifted from a spring-loaded state into a spring-released state for causing the decklid to move from its fully-closed position into a partially-opened or "pop-up" position relative to the structural body portion of the vehicle;

FIGS. 8A and 8B are generally similar to FIGS. 7A and 7B, respectively, but illustrate continued actuation of the latch release mechanism causing release of the safety latch mechanism to subsequently permit manual movement of the decklid from its pop-up position into a fully-opened position relative to the structural body portion of the vehicle, and FIG. 8C illustrates the components of the safety latch mechanism interacting with the latch mechanism;

FIGS. 9A and 9B are front and rear plan views of the closure latch assembly showing initiation of a first (i.e. "non-driven") cinching stage of a dual-stage decklid cinch operation following manual movement of the decklid from its fully-open position to its pop-up position;

FIGS. 10A and 10B are generally similar to FIGS. 9A and 9B, respectively, but illustrate movement of the various components of the closure latch assembly caused by movement of the decklid under its own weight from its pop-up position toward a cinched position during continuation of the first cinching stage;

FIGS. 11A and 11B are generally similar to FIGS. 10A and 10B, respectively, but illustrate the components of the closure latch assembly upon the decklid moving into its cinched position at the end of the first cinching stage;

FIGS. 12A and 12B are generally similar to FIGS. 11A and 11B, respectively, but illustrate initiation of a second (i.e. "driven") cinching stage of the dual-stage decklid cinch operation once the decklid is located in its cinched position;

FIGS. 13A and 13B are generally similar to FIGS. 12A and 12B, respectively, but illustrate continuation of the second cinching stage of the dual-stage decklid cinch operation for moving the decklid from its cinched position toward its fully-closed position;

FIGS. 14A and 14B are generally similar to FIGS. 13A and 13B, respectively, but illustrate the components of the closure latch assembly upon movement of the decklid into its fully-closed position as part of the second cinching stage;

FIGS. 15A and 15B are generally similar to FIGS. 14A and 14B, respectively, but illustrate the decklid moved slightly past its fully-closed position into an overtravel position as part of the second cinching stage of the dual-stage decklid cinch operation;

FIGS. 16A and 16B are generally similar to FIGS. 15A and 15B, respectively, but illustrate movement of the components of the closure latch assembly as the decklid moves back from its overtravel position toward its fully-closed position;

FIGS. 17A and 17B are generally similar to FIGS. 16A and 16B, respectively, but illustrate the closure latch assembly upon completion of the second cinching stage of the dual-stage decklid cinch operation with the decklid latched in its fully-closed position;

FIGS. 18A and 18B are generally similar to FIGS. 17A and 17B, respectively, but illustrate the closure latch assembly being reset following completion of the dual-stage decklid cinch operation;

FIGS. 19A and 19B are front and rear plan views of a closure latch assembly constructed according to an alternative non-limiting embodiment of the present disclosure and which is configured to include a latch mechanism, a latch release mechanism, a power release actuator, and a lift and cinch mechanism actuated by an external power cinch actuator, the closure latch assembly shown in a primary latched mode with the latch mechanism operating in a latched state for holding the decklid in its fully-closed position;

FIGS. 20A and 20B are generally similar to FIGS. 19A and 19B, respectively, but illustrate the latch mechanism operating in an unlatched state following completion of a power release operation to permit manual movement of the decklid from its pop-up position toward its fully-open position;

FIGS. 21A and 21B are front and rear plan views of the closure latch assembly showing movement of the decklid from its fully-open position toward its pop-up position in response to a manual closing operation;

FIGS. 22A and 22B are generally similar to FIGS. 21A and 21B, respectively, but illustrate initiation of a first cinching stage of a dual-stage decklid cinch operation once the decklid is located in its pop-up position via actuation of the power cinch actuator;

FIGS. 23A and 23B are generally similar to FIGS. 22A and 22B, respectively, but illustrate movement of various components associated with the latch mechanism and the lift and cinch mechanism as the decklid moves under its own weight toward its cinched position;

FIGS. 24A and 24B are generally similar to FIGS. 23A and 23B, respectively, but illustrate the location of the various components of the latch mechanism and the lift and cinch mechanism upon the decklid being located in its cinched position at the completion of the first cinching stage;

FIGS. 25A and 25B are generally similar to FIGS. 24A and 24B, respectively, but illustrate initiation of a second cinching stage of the dual-stage decklid cinch operation once the decklid is located in its cinched position in response to continued actuation of the power cinch actuator;

FIGS. 26A and 26B are generally similar to FIGS. 25A and 25B, respectively, but illustrate the lift and cinch mechanism causing the latch mechanism to move the decklid from its cinched position into its fully-closed position;

FIGS. 27A and 27B illustrate the lift and cinch mechanism causing the latch mechanism to move the decklid from its fully-closed position into its overtravel position during continuation of the second cinching stage;

FIGS. 28A and 28B are generally similar to FIGS. 27A and 27B, respectively, but illustrate the closure latch assembly upon completion of the second cinching stage with the decklid held by the latch mechanism in its fully-closed position;

FIG. 29 is a plan view of a closure latch assembly constructed according to yet another alternative non-limiting embodiment of the present disclosure and which is configured to include a latch mechanism, a latch release mechanism, a spring-loaded lift mechanism, a safety latch mechanism, a latch cinch mechanism, and a power actuator, the closure latch assembly shown in a primary latched mode with the latch mechanism operating in a primary latched state for holding the decklid in its fully-closed position;

FIG. 30A is generally similar to FIG. 29 and illustrates a drive mechanism operating in a home state with the latch mechanism in its primary latched state, while FIG. 30B illustrates the safety latch mechanism interacting with the latch mechanism;

FIG. 31A is generally similar to FIG. 30A but now illustrates the latch mechanism shifted from its primary latched state into a primary unlatched state in response to the drive mechanism shifting from its home state into a primary latch released state in response to initiation of a first stage of a dual-stage power release operation, while FIG. 31B illustrates corresponding movement of the components of the safety latch mechanism;

FIGS. 32A and 32B are generally similar to FIGS. 31A and 31B, respectively, but now illustrate the drive mechanism returned to its home state upon completion of the first stage of the dual-stage power release operation with the latch mechanism now operating in a secondary latched state and the safety latch mechanism operating in a safety latched state to define a secondary latched mode for the closure latch assembly with the decklid held in its pop-up position;

FIGS. 33A and 33B are generally similar to FIGS. 32A and 32B, respectively, but now illustrates the drive mechanism shifted from its home state into a secondary latch released state in response to initiation of a second stage of the dual-stage power release operation for shifting the safety latch mechanism from its safety latched state into a safety unlatched state so as to shift the latch mechanism into an unlatched state such that the closure latch assembly is operating in a released mode for permitting movement of the decklid to its fully-open position;

FIGS. 34A and 34B are generally similar to FIGS. 33A and 33B, respectively, but now illustrate the drive mechanism returned to its home state upon completion of the second stage of the dual-stage power release operation;

FIGS. 35A and 35B are generally similar to FIGS. 34A and 34B, respectively, but now illustrate manual movement of the decklid from its fully-open position into its pop-up position causing the safety latch mechanism to shift into its safety latched state for shifting the closure latch assembly into its secondary latched mode while the drive mechanism is maintained in its home state and the latch cinch mechanism is maintained in an uncoupled state;

FIG. 36 is generally similar to FIG. 35A but now shows the latch cinch mechanism shifted into a coupled state in response to the drive mechanism being shifted from its home state into a cinched state upon initiation of a power cinch operation;

FIG. 37 is generally similar to FIG. 36 but now illustrates the latch cinch mechanism shifting the latch mechanism from its secondary latched state into its primary latched state in response to the power cinch operation;

FIG. 38 is generally similar to FIG. 37 but now illustrates the drive mechanism returned to its home state upon completion of the power cinch operation; and FIG. 39 is a flowchart illustrating a method of operating a drive mechanism for a closure latch assembly in accordance with an illustrative embodiment.

DETAILED DESCRIPTION

Example embodiments of a power-operated closure latch assembly for use in a motor vehicle closure system will now be described more fully with reference to the accompanying drawings. To this end, the example embodiments of the closure latch assembly are provided so that the disclosure will be thorough and will fully convey its intended scope to those who are skilled in the art. Accordingly, numerous specific details are set forth such as examples of specific components, devices, and methods, to provide a thorough understanding of particular embodiments of the present disclosure. However, it will be apparently to those skilled in the art that specific details need not be employed, that the example embodiments may be embodied in many different forms, and that the example embodiments should not be construed to limit the scope of the present disclosure. In some parts of the example embodiments, well-known processes, well-known device structures, and well-known technologies are not described in detail.

In the following detailed description, the expression "closure latch assembly" will be used to generally indicate any power-operated latch device adapted for use with a vehicle closure panel and which is configured to provide at least one of a power cinch feature and a power release feature. Additionally, the expression "closure panel" will be used to indicate any element mounted to a structural body portion of a motor vehicle and which is moveable between a fully-open position and a fully-closed position, respectively opening and closing an access to a passenger or storage compartment of the motor vehicle. Therefore, the closure panel includes, without limitations, decklids, hoods, tailgates, liftgates, bonnet lids, and sunroofs in addition to the sliding or pivoting passenger doors of the motor vehicle.

Figure 1:
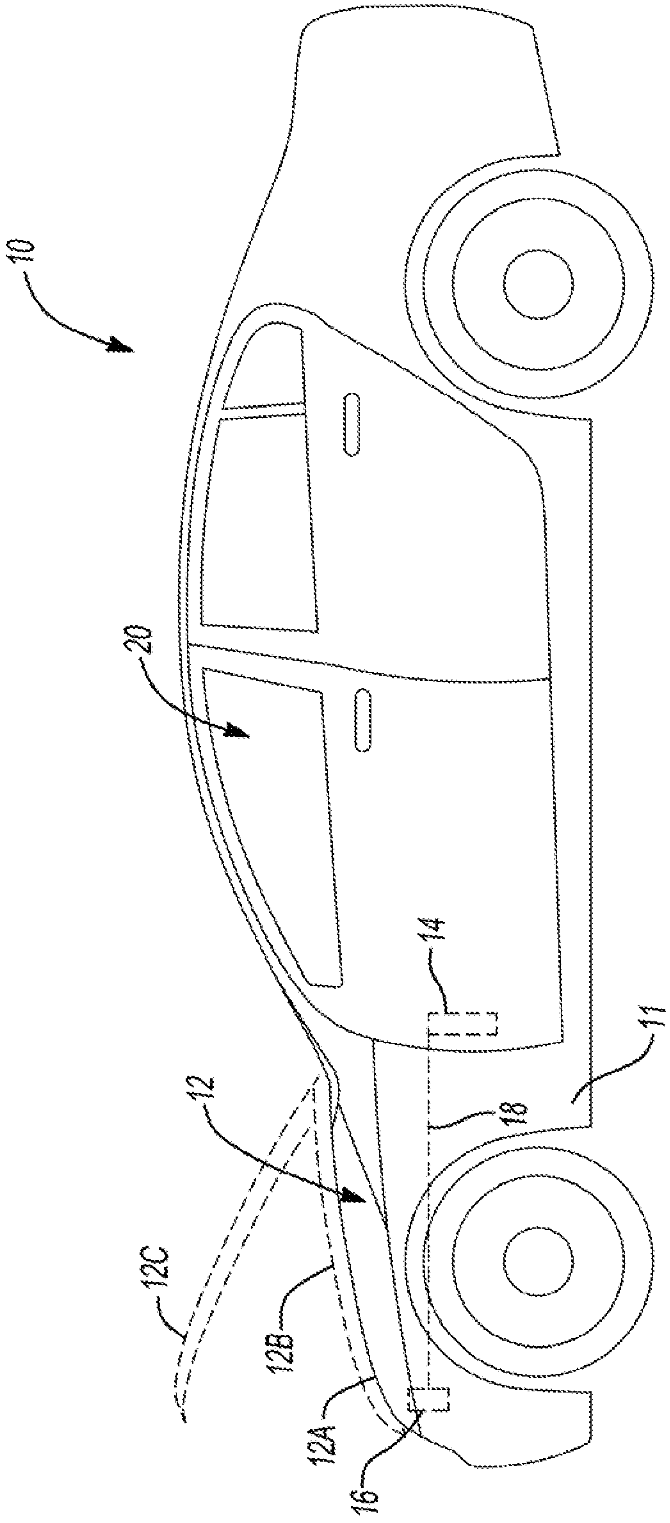
FIG. 1 illustrates a motor vehicle equipped with a closure system including a power-operated closure latch assembly operable for releasably latching a closure panel, such as a decklid, relative to a structural body portion of the motor vehicle.

FIG. 1 illustrates a motor vehicle 10 having a body 11 defining a front compartment, which in some embodiments may be an engine compartment and in other embodiments may be a storage compartment. In this non-limiting example of motor vehicle 10, a closure panel, configured as a decklid (or "hood") 12, is pivotably mounted to body 11 for movement relative to the front compartment between a fully-closed position 12A, a partially-open or pop-up position 12B; and a fully-open position 12C. Decklid 12 may be manually released via pulling a release handle 14 located within a passenger compartment 20 of vehicle 10 and which functions to actuate a latch release mechanism associated with a closure latch assembly 16 for releasing decklid 12 and permitting subsequent movement of decklid 12 to its pop-up position. A release cable 18 is shown to interconnect release handle 14 to the latch release mechanism associated with closure latch assembly 16. A safety latch mechanism also associated with closure latch assembly 16 can then be manually actuated to permit decklid 12 to be moved from its pop-up position into its fully-open position. Release of the safety latch mechanism can be provided via a second pulling of release handle 14. Closure latch assembly 16 is, in this non-limiting embodiment, secured to a structural portion of vehicle body 11 adjacent to the front compartment and is configured to releasably engage a striker 22 mounted to an underside of decklid 12. In addition to this otherwise conventional mechanical release of closure latch assembly 16, the present disclosure is directed to providing closure latch assembly 16 with a power release function and a power cinch function.

Figure 2B:
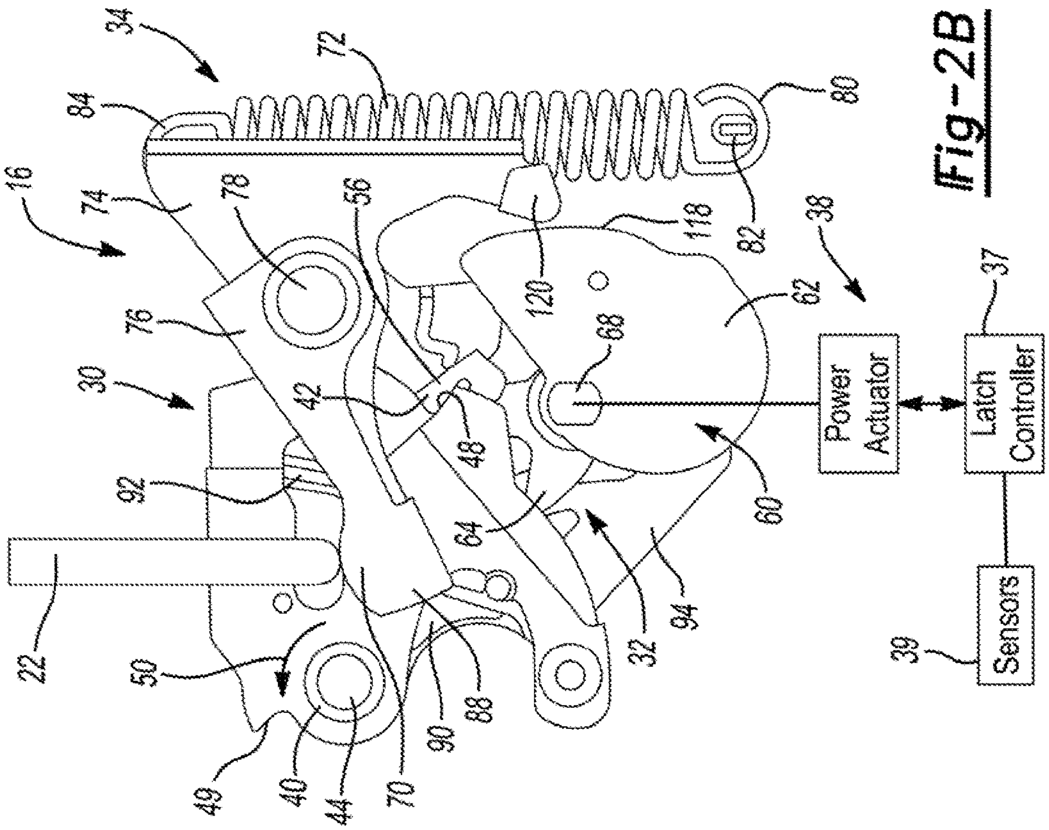
FIGS. 2A and 2B are front and rear plan views of a closure latch assembly constructed according to a non-limiting embodiment of the present disclosure and configured to include a latch mechanism, a latch release mechanism, a spring-loaded lift mechanism, a safety latch mechanism, a latch cinch mechanism, and a power actuator.
Figure 2A:
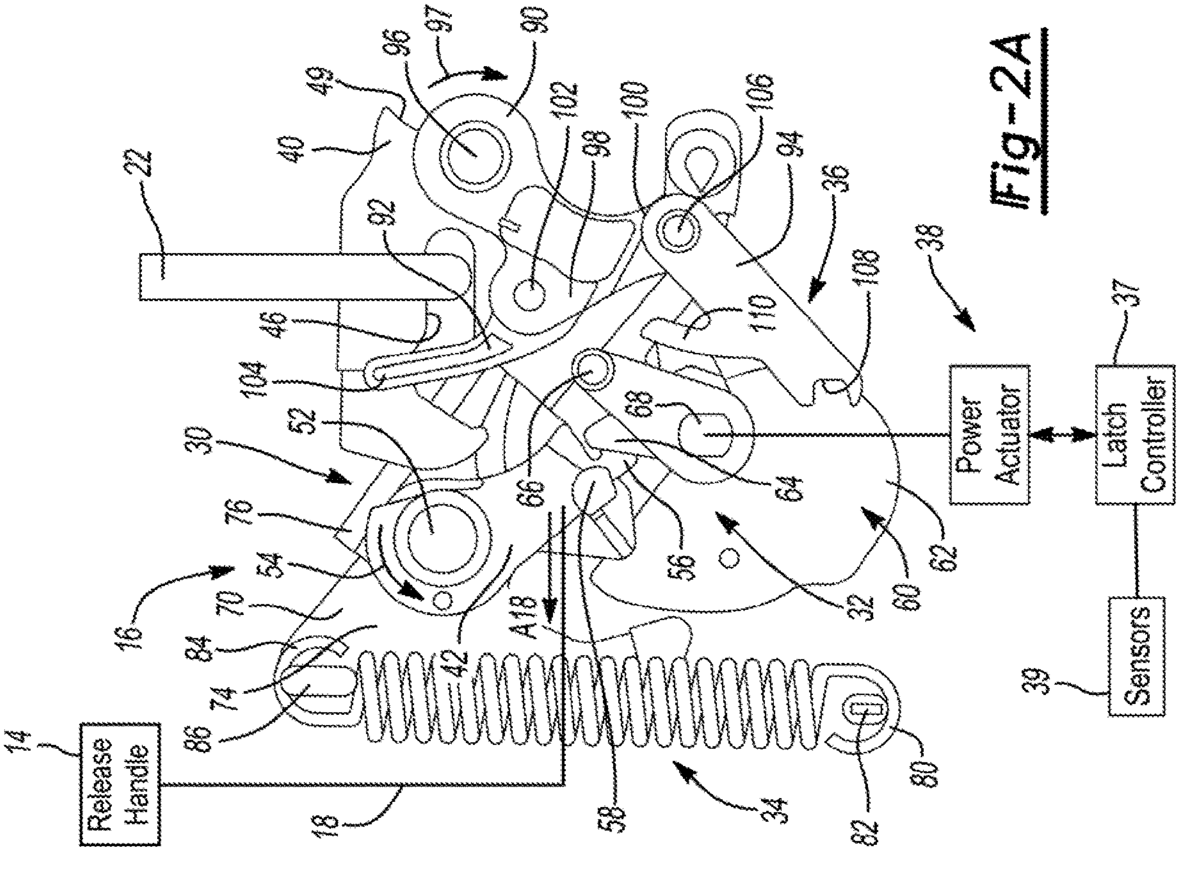

A detailed description of a non-limiting embodiment of a power-operated version of closure latch assembly 16, constructed in accordance with the teachings of the present disclosure, will now be provided with reference to FIGS. 2 through 18. Referring initially to FIGS. 2A and 2B, closure latch assembly 16 is generally shown to include a latch mechanism 30, a latch release mechanism 32, a spring-loaded lift mechanism 34, a latch cinch mechanism 36, and a power actuator 38. As will be detailed, power actuator 38 is operable to control actuation of latch release mechanism 32 to provide a power release function and to control actuation of latch cinch mechanism 36 to provide a power cinch function. A latch controller 37 is schematically shown in communication with power actuator 38 for controlling actuation thereof in response to sensor signals inputted to latch controller 37 from one or more latch sensors 39. The sensor signals can include, without limitation, a power release request (i.e. via key fob or push button) as well as positional signals indicative of the position of various components associated with one or more of the above-noted mechanism. While only shown schematically, power actuator 38 is intended to be configured to include, in this non-limiting example, an electric motor that is operable to actuate a drive mechanism operably associated with latch release mechanism 32 and latch cinch mechanism 36, as will be detailed. Closure latch assembly 16 also includes a frame plate and cover plate configured to define a latch housing (not shown) which supports each of the above-noted mechanisms and power actuator 38. The latch housing is fixedly secured to an edge portion of vehicle body 11 adjacent to the front compartment and defines an entry aperture through which striker 22 travels upon movement of decklid 12 relative to vehicle body 11.

Latch mechanism 30 is shown, in this non-limiting example, as a single ratchet and pawl arrangement including a ratchet 40 and a pawl 42. Pawl 42 may be operably connected to release handle 14 via release cable 18 to impart a pivoting of pawl 42, illustratively in a clockwise direction as viewed in FIG. 2A, in response to an activation of release handle 14. Ratchet 40 is supported in the latch housing via a ratchet pivot post 44 for rotational movement between several distinct positions including a striker release position, a secondary striker capture position, a cinched striker capture position, a primary striker capture position, and an overtravel striker capture position. Ratchet 40 is configured to include a primary latch shoulder 48 and a secondary latch shoulder 49. A ratchet biasing mechanism or member, schematically indicated by an arrow 50, is adapted to normally bias ratchet 40 to rotate about ratchet pivot post 44 in a first or "releasing" direction toward its striker release position.

Pawl 42 is supported in the latch housing by a pawl pivot post 52 for rotational movement between a ratchet holding position and a ratchet releasing position. A pawl biasing mechanism or member, schematically indicated by an arrow 54, is adapted to normally bias pawl 42 toward its ratchet holding position. Pawl is 42 is configured to include a pawl latch lug 56 and a pawl release lug 58. FIGS. 2A and 2B illustrate ratchet 40 held in its primary striker capture position by pawl 42 when pawl 42 is located in its ratchet holding position due to pawl latch lug 56 engaging primary latch shoulder 48 on ratchet 40.

The drive mechanism is shown to include a drive cam 60 comprised of a drive cam lift lever 62, a drive cam pawl release lever 64, and a drive cam cinch lever 66, all of which are connected in a "stacked" arrangement for common rotation about a drive cam pivot post 68. While shown as distinct components, the above-noted levers of drive cam 60 can be formed together as a single drive cam member as an alternative to the multi-piece configuration shown. As will be detailed, drive cam 60 is only rotated in a single or "actuation" direction (i.e. counterclockwise in FIG. 2A and clockwise in FIG. 2B) via actuation of the electric motor associated with power actuator 38. As will be detailed, drive cam lift lever 62 is operably associated with lift mechanism 34, drive cam pawl release lever 64 is operably associated with latch release mechanism 32, and drive cam cinch lever 66 is operably associated with latch cinch mechanism 36.

Lift mechanism 34 is generally shown to include a lift lever 70 and a lift lever spring 72. Lift lever 70 includes a spring plate segment 74 and a striker plate segment 76, both of which are connected for common rotation about a lift lever pivot post 78. While not limited thereto, lift lever pivot post 78 and pawl pivot post 52 may be commonly aligned to define a common pivot axis. Lift lever spring 72 has a first spring end segment 80 coupled to a stationary lug 82 extending from the latch housing and a second spring end segment 84 coupled to a retention lug 86 extending from spring plate segment 74 of lift lever 70. Lift lever spring 72 is operable to normally bias lift lever 70 in a pop-up direction (i.e. counterclockwise in FIG. 2A and clockwise in FIG. 2B). Striker plate segment 76 of lift lever 70 has a striker lug 88 that is adapted to selectively engage striker 22.

Latch cinch mechanism 36 is shown, in this non-limiting embodiment, to generally include a cinch lever 90, a cinch pawl 92, and a transmission lever 94. Cinch lever 90 is pivotably mounted to the latch housing via a cinch lever pivot post 96. Cinch lever pivot post 96 may be commonly aligned with ratchet pivot post 44 to define a common pivot axis. A cinch lever biasing mechanism or member, schematically indicated by an arrow 97, is adapted to normally bias cinch lever 90 toward a first or "home" position. Cinch lever 90 includes a first pivot lug segment 98 and a second pivot lug segment 100. Cinch pawl 92 is pivotably coupled to first pivot lug segment 98 on cinch lever 90 via a cinch pawl pivot post 102 and has a cinch pawl drive lug 104 configured to be selectively engageable with ratchet 40. Transmission lever 94 has a first end segment pivotably coupled to second pivot lug segment 100 on cinch lever 90 via a transmission lever pivot post 106, a second end segment defining a drive slot 108, and an intermediate segment defining a transmission drive lug 110.

As will be hereinafter detailed, FIGS. 3A through 18B provide a series of sequential front and rear plan views of closure latch assembly 16 illustrating rotation of drive cam 60 via power actuator 38 to initiate and complete a power-operated primary latch release operation (FIGS. 3A-7B), to initiate and complete a power-operated safety latch release operation (FIGS. 8A-8C), and to initiate and complete a dual-stage decklid cinch operation (FIGS. 9A-18B). Thus, closure latch assembly 16 is equipped with an "integrated" power-operated actuation arrangement having the single power actuator 38 located within the latch housing. The sequential views illustrate movement of the various components and mechanisms associated with closure latch assembly 16 to provide these distinct operations.

Figure 3B:
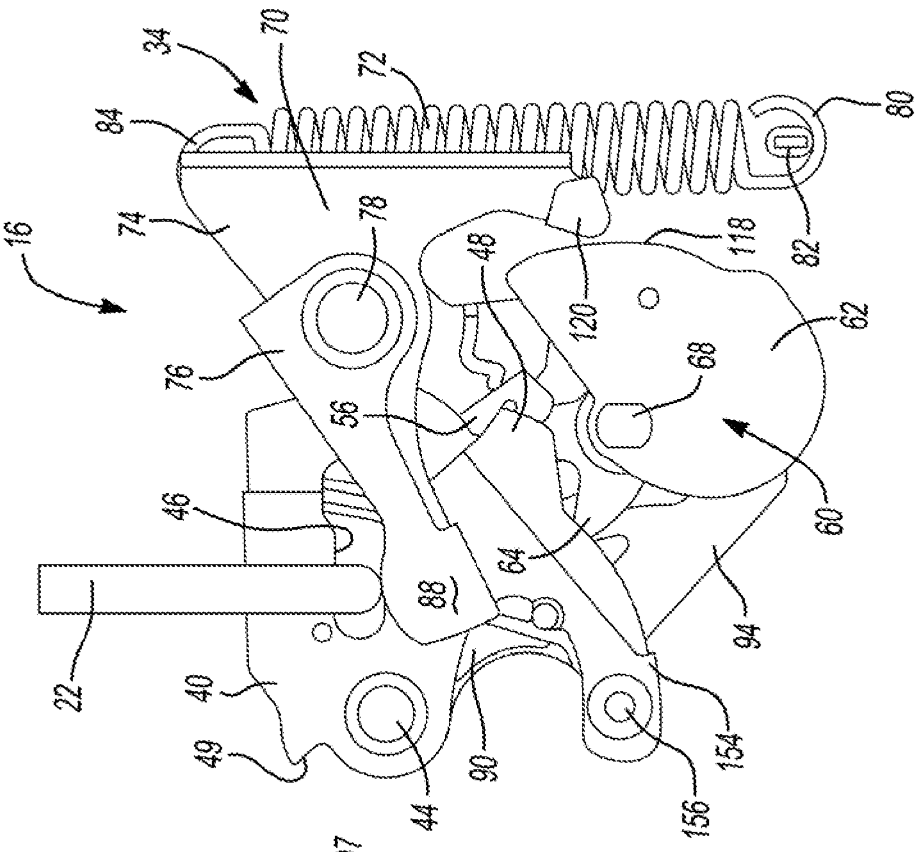
FIGS. 3A and 3B are generally similar to FIGS. 2A and 2B, respectively, and illustrate the closure latch assembly with the latch mechanism in a latched state for holding the decklid in a fully-closed position relative to the structural body portion of the motor vehicle.
Figure 3A:
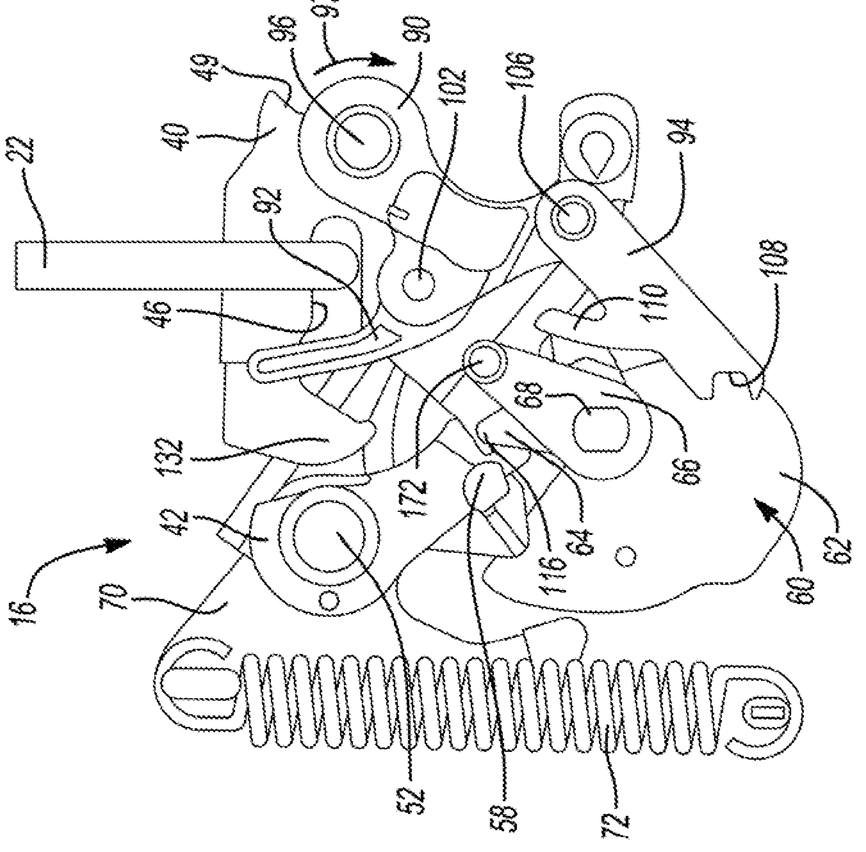

FIGS. 3A and 3B illustrate closure latch assembly 16 operating in a primary latched mode for holding decklid 12 in its fully-closed position relative to body portion 11 of vehicle 10. With closure latch assembly 16 in its primary latched mode, latch mechanism 30 is operating in a primary latched state with ratchet 40 located in its primary striker capture position and pawl 42 located in its ratchet holding position. In addition, latch release mechanism 32 is shown operating in a non-actuated state with drive cam 60 located in a first or "home" position. Striker 22 is shown captured/retained within striker guide channel 46 of ratchet 40 such that striker 22 engages and acts on striker lug 88 of striker plate segment 76 so as to forcibly locate lift lever 70 in a first or "non-deployed" position, in opposition to the biasing of lift lever spring 72, thereby placing lift mechanism 34 in a spring-loaded state. Finally, latch cinch mechanism 36 is shown operating in an uncoupled state with cinch lever 90 located by cinch lever biasing member 97 in a first or "home" position. Note that location of cinch lever 90 in its home position also results in cinch pawl 92 and transmission lever 94 being located in their respective first or "home" positions.

Figure 4B:
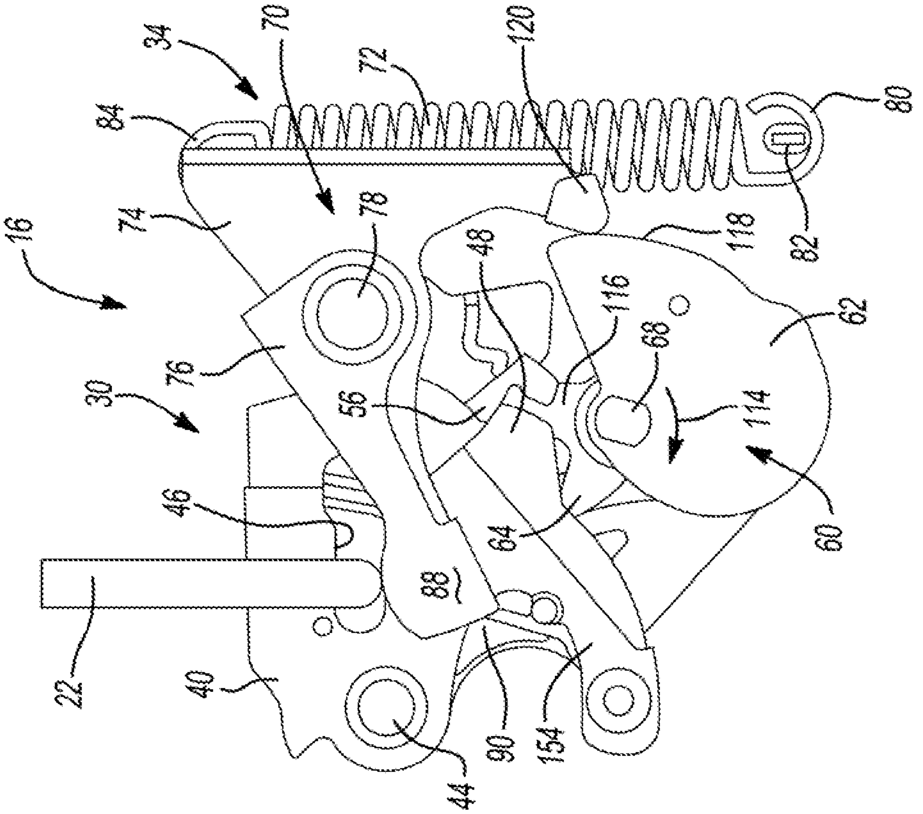
FIGS. 4A and 4B are generally similar to FIGS. 3A and 3B, respectively, but illustrate initial actuation of the latch release mechanism via the power actuator for initiating a power release function.
Figure 4A:
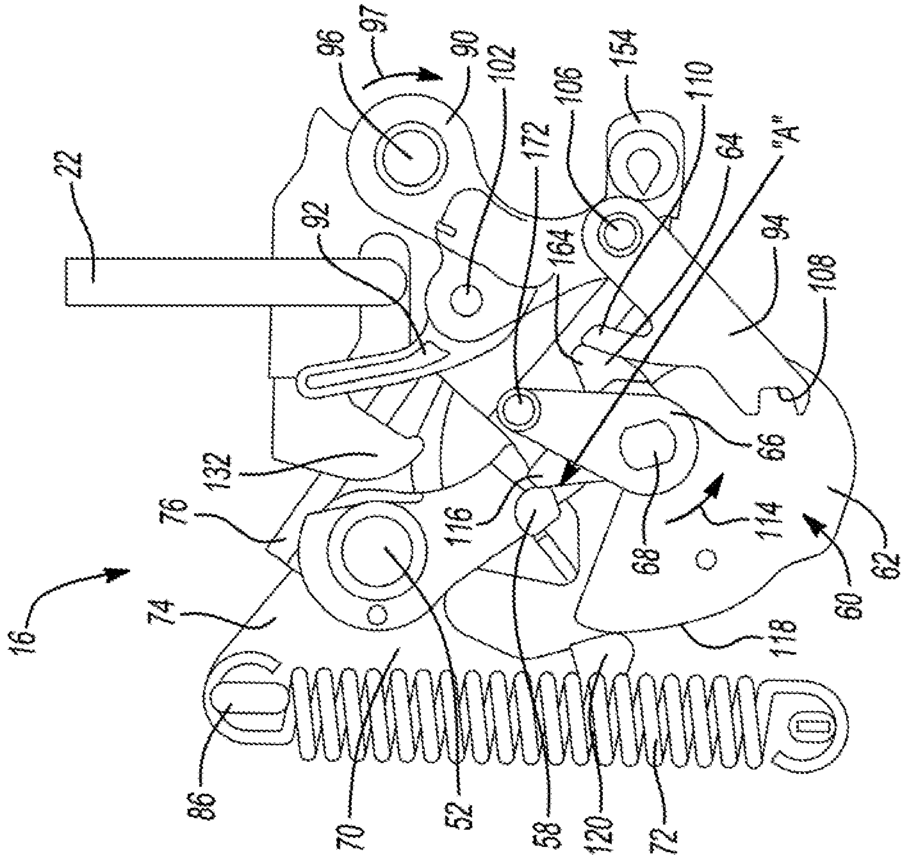

FIGS. 4A and 4B illustrate, in comparison to FIGS. 3A and 3B, respectively, initiation of the power release operation in response to latch controller 37 receiving a power release signal. Specifically, power actuator 38 has been actuated such that the electric motor causes drive cam 60 to begin rotating in the actuation direction (see arrow 114) from its home position toward a second or "pawl released" position (shown in FIGS. 6A, 6B). This initial driven rotation of drive cam 60 in the actuation direction causes a first pawl trigger lug 116 formed on drive cam pawl release lever 64 to engage pawl release lug 58 on pawl 42, as indicated by arrow "A" in FIG. 4A. This engagement causes pawl 42 to begin moving from its ratchet holding position toward its ratchet releasing position, in opposition to the biasing of pawl biasing member 54. In addition, a profiled cam edge surface 118 formed on drive cam lift lever 62 moves into engagement with a follower lug 120 formed on spring plate segment 74 of lift lever 70.

Figure 5B:
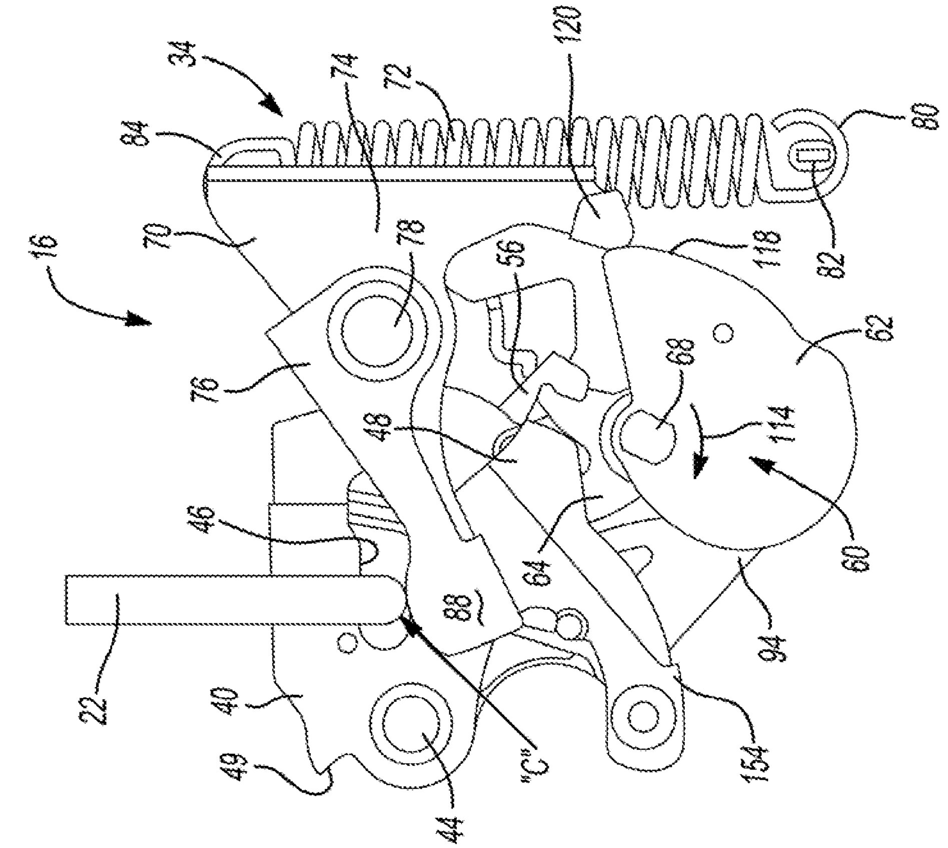
FIGS. 5A and 5B are generally similar to FIGS. 4A and 4B, respectively, but illustrate continued actuation of the latch release mechanism via the power actuator.
Figure 5A:
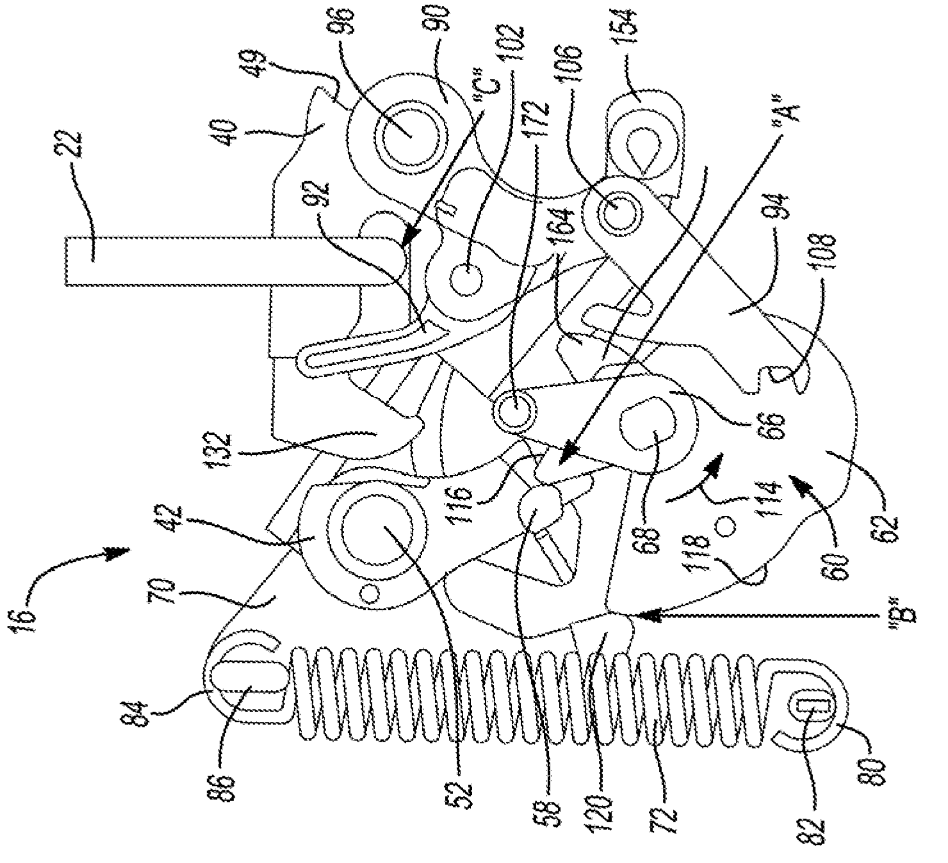

FIGS. 5A and 5B illustrate, in comparison to FIGS. 4A and 4B, respectively, continued driven rotation of drive cam 60 in the actuation direction by power actuator 38 causes continued movement of pawl 42 toward its ratchet releasing position due to first pawl trigger lug 116 on drive cam pawl release lever 64 continuing to forcibly act on pawl release lug 58 on pawl 42 (see arrow "A" of FIG. 5A). In addition, the profile of cam edge surface 118 on drive cam lift lever 62 is configure to forcibly act on follower lug 120 on spring plate segment 74, as indicated by arrow "B" of FIG. 5A, for causing lift lever 70 to rotate slightly in a downward (i.e. clockwise in FIG. 5A and counterclockwise in FIG. 5B) direction. This slight rotation of lift lever 70 causes striker 22 to disengage striker lug 88 on striker plate segment 26, as indicated by arrow "C", thereby reducing the force exerted by lift lever spring 72 on striker 22. With striker lug 88 displaced from engagement with striker 22, the only forces acting on striker 22 in the releasing direction are the seal loads which may result in reduced ratchet/striker noise upon release of latch mechanism 30.

FIGS. 6A and 6B illustrate, in comparison to FIGS. 5A and 5B, respectively, that continued driven rotation of drive cam 60 in the actuation direction into its pawl released position functions to shift latch release mechanism 32 from its non-actuated state into an actuated state such that pawl 42 is now located in its ratchet releasing position. As such, pawl latch lug 56 on pawl 42 is disengaged from primary latch shoulder 48 on ratchet 40 (as indicated by arrow "D" in FIG. 6B) for defining a primary unlatched state for latch mechanism 30. Simultaneously, the profile of cam edge surface 118 on drive cam lift lever 62 is configured to now cause follower lug 120 (see arrow "B") to rotate lift lever 70 slightly upwardly until striker lug 88 re-engages striker 22. At this point, lift mechanism 34 shifts from its spring-loaded state into a spring-released (i.e. "pop-up") state and initiates a pop-up function.

FIGS. 7A and 7B illustrate, in comparison to FIGS. 6A and 6B, respectively, that shifting of latch mechanism 30 into its primary unlatched state permits ratchet biasing member 50 to forcibly drive ratchet 40 from its primary striker capture position into its secondary striker capture position. Concurrently, the shifting of lift mechanism 34 into its spring-released state causes lift lever spring 72 to forcibly drive lift lever 70 in the pop-up direction from its non-deployed position into a second or "deployed" position. As will be detailed, a safety latch mechanism 130 (FIG. 8C) is operable in a safety latched state to engage and hold ratchet 40 in its secondary striker capture position so as to define a secondary latched state for latch mechanism 30. With ratchet 40 held in its secondary striker capture position by safety latch mechanism 130, striker 22 is prevented from exiting striker guide channel 46 via engagement with a hooked end segment (i.e. "safety hook") 132 formed on ratchet 40. However, pivotal movement of lift lever 70 to its deployed position results in striker lug 88 on striker plate segment 76 engaging and forcibly driving striker 22 upwardly (see arrow "E"), thereby causing lift mechanism 34 to move decklid 12 from its fully-closed position into its pop-up position. As such, closure latch assembly 16 has been shifted from its primary latched mode into a secondary latched mode. Note also that follower lug 120 has disengaged cam edge surface 118 and now slides along a follower edge surface 134 until it abuts a stop shoulder 136 formed on drive cam lift lever 62 (see arrow "F"). The interaction between follower lug 120 on spring plate segment 74 and stop shoulder 136 on drive cam lift lever 62 acts to positively locate lift lever 70 in its deployed position and complete the pop-up function. First pawl trigger lug 116 on drive cam pawl release lever 64 is also shown to have moved past and out of engagement with pawl release lug 58, thereby allowing pawl biasing member 54 to bias pawl 42 to move toward its ratchet holding position. The pop-up position of decklid 12 is selected to be raised a predetermined amount with respect to its fully-closed position. The predetermined amount of decklid travel is, in this non-limiting embodiment, selected for the pop-up position of decklid 12 to be about 25 mm.

FIGS. 8A and 8B illustrate latch mechanism 30 operating in its secondary latched state and spring-loaded lift mechanism 34 operating it its spring-released state while FIG. 8C illustrates safety latch mechanism 130 operating in its safety latched state for holding ratchet 40 in its secondary striker capture position. Safety latch mechanism 130 is best shown in FIG. 8C to generally include a coupling link 140 and a safety pawl 142. Coupling link 140 has a first end segment 144 engaged with a drive lug 146 formed on pawl 42, a second end segment 148 pivotally connected to safety pawl 142 via a first coupling link pivot post 150, and an intermediate segment 152 pivotally connected to a leg extension segment 154 of ratchet 40 via a second coupling link pivot post 156. Safety pawl 142 is mounted to the latch housing by a safety pawl pivot post 160 for movement between a first or "ratchet blocked" position (shown) and a second or "ratchet unblocked" position. A safety pawl biasing mechanism or member, schematically indicated by an arrow 158, is arranged to normally bias safety pawl 142 toward its ratchet blocked position. In its ratchet blocked position, a blocker lug 162 on safety pawl 142 engages secondary latch shoulder 49 on ratchet 40, thereby mechanically holding ratchet 40 in its secondary striker capture position. Thus, FIG. 8C illustrates safety latch mechanism 130 operating in its safety latched state and latch mechanism 30 operating in its secondary latched state.

Continued driven rotation of drive cam 60 in its actuation direction from its pawl released position toward a third or "safety pawl released" position causes a second pawl trigger lug 164 on drive cam pawl release lever 64 to engage pawl release lug 58 on pawl 42, as indicated by arrow "G". As such, pawl 42 is again rotated about pawl pivot 52, in opposition to the biasing of pawl biasing member 54, toward its ratchet releasing position which, in turn, causes corresponding movement of coupling link 140 due to engagement of pawl drive lug 146 with first end segment 144 of coupling link 140. Such movement of coupling link 140 results in movement of safety pawl 142 from its ratchet blocked position into its ratchet unblocked position, whereby blocker lug 162 is released from engagement with secondary latch shoulder 49 on ratchet 40, thereby establishing a safety unlatched state for safety latch mechanism 130 and an unlatched state for latch mechanism 30. Specifically, with safety pawl 142 located in its ratchet unblocked position, ratchet biasing member 50 is permitted to drive ratchet 40 from its secondary striker capture position into its striker release position, thereby releasing striker 22 from ratchet 40 so as to permit subsequent manual movement of decklid 12 from its pop-up position to its fully-open position since striker 22 is no longer retained within guide channel 46 nor movement limited by safety hook segment 132. In this arrangement, closure latch assembly 16 is, due to shifting of safety latch mechanism 130 into its safety unlatched state, shifted from its secondary latched mode into its released mode. Once ratchet 40 is located in its striker release position, power actuator 38 is placed in a power-off state so as to stop further rotation of drive cam 60.

FIGS. 3A through 8B have clearly illustrated initiation and completion of the power release function via driven rotation of drive cam 60 in the actuation direction from its home position (FIGS. 3A, 3B) into its pawl released position (FIGS. 6A, 6B) and further into its safety pawl released position (FIGS. 8A-8C) due to actuation of power actuator 38. Now, FIGS. 9A through 17B will be described with similar detail to clearly illustrate initiation and completion of a dual-stage cinch function operable for moving decklid 12 from its pop-up position (FIGS. 9A, 9B) to its fully-closed position (FIGS. 17A, 17B) in response to driven rotation of drive cam 60 in the actuation direction from its safety pawl released position back to its home position.

In accordance with the present disclosure, the dual-stage cinch function associated with closure latch assembly 16 includes a first or “non-driven” cinching stage and a second or “driven” cinching stage. The first cinching stage of the cinch operation functions to move decklid 12 from a first stage start position to a first stage end position using only the weight of the decklid 12. Preferably, the first stage start position of decklid 12 corresponds to the pop-up position of decklid 12, which, as previously noted, is selected to be about 25 mm raised relative to the fully-closed position in accordance with this non-limiting embodiment. The first stage end position for decklid 12 can be selected as required for each vehicular application but, in this non-limiting example, is selected to be about 8 mm raised relative to the fully-closed position of decklid 12. To provide the first cinching stage, power actuator 38 and drive cam 60 are configured to move lift lever 70 from its spring-released (i.e. deployed) position to its spring-loaded (i.e. non-deployed) position, in opposition to the biasing of lift lever spring 72, to permit decklid 12 to move (under its own weight) from its first stage start/pop-up position into its first stage end position. Thus, the term “non-driven” is intended to define that ratchet 40 is not cinched via a power-operated arrangement, such as via latch cinch mechanism 36, during the first cinching stage so as to inhibit pinching of fingers.

FIGS. 9A and 9B, in comparison to FIGS. 8A and 8B, respectively, illustrate initiation of the first cinching stage by power actuator 38 being placed in a power-on state to cause driven rotation of drive cam 60 in the actuation direction from its safety pawl released position to a fourth or “first stage cinch start” position in response to decklid 12 being manually moved from its fully-open position to its pop-up position. Such manual movement of decklid 12 to its pop-up position also results in latch mechanism 30 shifting back into its secondary latched state with safety latch mechanism 130 shifted back into its safety latched state. As such, ratchet 40 is driven by striker 22 into its secondary striker capture position, whereat blocker lug 162 on safety pawl 142 engages secondary latch shoulder 49. In addition, FIGS. 9A and 9B also illustrate follower lug 120 on lift lever 70 now engaging a cinch edge surface 170 (See arrow “H”) formed on drive cam lift lever 62 and which is profiled to cause lift lever 70 to pivot about lift lever pivot post 78 in the downward direction opposing the normal biasing of lift lever spring 72. Such downward pivotal movement of lift lever 70 towards its non-deployed position causes striker 22 and decklid 12 to move downward, due to the weight of decklid 12, as striker 22 maintains engagement with striker lug 88 (See arrow “E”).

FIGS. 10A and 10B, in comparison to FIGS. 9A and 9B, respectively, illustrate continued driven rotation of drive cam 60 in the actuation direction from its first stage cinch start position toward a fifth or “first stage cinch end” position. Concurrently, the weight of decklid 12 continues to cause striker 22 to act on ratchet 40 within guide channel 46 and forcibly rotate ratchet 40, in opposition to ratchet biasing member 50, from its secondary striker capture position toward its cinched striker capture position. As such, decklid 12 moves downwardly from its pop-up position toward its cinched position. Note also that striker 22 continues to act on striker lug 88 for forcibly rotating lift lever 70, in opposition to lift lever spring 72, toward its non-deployed position. In addition, the profile of cinch edge surface 170 also assists in driving lift lever 70 toward its non-deployed position during such rotation of drive cam 60 toward its first stage cinch end position. Furthermore, drive cam 60 has rotated such that a cinch lever drive post 172 extending from drive cam cinch lever 66 is now shown positioned within drive slot 108 of transmission lever 94, thereby coupling latch cinch mechanism 36 to drive cam 60. As such, latch cinch mechanism 36 is shifted from its uncoupled state into a coupled state. At this point in the first cinching stage, cinch pawl 92 has not yet moved into engagement with ratchet 40.

FIGS. 11A and 11B, in comparison to FIGS. 10A and 10B, respectively, illustrate the continued rotation of ratchet 40 toward its cinched striker capture position due to continued engagement with striker 22, and also illustrate the continued rotation of lift lever 70 toward its non-deployed position due to striker 22 acting on striker lug 88 and due to cinch edge surface 170 on drive cam lift lever 62 acting on follower lug 120. These drawings illustrate drive cam 60 rotated to its first stage cinch end position such that decklid 12 is now located in its cinched position (between its pop-up and fully-closed position) raised about 8 mm relative to its fully-closed position. This cinched position of decklid 12 defines the end point of the first cinching stage and the start point of the second cinching stage of the dual-stage cinch operation with ratchet 40 located in its cinched striker capture position. Note that engagement of cinch lever drive post 172 within drive slot 108 has caused drive cam cinch lever 66 to initiate movement of transmission lever 94 from its home position toward a second or “cinched” position. Such initial movement of transmission lever 94 also causes corresponding movement of both cinch pawl 92 and cinch lever 90 from their respective home positions toward their second or “cinched” positions. However, cinch pawl 92 is still not forcibly acting on ratchet 40 (See arrow “I”). Cinch edge surface 170 on drive cam lift lever 62 continues to drive follower lug 120 to rotate lift lever 70 in a downward direction toward its non-deployed position. However, striker 22 and decklid 12 no longer follow along with continued rotation of lift lever 70 due to seal loading acting thereon.

FIGS. 12A and 12B are generally similar to FIGS. 11A and 11B, respectively, but now illustrate drive cam 60 slightly further rotated by power actuator 38 in the actuation direction from its first stage cinch end position into a sixth or "second stage cinch start" position whereat cinch pawl 92 has moved into engagement with ratchet 40 (See arrow "I") so as to initiate the second cinching stage of the dual-stage cinch operation. Note that transmission lever 94 continues to be driven by drive cam cinch lever 66 toward its cinched position (due to retention of cinch lever drive post 172 within drive slot 108) which likewise continues to drive cinch pawl 92 and cinch lever 90 toward their respective cinched positions.

FIGS. 13A and 13B are generally similar to FIGS. 12A and 12B, respectively, and illustrate slightly further rotation of drive cam 60 in the actuation direction toward a seventh or "second stage cinch end" position. Such rotation of drive cam 60 causes drive cam cinch lever 66 to continue movement of the components of latch cinch mechanism 36 such that cinch pawl 92 continues to move toward its cinched position. Since cinch pawl 92 is now acting on ratchet 40, such movement of cinch pawl 92 towards its cinched position also acts to forcibly drive ratchet 40 from its cinched striker capture position toward its primary striker capture position. This driven cinching movement of ratchet 40 causes ratchet 40 to act on and move striker 22 which, in turn, causes decklid 12 to move from its cinched position toward its fully-closed position.

FIGS. 14A and 114B are generally similar to FIGS. 13A and 13B, respectively, and illustrate decklid 12 now located in its fully-closed position with cinch pawl 92 located in its cinched position, with ratchet 40 located by cinch pawl 92 into its primary striker capture position, and with pawl 42 located in its ratchet holding position, all in response to driven rotation of drive cam 60 into its second stage cinch end position. Note that further rotation of drive cam 60 no longer causes downward movement of lift lever 70 which is now positioned in its non-deployed position due to follower lug 120 acting on a neutral surface segment 180 formed on cinch edge surface 170.

FIGS. 15A and 15B illustrate, in direct comparison to FIGS. 14A and 14B, respectively, continued driven rotation of drive cam 60 via power actuator 38 in the actuation direction into an eighth or "overtravel" position which, in turn, locates each of transmission lever 94, cinch pawl 92, and cinch lever 90 in their respective cinched position. As such, ratchet 40 (via its continued engagement with cinch pawl 92) is moved to its overtravel striker capture position which is, in this non-limiting embodiment, located about 2 mm past its primary striker capture position. The clearance between striker 22 and striker lug 88 on lift lever 70 results in all cinching of striker 22 being caused via engagement of striker 22 with ratchet 40. The generally "on-center" alignment between drive cam cinch lever 66 and transmission lever 94 generates the maximum force within the system.

FIGS. 16A and 16B illustrate, in direct comparison to FIGS. 15A and 15B, respectively, that continued driven rotation of drive cam 60 in its actuation direction past its overtravel position causes ratchet 40 to move back toward its primary striker capture position and also acts to re-engage striker lug 88 on lift lever 70 with striker 22. FIGS. 17A and 17B illustrate the completion of the second cinching stage of the dual-stage cinch operation with decklid 12 held by latch mechanism 30 in its fully-closed position. In particular, power actuator 38 has now driven drive cam 60 into a ninth or "cinch complete" position with latch mechanism 30 in its primary latched state, latch release mechanism 32 in its non-actuated state, and lift mechanism 34 in its spring-loaded state. Finally, FIGS. 18A and 18B illustrate continued driven rotation of drive cam 60 from the cinch complete position back into its home position such that latch cinch mechanism 36 is returned (i.e. "reset") into its uncoupled state. Thus, a single rotation of drive cam 60 is used to provide the power release of latch mechanism 30, the power release of safety latch mechanism 130, the dual-stage cinching function including power cinching of latch cinch mechanism 36, and the resetting of closure latch assembly 16.

The present disclosure is directed to closure latch assembly 16 having latch mechanism 30 operable to releasably engage striker 22, latch release mechanism 32 operable to shift latch mechanism 30 from a latched state into an unlatched state, and power-operated actuator 38 operable for selectively actuating latch release mechanism 32. Closure latch assembly 16 also includes spring-loaded lift mechanism 34 that is operable to move the closure panel, herein described as decklid 12, from its fully-closed position to its partially-open position following actuation of latch release mechanism 32. Coordinated actuation of latch release mechanism 32 and safety latch mechanism 130 via power-operated actuator 38 provides the decklid power release function.

The present disclosure is further directed to closure latch assembly 16 having latch cinch mechanism 36 that can be shifted from an uncoupled state into a coupled state via power-operated actuator 38 to provide the dual-stage decklid cinching function. Latch cinch mechanism 36 is operable in its uncoupled state to permit decklid 12 to move from its pop-up position to its cinched position, thereby establishing the first, non-driven cinching stage. Latch cinch mechanism 36 is operable in its coupled state to mechanically engage latch mechanism 30 and cause decklid 12 to move from its cinched position into its fully-closed position, thereby establishing the second, driven cinching stage. Upon completion of the second cinching stage, power-operated actuator 38 is reset in anticipation of a request for a subsequent power release function. A single actuator arrangement is employed for power-operated actuator 38 which is configured to control the coordinated actuation of latch release mechanism 32 and safety latch mechanism 130, the resetting of spring-loaded lift mechanism 34, and the shifting of latch cinch mechanism 36 into its coupled state. To this end, a single cam arrangement, herein disclosed as drive cam 60, is driven in a single (i.e., "actuation") direction from a home position through a series of distinct actuation positions to provide these coordinated power release, power cinch and resetting functions. While not shown, the actuation of power actuator 38 via latch controller 37 is controlled in response to a power-release signal from a remote keyless entry system (via actuation of a key fob or proximity) to provide these advanced convenience features.

As noted, closure latch assembly 16 of FIGS. 2A-18B is equipped with an "integrated" power actuator 38 configured to provide control over both the power release and the power cinch functions. However, some closure latch assemblies are configured to work in conjunction with an external cinch actuator that is separate and distinct from an internal power release actuator. To accommodate such arrangements, the present disclosure also contemplates an alternative version of closure latch assembly 16, identified as closure latch assembly 16' in FIGS. 19A through 28B, and to which the following detailed description is directed.

A detailed description of a non-limiting example embodiment of closure latch assembly 16', constructed in accordance with the teachings of the present disclosure, will now be provided. Referring initially to FIGS. 19A and 19B, closure latch assembly 16' is generally shown to include a latch mechanism 200, a latch release mechanism 202, safety latch mechanism 130 (FIG. 8C), a power release actuator 204, and an "integrated" lift and cinch mechanism 206, all of which are supported within the latch housing. Lift and cinch mechanism 206 is considered to be "integrated" because it combines the functions of lift mechanism 34 and latch cinch mechanism 36 of closure latch assembly 16 into a common mechanism to provide reduced parts and simplify operation. Power release actuator 204 is operable for controlling actuation of latch release mechanism 202 which, in turn, controls coordinated actuation of latch mechanism 200 and safety latch mechanism 130. While only schematically shown, power release actuator 204 includes an electric motor and latch release mechanism 202 includes a revised version of drive cam 60 which is driven by the electric motor. In addition, a remotely-located power cinch actuator 208 is provided for controlling actuation of lift and cinch mechanism 206 to provide a dual-stage decklid cinch operation. As before, the latch housing of closure latch assembly 16' is fixedly secured to vehicle body 11 adjacent to the front compartment and defines an entry aperture through which striker 22 travels in response to movement of decklid 12 relative to vehicle body 11.

Latch mechanism 200 is shown, in this non-limiting embodiment, to be generally similar to latch mechanism 30 and again includes a pawl and ratchet arrangement having ratchet 40 and pawl 42. Ratchet 40 is supported in the latch housing via ratchet pivot post 44 for rotational movement between several distinct positions including the striker release position, the secondary striker capture position, the cinched striker capture position, the primary striker capture position, and the overtravel striker capture position. Ratchet 40 includes primary latch shoulder 48 and secondary latch shoulder 49. Ratchet biasing member, schematically indicated by arrow 50, normally biases ratchet 40 toward its striker release position. Pawl 42 is supported in the latch housing via pawl pivot post 52 for movement between its ratchet holding position and its ratchet releasing position. Pawl biasing member, schematically indicated by arrow 54, normally biases pawl 42 toward its ratchet holding position. Pawl 42 includes pawl latch lug 56 and pawl release lug 58. FIGS. 19A and 19B illustrate ratchet 40 held in its primary striker capture position by pawl 42 located in its ratchet holding position due to pawl latch lug 56 engaging primary latch shoulder 48 on ratchet 40. Thus, closure latch assembly 16' is operating in its primary latched mode.

Lift and cinch mechanism 206 is shown, in this non-limiting embodiment, to generally include a lift/cinch lever 212, a cinch pawl 214, and a lift lever spring 216. Lift/cinch lever 212 is pivotably mounted to the latch housing via a lift/cinch lever pivot post 218 which is shown to be commonly aligned with ratchet pivot post 44 to define a common pivot axis. Lift/cinch lever 212 is configured to include a lift lever segment 220 and a cinch lever segment 222. Lift lever segment 220 includes an elongated striker lug 224 adapted to selectively engage striker 22. Cinch lever segment 222 includes a body portion 226 and an elongated actuation portion 228 extending from body portion 226. Lift lever spring 216 has a first spring end 230 coupled to a stationary lug 232 extending from the latch housing and a second spring end 234 coupled to a retention lug 236 extending from actuation portion 228 of lift/cinch lever 212. Lift lever spring 216 is operable to normally bias lift/cinch lever 212 in a pop-up direction (i.e. clockwise in FIG. 19A and counterclockwise in FIG. 19B). Power cinch actuator 208 is schematically shown to act on an end segment 240 of actuation portion 228 of lift/cinch lever 212 and is operable for pivoting lift/cinch lever 212 about pivot post 218, in opposition to the biasing of lever spring 216. Cinch pawl 214 is shown to have a first end segment 250 pivotably coupled to body portion 226 of lift/cinch lever 212 via a cinch pawl pivot post 252, a second end segment 254 having a guide lug 256 configured to slide along a profiled cam surface formed on a guide rail portion 258 of the latch housing, and an intermediate segment 260 having a cinch pawl drive lug 262 configured to selectively engage a ratchet drive lug 264 extending from ratchet 40. A cinch pawl biasing member, schematically indicated by arrow 266, is operable to normally bias cinch pawl 214 in an engagement direction (i.e. clockwise in FIG. 19A and counterclockwise in FIG. 19B) to maintain sliding engagement of guide lug 256 with the cam surface on guide rail portion 258 of the latch housing.

As will be hereinafter detailed, FIGS. 19A-20B illustrate a power release operation provided in response to actuation of power release actuator 204, FIGS. 21A and 21B illustrate a manual decklid closing operation, and FIGS. 22A-28B are a series of sequential views illustrating a dual-stage power cinch operation provided in response to actuation of power cinch actuator 208. Thus, FIGS. 19A-28B are provided to illustrate movement of the various components of closure latch assembly 16' required to provide these distinct operations.

FIGS. 19A and 19B illustrate closure latch assembly 16' operating in its primary latched mode for holding decklid 12 in its fully-closed position. With closure latch assembly 16' in its primary latched mode, latch mechanism 200 is operating in its primary latched state with ratchet 40 held in its primary striker capture position by pawl 42 located in its ratchet holding position. In addition, latch release mechanism 202 is operating in its non-actuated state. Striker 22 is captured/retained within striker guide channel 46 of ratchet 40 such that striker 22 engages and acts on striker lug 224 on lift lever segment 220 of lift/cinch lever 212 so as to forcibly locate and hold lift/cinch lever 212 in a first or "non-deployed" position, in opposition to the normal biasing of lift lever spring 216, thereby placing lift/cinch lever 212 of lift and cinch mechanism 206 in its spring-loaded state. Cinch pawl 214 is shown biased into a first or "coupled" position via cinch pawl biasing member 266 such that its guide lug 256 engages a first or "inner" cam surface 272 formed on guide rail portion 258 of the latch housing, thereby placing cinch pawl 214 of lift and cinch mechanism 206 in its coupled state.

FIGS. 20A and 20B illustrate closure latch assembly 16' operating in its released mode following completion of a power release operation which causes decklid 12 to initially move from its fully-closed position to its pop-up position (via power release of latch release mechanism 202) and which subsequently permits decklid 12 to move from its pop-up position toward its fully-open position (via power release of safety latch mechanism 130). To provide this two-part power release operation, power release actuator 204 functions to shift latch release mechanism 202 from its non-actuated state into its actuated state for causing pawl 42 to be moved from its ratchet holding position into its ratchet releasing position, whereby ratchet biasing member 50 is permitted to move ratchet 40 from its primary striker capture position into its secondary striker capture position. Concurrently, lift lever spring 216 is permitted to move lift/cinch lever 212 from its non-deployed position toward a second or "deployed" position which assists in moving decklid 12 to its pop-up position via engagement of striker lug 224 with striker 22, thereby placing lift/cinch lever 212 of lift and cinch mechanism 206 in its spring-released state. As before, safety latch mechanism 130 is operable in its safety latched state to hold ratchet 40 in its secondary striker capture position (via engagement of safety pawl lug 162 with ratchet secondary latch shoulder 49) to define the secondary latched state of latch mechanism 200. Continued actuation of power release actuator 204 functions to shift safety latch mechanism 130 into its safety unlatched state to disengage safety pawl 142 from ratchet 40, whereby ratchet biasing member 50 drives ratchet 40 to its ratchet released position (shown). Movement of lift/cinch lever 212 to its deployed position also results in concurrent movement of cinch pawl 214 from its coupled position to a second or "uncoupled" position, thereby placing cinch pawl 214 of lift and cinch mechanism 206 in its coupled state such that guide lug 256 engages a second or "outer" cam surface 274 formed on guide rail portion 258 of the latch housing. As seen, striker 22 is released from ratchet 40, thereby permitting opening movement of decklid 12.

FIGS. 21A and 21B are generally similar to FIGS. 20A and 20B, respectively, but now illustrate a manual decklid closing operation in which the weight of decklid 12 ($F_{HOOD}$), schematically indicated by arrow 280, is shown acting on primary latch shoulder 48 of ratchet 40. This closing force 280 acts, in opposition to ratchet biasing member 50, to rotate ratchet 40 from its striker release position (shown) toward its secondary striker capture position whereat safety pawl 142 of safety latch mechanism 130 re-engages secondary latch shoulder 49 on ratchet 40 and establishes the secondary latched state of latch mechanism 200 such that decklid 12 is held in its pop-up position.

In accordance with the present disclosure, closure latch assembly 16' is configured to provide a dual-stage decklid cinch function via remotely-located power cinch actuator 208 controlling actuation of lift and cinch mechanism 206. As before, the first, non-driven cinching stage is operable to permit decklid 12 to move under its own weight from its pop-up position to its cinched position while the second, driven cinching stage is operable to drive decklid 12 from its cinched position to its fully-closed position. In this non-limiting embodiment, the pop-up position of decklid 12 is selected to be about 25 mm raised relative to the fully-closed position while the cinched position of decklid 12 is selected to be about 8 mm raised relative to the fully-closed position. In this regard, FIGS. 22A-24B illustrate the first cinching stage while FIGS. 25A-28B illustrate the second cinching stage.

Referring to FIGS. 22A and 22B, closure latch assembly 16' is shown in its secondary latched mode with decklid 12 held by latch mechanism 200 in its pop-up position. As such, latch mechanism 200 has been shifted back into its secondary latched state with safety latch mechanism 130 shifted into its safety latched state such that safety pawl 142 is located in its ratchet blocked position with its blocking lug 162 engaging secondary latch shoulder 49 on ratchet 40. As previously noted, the pop-up position of decklid 12 preferably corresponds to the first stage start position for the first cinching stage. With decklid 12 located in this position, striker 22 is engaging striker lug 224 on lift/cinch lever 212, as indicated by arrow 280, with lift/cinch lever 212 located in its deployed position. When sensors 39 detect an appropriate positioned signal, such as the location of ratchet 40 in its secondary striker capture position, power cinch actuator 208 is actuated to drive lift/cinch lever 212 from its deployed position toward its non-deployed position, in opposition to the biasing of lift lever spring 216. This actuation of power cinch actuator 208 is provided by an actuation force, indicated by force line 286, acting (i.e. pulling) on end portion 240 of actuation portion 228 of lift/cinch lever 212. This actuation force 286 may be generated by a cable pulling on lift/cinch lever 212 via a motor-driven cable/driven type cinch actuator. As an alternative, a linear-type cinch actuator can be used to generate and exert the actuation force 286. Thus, FIGS. 22A and 22B illustrate initiation of the first cinching stage. During the first cinching stage, cinch pawl drive lug 262 on cinch pawl 214 remains disengaged from ratchet drive lug 264 on ratchet 40. In particular, FIG. 22A shows cinch pawl 214 located in its uncoupled position with its guide lug 256 in engagement with second cam surface 274. As such, power cinch actuator 208 functions to move lift/cinch lever 212 downwardly towards its non-deployed position such that the weight ($F_{HOOD}$) 280 is solely responsible for movement of decklid 12 from its pop-up position to its cinched position.

FIGS. 23A and 23B illustrate continuation of the first cinching stage with striker 22 continuing to drive ratchet 40 toward its cinched striker capture position. Concurrently, power cinch actuator 208 continues to drive lift/cinch lever 212 towards its non-deployed position. FIG. 23A shows guide lug 256 on cinch pawl 214 exiting engagement with second cam surface 274 along a transition surface 276 as cinch pawl 214 moves from its uncoupled position toward its coupled position. However, cinch pawl drive lug 262 is still displaced from engagement with ratchet drive lug 264. Thus, the weight ($F_{HOOD}$) of decklid 12 continues to provide the first cinching stage.

FIGS. 24A and 24B illustrate completion of the first cinching stage upon continued actuation of power cinch actuator 208 moving lift/cinch lever 212 toward its non-deployed position with decklid 12 located in its cinched position and held there by ratchet 40 being located in its cinched striker capture position. However, striker 22 disengages striker lug 224 upon continued pivotal movement of lift/cinch lever 212 due to seal load influences. Note that continued movement of lift/cinch lever 212 towards its non-deployed position causes continued movement of cinch pawl towards its coupled position. As shown in FIG. 24A, cinch pawl drive lug 262 is still disengaged from ratchet drive lug 264 at the end of the first cinching stage.

FIGS. 25A and 25B are generally similar to FIGS. 24A and 24B, respectively, but illustrate initiation of the second cinching stage resulting from continued actuation of power cinch actuator 208. Specifically, cinch pawl 214 is now shown located in its coupled position with its guide lug 256 in sliding engagement with first cam surface 272 and cinch pawl drive lug 262 in engagement with ratchet drive lug 264. Thus, cinch pawl 214 of lift and cinch mechanism 206 has been shifted into its coupled state. Continued movement of lift/cinch lever 212 towards its non-deployed position causes cinch pawl 214 to forcibly move ratchet 40 from its cinched striker capture position toward its primary striker capture position. As such, ratchet 40 acts on striker 22 to drive decklid 12 from its cinched position toward its fully-closed position.

FIGS. 26A and 26B are generally similar to FIGS. 25A and 25B, respectively, but illustrate that movement of lift/cinch lever 212 into its non-deployed position results in cinch pawl 214 driving ratchet 40 into its primary striker capture position (shown). As such, pawl biasing member 54 forces pawl 42 to move into its ratchet holding position relative to ratchet 40 such that pawl latch lug 56 is aligned with primary latch shoulder 48 on ratchet 40. Note also that striker lug 224 on lift/cinch lever 212 is no longer engaged with striker 22 such that all cinching of decklid 12 into its fully-closed position is provided via cinch pawl 214.

FIGS. 27A and 27B are generally similar to FIGS. 26A and 26B, respectively, but illustrate that continued movement of lift/cinch lever 212 slightly past its non-deployed position via continued actuation of power cinch actuator 208 has resulted in cinch pawl 214 driving ratchet 40 (via engagement of cinch pawl drive lug 262 with ratchet drive lug 264) into its overtravel striker capture position which, in this non-limiting embodiment, is about 2 mm past the decklid fully-closed position.

Finally, FIGS. 28A and 28B illustrate the end of the second cinching stage with power cinch actuator 208 shifted into a power-off condition. With no actuation force applied by power cinch actuator 208, lift/cinch lever 212 returns to its non-deployed position and cinch pawl 214 moves slightly to disengage cinch pawl drive lug 262 from ratchet drive lug 264. Thus, closure latch assembly 16' is now operating in its primary latched mode with latch mechanism 200 in its primary latched state holding decklid 12 in its fully-closed position. An emergency release lever 300 may be pivotally coupled about pawl pivot 52 and connected with release cable 18 to allow for a manual release of the latch mechanism 200 by activation of handle 14 (e.g. illustratively by a clockwise rotation of emergency release lever 300 of FIG. 28A imparted by the activation of cable 18 represented by arrow A18). Rotation of emergency release lever 300 imparts a rotation of pawl 42 towards the ratchet releasing direction. Through FIGS. 19A to 28B, stationary lug 232 may be illustratively coupled to emergency release lever 300 to increase the spring tension in lift lever spring 216 during a manual release to assist driving the lift/cinch lever 212 in the pop-up direction.

In each embodiment of closure latch assembly 16, 16', the power cinch operation is divided into two stages. As detailed, the first cinching stage is intended to lower decklid 12 via lowering of the lift lever 70, 212 from its pop-up height (i.e. 25 mm) to its cinched height (i.e. 8 mm). Due to the weight of decklid 12 acting on lift lever 70, 212, decklid 12 follows along from its partially-open position to its cinched position. This first (i.e. non-driven) stage prevents pinching of fingers. The second cinching stage is intended to cause latch cinch mechanism 36 and lift and cinch mechanism 206 to engage and drive ratchet 40 from its cinched striker capture position into its primary striker capture position, thereby mechanically pulling striker 22 for moving decklid 12 from its cinched position into its fully-closed position.

A detailed description of an alternative embodiment of a power-operated version of a closure latch assembly 300, constructed in accordance with the teachings of the present disclosure, will now be provided with reference to FIGS. 29 through 38 of the drawings. Referring initially to FIG. 29, closure latch assembly 300 is generally shown to include a latch mechanism 302, a latch release mechanism 304, a spring-loaded lift mechanism 306, a latch cinch mechanism 308, and a power actuator 310. As will be detailed, power actuator 310 is operable to control actuation of a drive mechanism 312 for actuating latch release mechanism 304 to provide a power release function and for actuating latch cinch mechanism 308 to provide a power cinch function. Latch controller 37 is again schematically shown in communication with power actuator 310 for controlling actuation thereof in response to sensor signals inputted to latch controller 37 from one or more latch sensors 39. The sensor signals can include, without limitation, a power release request (i.e. via a key fob or push button) as well as positional signals indicative of the position one or more of moveable components of closure latch assembly 300.

While only schematically shown, power actuator 310 is configured to include an electric motor that is operable to rotate a drive wheel 314 associated with drive mechanism 312. The electric motor (not shown) is housed within an actuator housing section 316 of the latch housing and has a rotary motor shaft, schematically shown by line 318, arranged to rotate about a rotary axis 320. The latch housing is shown to further include a frame plate section 322 with mounting flanges 324 configured to secure closure latch assembly 300 to an edge portion of vehicle body 11 (FIG. 1). As an alternative, power actuator 310 could be located remotely from closure latch assembly 300 but still be operatively arranged to rotate drive wheel 314 about axis 320.

Latch mechanism 302 is generally similar to latch mechanism 30 and is configured in this non-limiting arrangement embodiment as a single pawl/ratchet arrangement having ratchet 40 and pawl 42. Ratchet 40 is supported in the latch housing for rotation about ratchet pivot post 44 between a series of distinct positions including a striker release position, a secondary striker capture position, and a primary striker capture position. Ratchet 40 is again configured to include primary latch shoulder 48 and secondary latch shoulder 49. Ratchet biasing member, schematically indicated by arrow 50, functions to normally bias ratchet 40 in a releasing direction (i.e. clockwise in FIG. 29) toward its striker release position. Pawl 42 is supported in the latch housing for rotational movement about pawl pivot post 52 between a ratchet holding position and a ratchet releasing position. Pawl biasing member, schematically indicated by arrow 54, functions to normally bias pawl 42 in an engaging direction (i.e. counterclockwise in FIG. 29) toward its ratchet holding position. Pawl 42 includes pawl latch lug 56 and pawl release lug 58. FIG. 29 shows ratchet 40 held in its primary striker capture position by pawl 42 being located in its ratchet holding position due to pawl latch lug 56 engaging primary latch shoulder 48. Pawl 42 is shown schematically connected to release handle 14 via release cable 18 such that activation of release handle 14 functions to mechanically move pawl 42 from its ratchet holding position into its ratchet releasing position when manual release of latch mechanism 302 is desired.

Drive mechanism 312 includes drive wheel 314 and an elongated coupling lever 328. Drive wheel 314 is configured to include a cylindrical body segment 330 fixed to motor shaft 318 for rotation about axis 320, a first or "latch release" lug 332 extending radially from body segment 330, and a second or "latch cinch" lug 334 also extending radially from body segment 330. Coupling lever 328 includes a first end segment 336 mounted via a coupling lever pivot pin 338 to latch cinch lug 334, a second end segment 340 defining a coupler feature 342, and an intermediate segment 344 defining a follower cam portion 346 and an actuation cam portion 348 which are disposed on opposite sides of a drive cam portion 350. As will be detailed, the electric motor of power actuator 310 is operable, in response to control signals from latch controller 37, to rotate drive wheel 314 between a first or "home" position and a second or "power release" position to provide the power release function. In addition, rotation of drive wheel 314 by the electric motor between its home position and a third or "power cinch" position provides the power cinch function.

Spring-loaded lift mechanism 306 is generally shown in FIG. 29 to include a lift lever 360 and a lift lever spring 362. Lift lever 360 includes a spring plate segment 364 and a striker plate segment 366 both of which are interconnected for common rotation about a lift lever pivot post 368 which, in this non-limiting embodiment, is commonly aligned with ratchet pivot post 44. Lift lever spring 362 has a first spring end 370 secured to a stationary lug 372 extending from the latch housing and a second spring end 374 secured to a retention lug 376 formed on spring plate segment 364. Lift lever spring 362 functions to normally bias lift lever 360 in a pop-up direction (i.e. clockwise in FIG. 29). Striker plate segment 366 includes a striker lug 378 that is adapted to engage striker 22.

Latch cinch mechanism 308 is shown, in this non-limiting embodiment, to generally include a cinching lever 380 and a cinching pawl 382. Cinching lever 380 is pivotally mounted to the latch housing via a cinching lever pivot post 384 which is also shown to be commonly aligned with ratchet pivot post 44. A cinching lever biasing member, schematically shown by arrow 386, functions to normally bias cinching lever 380 toward a first or "home" position. Cinching lever 380 includes a first drive post 388 extending into a drive slot 390 formed in cinching pawl 382 and a second drive post 392 configured to interact with coupler feature 342 on coupling lever 328. Cinching pawl 382 is pivotably mounted to the latch housing via a cinching pawl pivot post 394 which is also shown commonly aligned with ratchet pivot post 44. Cinching pawl 382 includes a cinching pawl drive lug 395 configured to be engageable with ratchet 40.

As will be hereinafter detailed, FIGS. 30A-30B through 34A-34B provide a series of sequential views of closure latch assembly 300 illustrating a dual-stage power release operation with FIGS. 30A-30B through 32A-32B showing a first stage or "primary latch" release operation and with FIGS. 33A-33B through 34A-34B showing a second stage or "safety latch" release operation. In addition, FIGS. 35A through 38 include a series of sequential views illustrating initiation and completion of the power cinch operation. As noted, closure latch assembly 300 is equipped with a single power actuator 310 which functions, in coordination with drive mechanism 312, to provide both the power release and the power cinch functions.

FIGS. 30A and 30B illustrate closure latch assembly 300 operating in a primary latched mode for holding decklid 12 in its fully-closed position relative to body 11 of vehicle 10. With closure latch assembly 300 in its primary latched mode, latch mechanism 302 is operating in a primary latched state with ratchet 40 located in its primary striker capture position and pawl 42 located in its ratchet holding position. Striker 22 is shown captured/retained within striker guide channel 46 of ratchet 40 such that striker 22 engages striker lug 378 on striker plate segment 364 so as to forcibly locate lift lever 360 in a first or "non-deployed" position, in opposition to the biasing load exerted thereon by lift lever spring 362. With lift lever 360 held in its non-deployed position, lift mechanism 306 operates in a spring-loaded state.

Latch cinch mechanism 308 is shown in FIGS. 30A and 30B operating in an uncoupled state with cinching lever 380 located by cinching lever biasing member 386 in its home position. Note that cinching pawl 382 is also located in a first or "home" position. Finally, drive wheel 314 is shown located in its home position which, in turn, causes coupling lever 328 to be located in a first or "released" position, thereby defining a home operating state for drive mechanism 312. With coupling lever 328 located in its released position, follower cam portion 348 rests against a mating arcuate surface 396 formed on body segment 330 and drive cam portion 350 engages latch release lug 332. A coupling lever biasing member, schematically shown by arrow 400, functions to bias coupling lever 328 toward its released position. As such, actuation cam portion 346 is displaced from engagement with pawl release lug 58 on pawl 42 and coupler feature 342 is displaced from engagement with second drive post 392 on cinching lever 380. Thus, latch release mechanism 304, defined by the relationship between actuation cam portion of coupling lever 328 and pawl release lug 58 on pawl 42, establishes a non-actuated state. Likewise, latch cinch mechanism 308 is operating in an uncoupled state when cinching lever 380 is in its home position and coupling lever 328 is located in its released position.

FIGS. 31A and 31B illustrate, in comparison to FIGS. 30A and 30B, respectively, initiation of the power release operation in response to latch controller receiving a power release signal. Specifically, the electric motor of power actuator 310 is actuated to cause drive wheel 314 to begin rotating in a first (i.e. counterclockwise) direction from its home position into its power release position (shown) for shifting drive mechanism 312 from its home state into a primary latched released state. In particular, such rotation of drive wheel 314 causes latch release lug 332 to drive coupling lever 328 from its released position into a second or "pawl release" position whereat actuation cam portion 348 engages pawl release lug 58 on pawl 42 and causes pawl 42 to move from its ratchet holding position into its ratchet releasing position, whereby pawl latch lug 56 is disengaged from primary latch shoulder 48 on ratchet 40. Ratchet 40 is then driven by ratchet biasing member 50 from its primary striker capture position toward its secondary striker capture position. Concurrently, lift mechanism 30 is shifted from its spring-loaded state into a spring released state such that lift lever spring 362 drives lift lever 360 in a releasing (i.e. clockwise) direction from its non-deployed position toward a second or "deployed" position which causes striker lug 378 to engage striker 22 and begin to forcibly move decklid 12 from its fully-closed position toward its partially-closed pop-up position. Thus, latch release mechanism 304 has shifted from its non-actuated state into an actuated state which causes latch mechanism 302 to be shifted from its primary latched state into a primary unlatched state.

FIGS. 32A and 32B illustrate, in comparison to FIGS. 31A and 31B, respectively, that ratchet 40 continues to rotate until it reaches its secondary striker capture position whereat blocker lug 162 on safety pawl 142 engages secondary latch shoulder 49 on ratchet 40 such that safety latch mechanism 130 is now operating in its safety latched state so as to define a secondary latched state for latch mechanism 302. Note that in its secondary latched state, pawl latch lug 56 remains disengaged from latch shoulder 48 and pawl 42 is inhibited from returning to its ratchet holding position by engagement with an edge portion of ratchet 40. The electric motor of power actuator 310 is then signaled to rotate drive wheel 314 in a second (i.e. clockwise) direction from its power release position back to its home position which, in turn, causes coupling lever 328 to return to its released position, thereby completing the first stage of the dual-stage power release operation. Safety pawl 142 is shown in FIG. 32B located in its ratchet blocked position with its blocker lug 162 engaging secondary latch shoulder 49 on ratchet 40.

FIGS. 33A and 33B illustrate, in comparison to FIGS. 32A and 32B, respectively, rotation of drive wheel 314 in the first direction from its home position back into its power release position such that coupling lever 328 again is driven from its released position into its pawl released position. As such, actuation cam portion 348 of coupling lever 328 engages pawl release lug 58 on pawl 42. Thus, pawl 42 is again moved into its ratchet releasing position in response to movement of coupling lever 328 from its released position to its pawl release position. Such movement of pawl 42 now causes corresponding movement of coupling link 140 due to engagement of pawl drive lug 146 with first end segment 144 of coupling link 140. As previously described, such movement of coupling link 140 results in corresponding movement of safety pawl 142 from its ratchet blocked position into its ratchet unblocked position, whereby blocker lug 162 is released from secondary latch shoulder 49 on ratchet 40. Accordingly, the safety unlatched state is established for safety latch mechanism 130 and an unlatched state is established for latch mechanism 302 upon completion of the second state of the dual-stage power release operation. Ratchet biasing member 50 is now permitted to drive ratchet 40 from its secondary striker capture position into its striker release position, thereby releasing striker 22 from ratchet 40 so as to permit subsequent manual movement of decklid 12 toward its fully-open position since striker 22 is no longer retained within guide channel 46 nor movement limited by safety hook segment 132. Accordingly, closure latch assembly 300 is shifted from its secondary latched mode into its released mode.

FIGS. 34A and 34B illustrate the electric motor of power actuator 310 rotating drive wheel 314 in the second direction back to its home position following completion of the second stage of the dual-stage power release operation. In summary, FIGS. 30-34 illustrates a first actuation of drive wheel 314 causes latch mechanism 302 to shift from its primary latched state into its unlatched state to permit movement of decklid from its fully-closed position into its partially-closed position, and a second actuation of drive wheel 314 causes latch mechanism 302 to shift from its secondary latched state into its unlatched state to permit subsequent movement of decklid 12 from its partially-closed position toward its fully-open position.

Referring now to FIGS. 35 through 38, the power cinch operation provided by closure latch assembly 300 will now be described in detail. In comparison to FIGS. 34A and 34B which show closure latch assembly 300 operating in its released mode, FIGS. 35A and 35B illustrate that movement of decklid 12 from its fully-open position into its pop-up position (during a manual closing operation) causes striker 22 to engage and drive ratchet 40 (in opposition to ratchet biasing member 50) from its striker release position into its secondary striker capture position. Once ratchet 40 is located in its secondary striker capture position, safety latch mechanism 130 shifts into its safety latched state with safety pawl 142 located in its ratchet blocked position. Note that drive mechanism 312 is operating in its home state with drive wheel 314 located in its home position and coupling lever 328 located in its released position.

FIG. 36 illustrates initial rotation of drive wheel 314 by the electric motor in the second direction from its home position toward its power cinch position causes coupling lever 328 to move from its released position into an engaged position whereat coupler feature 342 engages second drive post 392 on cinching lever 380. Coupler feature 342 is configured as a latch shoulder operable to engage second drive post 392 when coupler lever 328 is located in its engaged position. In view of this coupled interface between coupling lever 328 and cinching lever 380, latch cinch mechanism 308 is now defined to be operating in its coupled state.

FIG. 37 illustrates that continued rotation of drive wheel 314 by the electric motor from its engaged position into its power cinch position causes coupling lever 328 to be driven from its engaged position into a latch cinch position. Such movement of coupling lever 328 into its latch cinch position results in movement of cinching lever 380 from its home position (FIG. 36) into a cinched position due to the coupled interface established between coupler feature 342 and second drive post 392. Movement of cinching lever 380 from its engaged position into its cinched position causes first drive post 388 to engage an end of drive slot 390 in cinching pawl 382 and drive cinching pawl 382 from its home position into a ratchet cinched position. Since cinching pawl 382 is connected to ratchet 40 (via engagement with cinching pawl drive lug 395), such movement of cinching pawl 382 into its ratchet cinched position results in corresponding movement of ratchet 40 from its secondary striker capture position into its primary striker capture position. Thus, latch mechanism 302 is shifted from its secondary latched state into its primary latched state and pawl 42 is permitted to return to its ratchet holding position with its latch lug 56 engaged with primary latch shoulder 48 on ratchet 40. Such cinching movement of ratchet 40 also functions to shift lift mechanism 306 back into its spring-loaded state with lift lever 360 held in its non-deployed position.

FIG. 38 illustrates that electric motor of power actuator 310 rotates drive wheel 314 in the first direction from its power cinch position (FIG. 37) back to its home position at the conclusion of the power cinch operation. As seen, closure latch assembly 300 is operating in its primary latched mode with latch mechanism 302 in its primary latched state. Drive mechanism 312 is configured to utilize bi-directional rotation of drive wheel 314 to provide both the power release function and the power cinch function. This is in contrast to the uni-directional drive cam arrangement associated with closure latch assembly 16. In addition, the configuration of drive wheel 314 and its operative connection to coupling lever 328 provide a generally pivotal-type movement of coupling lever 328 between its home and power release positions while also providing a generally translational-type movement of coupling lever 328 between its home and power cinch positions. Thus, a single power actuator 310, in combination with drive mechanism 312, provides closure latch assembly 300 with a compact packaging arrangement capable of controlling actuation of latch release mechanism 302 and latch cinch mechanism 308.

Now referring to FIGS. 33A, 36 and 37, there is provided a drive mechanism 312 for a closure latch assembly 300 for use in a motor vehicle having a closure member that is moveable between a fully-open position and a fully-closed position, the drive mechanism including a drive wheel 314 including a body segment 330, and a coupling lever 328 pivotally mounted to the body segment 330, the coupling lever 328 including a coupler feature 342 adapted to engage a first latch mechanism, an actuation cam adapted to engage a second latch mechanism, and a follower cam 348 adapted to engage the body segment. The driven rotation of the drive wheel in a first direction, illustratively shown in FIG. 33A as counterclockwise causes follower cam adapted to engage the body segment to move the actuation cam portion 348 tangentially, as represented by arc T, to engage the second latch mechanism, such as a pawl, and wherein a driven rotation of drive wheel 314 in a second direction causes follower cam 348 to disengage the body segment 330 to move the coupler feature 342 radially, as represented by arrow T, to engage the first latch mechanism, such as a cinch lever. In this manner, a drive mechanism 312 is provided that can actuate a first latch mechanism requiring a small input movement of actuation which may be provided by a tangential movement of the actuation cam, and that can also actuate a second latch mechanism requiring a larger and different input direction of movement of actuation which may be provided by a radial movement of the coupler feature to both radially move and outwardly push the second latch mechanism, for example with reference to FIGS. 36 and 37, coupler feature 342 has move second drive post 392 radially outwardly, for example push, from a first radial position R1 to a second greater radial position R2.

Now referring to FIG. 39, there is illustrated a method of operating a drive mechanism for a closure latch assembly 1000, including the steps of driving a cam wheel in a first direction to cause a coupling lever pivotally mounted to the cam wheel to tangentially move to engage a first latch mechanism 1002, and driving a cam wheel in a second direction to cause the coupling lever to radially move to engage a second latch mechanism 1004.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A closure latch assembly for use in a motor vehicle having a closure member that is moveable between a fully-open position and a fully-closed position, the closure latch assembly comprising:

a latch mechanism operable in a primary latched state to hold the closure member in its fully-closed position, in a secondary latched state to hold the closure member in a partially-open position, and in an unlatched state to permit movement of the closure latch member from its partially-open position to its fully-open position;

a latch cinch mechanism operable in an uncoupled state with respect to the latch mechanism to permit movement of the closure member from its fully-open position into its partially-open position and operable in a coupled state relative to the latch mechanism to drive the latch mechanism from its secondary latched state into its primary latched state during a power cinch operation;

a drive mechanism operable in a home state disengaged from the latch mechanism and the latch cinch mechanism, in a primary latch released state to shift the latch mechanism from its primary latched state into its secondary latched state to provide a first stage of a power release operation, in a secondary latch released state to shift the latch mechanism from its secondary latched state into its unlatched state to provide a second stage of the power release operation, and in a cinched state to shift the latch cinch mechanism into its coupled state to provide the power cinch operation; and a power actuator operable to shift the drive mechanism between the home, primary latch released, secondary latch released, and cinched states.

2. The closure latch assembly of claim 1, wherein the closure latch assembly is configured to be mounted to a structural body portion of the motor vehicle and operates to selectively engage a striker mounted to the closure member for latching the closure member to the body portion.

3. The closure latch assembly of claim 1, further comprising a lift mechanism operable in a spring-loaded state when the latch mechanism is in its primary latched state and operable in a spring-released state when the latch mechanism is shifted from its primary latched state into its secondary latched state, the lift mechanism causing the closure member to move from its fully-closed position to its partially-open position when shifted into its spring-released state.

4. The closure latch assembly of claim 1, further comprising a safety latch mechanism operable in a safety latched state to maintain the latch mechanism in its secondary latched state and in a safety unlatched state for shifting the latch mechanism from its secondary latched state into its unlatched state.

5. The closure latch assembly of claim 4, wherein the drive mechanism is operable in its primary latch released state to shift the safety latch mechanism into its safety latched state and is operable in its secondary latch released state to shift the safety latch mechanism from its safety latched state into its safety unlatched state.

6. The closure latch assembly of claim 5, wherein the drive mechanism includes a drive wheel and a coupling lever, wherein the drive wheel includes a body segment, a latch release lug extending from the body segment, and a latch cinch lug extending from the body segment, and wherein the coupling lever includes a first end segment coupled to the latch cinch lug, a second end segment defining a coupler feature adapted to engage the latch cinch mechanism, and an intermediate segment having a follower cam engaging the latch release lug and an actuation cam adapted to engage the latch mechanism.

7. The closure latch assembly of claim 6, wherein the power actuator includes an electric motor having a rotary output drivingly connected to the body segment of the drive wheel.

8. The closure latch assembly of claim 7, wherein the home state of the drive mechanism is established when the drive wheel is located in a home position and the coupling lever is located in a released position, the coupling lever being operable in its released position to disengage the coupler feature from the latch cinch mechanism and to disengage the actuation cam from the latch mechanism, wherein the primary latch released state of the drive mechanism is established when the electric motor rotates the drive wheel in a first direction from its home position into a power release position for causing movement of the coupling lever from its released position into a pawl release position whereat the actuation cam engages the latch mechanism and causes the latch mechanism to shift from its primary latched state into its secondary latched state, and wherein the drive mechanism is subsequently shifted back into its home state by the electric motor rotating the drive wheel in a second direction from its power release position back to its home position for returning the coupling lever to its released position to complete the first stage of the power release operation.

9. The closure latch assembly of claim 8, wherein the secondary latch released state of the drive mechanism is established by the electric motor subsequently rotating the drive wheel in the first direction from its home position back to its power release position for causing the coupling lever to again move from its released position into its pawl release position whereat the actuation cam engages the latch mechanism and causes the latch mechanism to shift from its secondary latched state into its unlatched state, and wherein the electric motor subsequently rotates the drive wheel in the second direction back to its home position to reestablish the home state and complete the second stage of the power release operation.

10. The closure latch assembly of claim 9, wherein the cinched state of the drive mechanism is established when the electric motor rotates the drive wheel in the second direction from its home position into a power cinch position for causing the coupling lever to initially move from its released position into an engaged position whereat the coupler feature engages the latch cinch mechanism and shifts the latch cinch mechanism into its coupled state, and wherein subsequent movement of the coupling lever from its engaged position into a latch cinch position causes the latch cinch mechanism to drive the latch mechanism from its secondary latched state into its primary latched state to complete the power cinch operation.

11. The closure latch assembly of claim 7, wherein a home state of the drive mechanism is established when the drive wheel is located in a home position and the coupling lever is located in a released position, the coupling lever being operable in its released position to disengage the coupler feature from the latch cinch mechanism and the actuation cam from the latch mechanism, wherein the cinched state of the drive mechanism is established when the electric motor rotates the drive wheel in a first direction from its home position into a power cinch position which causes the coupling lever to initially move from its released position into an engaged position whereat the coupler feature engages the latch cinch mechanism and shifts the latch cinch mechanism from its uncoupled state into its coupled state, wherein continued movement of the coupling lever from its engaged position into a latch cinched position causes the latch cinch mechanism to drive the latch mechanism from its secondary latch state into its primary latched state, and wherein the electric motor rotates the drive wheel in a second direction back to its home position for locating the coupling lever in its released position to complete the power cinch operation.

12. The closure latch assembly of claim 11, wherein the home state of the drive mechanism is established when the drive wheel is located in the home position and the coupling lever is located in the released position, the coupling lever being operable in its released position to disengage the coupler feature from the latch cinch mechanism and to disengage the actuation cam from the latch mechanism, wherein the primary latch released state of the drive mechanism is established when the electric motor rotates the drive wheel from its home position into a power release position for causing movement of the coupling lever from its released position into a pawl release position whereat the actuation cam engages the latch mechanism and causes the latch mechanism to shift from its primary latched state into its secondary latched state, and wherein the drive mechanism is subsequently shifted back into its home state by the electric motor rotating the drive wheel from its power release position back to its home position for returning the coupling lever to its released position to complete the first stage of the power release operation.

13. The closure latch assembly of claim 12, wherein the secondary latch released state of the drive mechanism is established by the electric motor rotating the drive wheel from its home position back to its power release position for causing the coupling lever to again move from its released position into its pawl release position whereat the actuation cam re-engages the latch mechanism and causes the latch mechanism to shift from its secondary latched state into its unlatched state, and wherein the electric motor subsequently drives the drive wheel back to its home position to reestablish the home state and complete the second stage of the power release operation.

* * * * *